US006212466B1

(12) United States Patent
Ulyanov et al.

(10) Patent No.: US 6,212,466 B1
(45) Date of Patent: Apr. 3, 2001

(54) OPTIMIZATION CONTROL METHOD FOR SHOCK ABSORBER

(75) Inventors: Sergei V. Ulyanov; Takahide Hagiwara, both of Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/484,877

(22) Filed: Jan. 18, 2000

(51) Int. Cl.⁷ .................................................. G05B 13/00

(52) U.S. Cl. ........................... 701/99; 701/100; 700/28; 700/30

(58) Field of Search ........................ 701/99, 100, 101; 700/28, 30

(56) References Cited

PUBLICATIONS

Bose Bimal K., (1994), "Expert System, Fuzzy Logic, and Neural Network Applications in Power Electric and Motion Control", Processing of the IEEE, vol. 82, No. 8, pp. 1303–1323, Aug. 1994.

Feng Q. and Yamafuji K., (1988), "Design and simulation of control system of an inverted pendulum", Robotica, vol. 6, No. 3, pp. 235–241, No Month.

Gradetsky V.G. and Ulyanov S.V., (1993), "Mobile system with wall climbing robots", Intern. J. of Computer and Systems Sciences, vol. 31, No. 1, pp. 126–142, (no month).

Johansson R., Magnusson M. and Fransson P.A., (1995), "Galvanic vestibular stimulation for analysis of postural adaptation and stability", IEEE Transactions on Biomedical Engineering, vol. 42, No. 3, pp. 282–292, (no month).

Ju M.-S., Yi S.-G., Tsuei Y.-G, and Chou Y.-L., (1995), "Fuzzy control of electrohydraulic above–knee prostheses", JSME International Journal, vol. 38, No. 1, pp. 78–85, (no month).

Lee Y.N., Kim T.W. and Suh I.H., (1994), "A look–up table–based self–organizing fuzzy plus linear controller", Mechatronics, vol. 4, No. 1, pp. 71–90, Apr. 19, 1993.

Liu T.S. and Wu J.C., (1993), "A model for rider–motorcycle system using fuzzy control", IEEE Transactions on Systems, Man and Cybernetics, vol. 23–SMC, No. 1, pp. 267–276, No Month.

Mendel, Jerry M., (1995), "Fuzzy Logic Systems for Engineering: A Tutorial", Proceeding of the IEEE, vol. 83, No. 3, pp. 345–377, (no month).

Nakajima R., Tsubouchi T., Yuta S. and Koyanagi E., (1997), "A development of a new mechanism of an autonomous unicycle", Proc. IEEE/RSJ International Conference on Intelligent Robots and Systems (IROS '97), vol. 2, Grenoble, France, pp. 906–912, No Month.

Peround M. and Saucier A., (1987), "Thermodynamics of dissipative systems", Helvetica Physica, vol. 60, No. 8, pp. 1038–1051, No Month.

(List continued on next page.)

Primary Examiner—William A. Cuchlinski, Jr.
Assistant Examiner—Yonel Beaulieu
(74) Attorney, Agent, or Firm—Knobbe, Martens, Olson & Bear, LLP

(57) ABSTRACT

A control system for optimizing the performance of a vehicle suspension system by controlling the damping factor of one or more shock absorbers is described. The control system uses a fitness (performance) function that is based on the physical laws of minimum entropy. The control system uses a fuzzy neural network that is trained by a genetic analyzer. The genetic analyzer uses a fitness function that maximizes information while minimizing entropy production. The fitness function uses a difference between the time differential of entropy from a control signal produced in a learning control module and the time differential of the entropy calculated by a model of the suspension system that uses the control signal as an input. The entropy calculation is based on a dynamic model of an equation of motion for the suspension system such that the suspension system is treated as an open dynamic system.

14 Claims, 7 Drawing Sheets

OTHER PUBLICATIONS

Sheng Z.Q. and Yamafuji K., (1995), "Realization of a human riding a unicycle by a robot", Proc. of '95 IEEE Intern. Conf. on Robotics & Automation, Japan, vol. 2, pp. 1319–1326, Jun. 1995.

Sheng Z.Q. and Yamafuji K., (1997), "Postural stability of a human riding a unicycle and its emulation by a robot", IEEE Trans. on Robotics and Automation, vol. 13, No. 5, pp. 709–720, No Month.

Sheng, Z.Q. and Yamafuji K., (1995), "Study on the stability and motion control of a unicyle, $1^{st}$ Report: Dynamics of a human riding a unicycle and its modeling by link mechanism", JSME International Journal, vol. 38C, No. 2, pp. 249–259,1996, No Month.

Sheng Z.Q., Yamafuji K. and Ulyanov S.V., (1996), "Study on the stability and motion control of a unicycle. Pts 3," JSME International Journal, vol 39, No. 3, pp. 560–568, No Month.

Tsai, C.H. and Li, T.H.S., (1996) "Design of Lyapunov Function Based Fuzzy Logic Controller", IEEE, pp. 396–401, 1992, No Month.

Ulyanov S.V., (1992), "Fuzzy models of Intelligent control systems: Theoretical and applied aspects" Soviet Journal of Computer and Systems Sciences (Engineering Cybernetics), vol. 30, No. 4, pp. 1–22, No Month.

Ulyanov S.V., Sheng Z.Q., Yamafuji K., Watanabe S. and Ohkura T., (1995), "Self-organization fuzzy chaos Intelligent controller for a robotic unicyle: A New benchmark in AI control", Proc. of $5^{th}$ Intelligent System Symposium: Fuzzy, AI and Neural Network Applications Technologies (FAN Symp. '95), Tokyo, pp. 41–46, Sep. 1996.

Ulyanov S.V. and Yamafuji K., (1996), "Fuzzy Intelligent emotion and instinct control of a robotic unicycle", $4^{th}$ Intern. Workshop on Advanced Motion Control, Mie, Japan, vol. 1, pp. 127–132, 1998.

Ulyanov S.V., Feng Q., Yamafuji K. and Ulyanov V.S., (1998), "Stochastic analysis of nonlinear dynamic system with time–dependent structure, Pts. 1, 2", Probabilistic Engineering Mechanics (published), no month.

Ulyanov, S.V., Yamafuji, K., Gradetsky V.G., and Pagni, A., "Expert Fuzzy–Neuro Controller Desing for Wall Climbing Robot for Decontamination of Nuclear–Power Station", Journal of Robotics and Mechatronics, vol. 7, No. 1, 1995, pp. 75–86, Dec. 13, 1994.

Ulyanov, S.V., Yamafuji, K., Ulyanov, V.S., Kurawaki, I., Hagiwara, T. and Panfilov, S.A., "Computational Intelligence for Robust Control Algorithms of Complex Dynamic Systems with Minimum Entropy Production Part 1: Simulation of Entropy–Like Dynamic Behavior and Lyapunov Stability", Journal of Advanced Computational Intelligence, vol. 3, No. 2, 1999, pp. 82–98, Dec. 1, 1998.

Ulyanov, V.S., Yamafuji, K., Ulyanov, S.V., and Tanaka K., "Computational Intelligence with New Physical Controllability Measure sure Robust Control Algorithm of Extension-–Cableless Robotic Unicycle", Journal of Advanced Computational Intelligence, vol. 3, No. 2, 1999, pp. 136–147, Apr. 1999.

V.S. Ulyanov, Watanabe, S. Yamafuji, K., Ulyanov, S.V., Litvintseva, L.V., and Kurawaki, I. "Intelligent robust control of a robotic unicycle based on a new physical measure for mechanical controllability" Advanced Robotics, vol. 12, No. 4 1998, pp. 455–481, No Month.

Ulyanov, S.V., Yamafuji, K., Miyagawa, K., Tanaka, T. and Fukuda T., "Intelligent Fuzzy Motion Control of Mobile Robot for Service Use", IEEE/RSJ International Conference on Intelligent Robots and Systems, Human Robot Interaction and Cooperative Robots, vol. 3, Aug. 5–9, 1995 pp.486–491.

Ulyanov, S.V., Yamafuji, K., Arai, F., and Fukuda T., "Modeling of Micro–Nano–Robots and Physical Limit of Micro Control" Journal of the Robotics Society of Japan, vol. 14, No. 8, Nov. 1996, pp.18–21.

van Rooij A.J.F., Jain L.C. and Johnson R.P., (1997), "Neural Network Training Using Genetic Algorithms" (Machine Perception and Artificial Intelligence, vol. 26). World Scientific Pub., SGP, No Month.

Vasilieva O.I., Ionov I.P. and Ulyanov S.V., (1989), "Dual control of the artificial ventilation process with use of a fuzzy controller in the feedback circuit", Biomedical Eng., vol. 23, No. 1, pp. 7–16.

Wu J.C. and Llu T.S., (1995), "Fuzzy control of rider–motorcycle system using genetic algorithm and auto–tuning", Mechatronics, vol. 4, No. 4, pp. 441–455, No Month.

Wu J.C. and Llu T.S., (1996), "Fuzzy control stabilization with applications to motorcycle control", IEEE Transactions on Systems, Man and Cybernetics, vol. 26, No. 6, pp. 836–847, No Month.

Zhakharov V.N. and Ulyanov S.V., (1994), "Fuzzy models of intelligent industrial controllers and control systems. Pts 1", Journal of Computer and Systems Sciences International, vol. 32, No. 1, pp. 123–144, No Month.

Zhakharov V.N. and Ulyanov S.V., (1995), "Fuzzy models of intelligent industrial controllers and control systems. Pts 2, 3", Journal of Computer and Systems Sciences International, vol. 33, No. 2, pp. 94–108; 117–136, Mar.–Apr.

OPTIMIZATION CONTROL METHOD FOR SHOCK ABSORBER

REFERENCE TO RELATED APPLICATION

The present application claims priority benefit of Japanese Application No. Hei 11-009954, filed Jan. 18, 1999, the disclosure of which is hereby included by reference in its entirety.

BACKGROUND OF THE INVENTION

1. Field of the Invention

This invention relates to an optimization control method for a shock absorber having a non-linear kinetic characteristic.

2. Description of the Related Art

Feedback control systems are widely used to maintain the output of a dynamic system at a desired value in spite of external disturbance forces that would move the output away from the desired value. For example, a household furnace controlled by a thermostat is an example of a feedback control system. The thermostat continuously measures the air temperature of the house, and when the temperature falls below a desired minimum temperature, the thermostat turns the furnace on. When the furnace has warmed the air above the desired minimum temperature, then the thermostat turns the furnace off. The thermostat-furnace system maintains the household temperature at a constant value in spite of external disturbances such as a drop in the outside air temperature. Similar types of feedback control are used in many applications.

A central component in a feedback control system is a controlled object, otherwise known as a process "plant," whose output variable is to be controlled. In the above example, the plant is the house, the output variable is the air temperature of the house, and the disturbance is the flow of heat through the walls of the house. The plant is controlled by a control system. In the above example, the control system is the thermostat in combination with the furnace. The thermostat-furnace system uses simple on-off feedback control to maintain the temperature of the house. In many control environments, such as motor shaft position or motor speed control systems, simple on-off feedback control is insufficient. More advanced control systems rely on combinations of proportional feedback control, integral feedback control, and derivative feedback control. Feedback that is the sum of proportional plus integral plus derivative feedback is often referred to as PID control.

The PID control system is a linear control system that is based on a dynamic model of the plant. In classical control systems, a linear dynamic model is obtained in the form of dynamic equations, usually ordinary differential equations. The plant is assumed to be relatively linear, time invariant, and stable. However, many real-world plants are time varying, highly nonlinear, and unstable. For example, the dynamic model may contain parameters (e.g., masses, inductances, aerodynamic coefficients, etc.) which are either poorly known or depend on a changing environment. Under these conditions, a linear PID controller is insufficient.

Evaluating the motion characteristics of a nonlinear plant is often difficult, in part due to the lack of a general analysis method. Conventionally, when controlling a plant with non-linear motion characteristics, it is common to find certain equilibrium points of the plant and the motion characteristics of the plant are linearized in a vicinity near an equilibrium point. Control is then based on evaluating the pseudo (linearized) motion characteristics near the equilibrium point. This technique works poorly, if at all, for plants described by models that are unstable or dissipative. The optimization control for a non-linear kinetic characteristic of a controlled process has not been well developed. A general analysis method for non-linear kinetic characteristic has not been previously available, so a control device suited for the linear-kinetic characteristic is often substituted. Namely, for the controlled process with the non-linear kinetic characteristic, a suitable balance point for the kinetic characteristic is picked. Then, the kinetic characteristic of the controlled process is linearized in a vicinity of the balance point, whereby the evaluation is conducted relative to pseudo-kinetic characteristics.

However, this method has several disadvantageous. Although the optimization control may be accurately conducted around the balance point, its accuracy decreases beyond this balance point. Further, this method cannot typically keep up with various kinds of environmental changes around the controlled process.

Shock absorbers used for automobiles and motor cycles are one example of a controlled process having the non-linear kinetic characteristic. The optimization of the non-linear kinetic characteristic has been long sought because vehicle's turning performances and ride are greatly affected by the damping characteristic and output of the shock absorbers.

SUMMARY OF THE INVENTION

The present invention solves these and other problems by providing a new control system for optimizing a shock absorber having a non-linear kinetic characteristic. The new AI control system uses a fitness (performance) function that is based on the physical laws of minimum entropy. This control system can be used to control complex plants described by nonlinear, unstable, dissipative models. The control system is configured to use smart simulation techniques for controlling the shock absorber (plant).

In one embodiment, the control system comprises a learning system, such as a neural network that is trained by a genetic analyzer. The genetic analyzer uses a fitness function that maximizes sensor information while minimizing entropy production.

In one embodiment, a suspension control uses a difference between the time differential (derivative) of entropy from the learning control unit and the time differential of the entropy inside the controlled process (or a model of the controlled process) as a measure of control performance. In one embodiment, the entropy calculation is based on a thermodynamic model of an equation of motion for a controlled process plant that is treated as an open dynamic system.

The control system is trained by a genetic analyzer. The optimized control system provides an optimum control signal based on data obtained from one or more sensors. For example, in a suspension system, a plurality of angle and position sensors can be used. In an off-line (laboratory) learning mode, fuzzy rules are evolved using a kinetic model (or simulation) of a vehicle and is suspension system. Data from the kinetic model is provided to an entropy calculator which calculates input and output entropy production of the model. The input and output entropy productions are provided to a fitness function calculator that calculates a fitness function as a difference in entropy production rates for the genetic analyzer. The genetic analyzer uses the fitness function to develop a training signal for the off-line control system. Control parameters from the off-line control system are then provided to an online control system in the vehicle.

In one embodiment, the invention includes a method for controlling a nonlinear object (a plant) by obtaining an entropy production difference between a time differentiation ($dS_u/dt$) of the entropy of the plant and a time differentiation ($dS_c/dt$) of the entropy provided to the plant from a controller. A genetic algorithm that uses the entropy production difference as a fitness (performance) function evolves a control rule in an off-line controller. The nonlinear stability characteristics of the plant are evaluated using a Lyapunov function. The genetic analyzer minimizes entropy and maximizes sensor information content. Control rules from the off-line controller are provided to an online controller to control suspension system. In one embodiment, the online controller controls the damping factor of one or more shock absorbers (dampers) in the vehicle suspension system.

In some embodiments, the control method also includes evolving a control rule relative to a variable of the controller by means of a genetic algorithm. The genetic algorithm uses a fitness function based on a difference between a time differentiation of the entropy of the plant ($dS_u/dt$) and a time differentiation ($dS_c/dt$) of the entropy provided to the plant. The variable can be corrected by using the evolved control rule.

In another embodiment, the invention comprises an AI control system adapted to control a nonlinear plant. The AI control system includes a simulator configured to use a thermodynamic model of a nonlinear equation of motion for the plant. The thermodynamic model is based on a Lyapunov function (V), and the simulator uses the function V to analyze control for a state stability of the plant. The AI control system calculates an entropy production difference between a time differentiation of the entropy of said plant ($dS_u/dt$) and a time differentiation ($dS_c/dt$) of the entropy provided to the plant by a low-level controller that controls the plant. The entropy production difference is used by a genetic algorithm to obtain an adaptation function in which the entropy production difference is minimized. The genetic algorithm provides a teaching signal to a fuzzy logic classifier that determines a fuzzy rule by using a learning process. The fuzzy logic controller is also configured to form a control rule that sets a control variable of the controller in the vehicle.

In yet another embodiment, the invention comprises a new physical measure of control quality based on minimum production entropy and using this measure for a fitness function of genetic algorithm in optimal control system design. This method provides a local entropy feedback loop in the control system. The entropy feedback loop provides for optimal control structure design by relating stability of the plant (using a Lyapunov function) and controllability of the plant (based on production entropy of the control system). The control system is applicable to all control systems, including, for example, control systems for mechanical systems, bio-mechanical systems, robotics, electro-mechanical systems, etc.

BRIEF DESCRIPTION OF THE DRAWINGS

The advantages and features of the disclosed invention will readily be appreciated by persons skilled in the art from the following detailed description when read in conjunction with the drawings listed below.

FIG. 7 is a detailed view of the parameters associated with the left-rear wheel from

DETAILED DESCRIPTION

Figure 1:
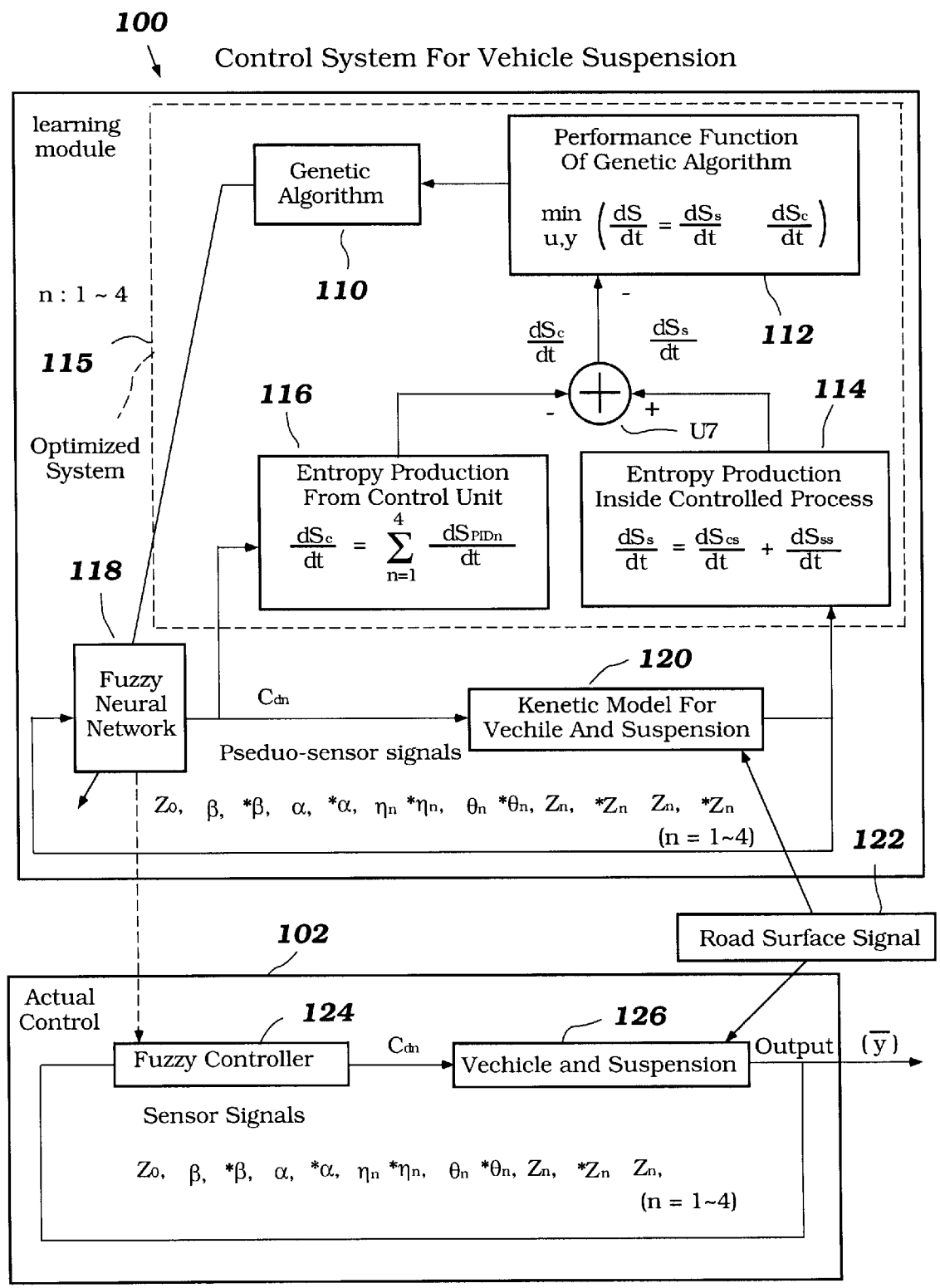
FIG. 1 is a block diagram illustrating a control system for a shock absorber.

FIG. 1 is a block diagram illustrating one embodiment of an optimization control system 100 for controlling one or more shock absorbers in a vehicle suspension system.

This control system 100 is divided in an actual (online) control module 102 in the vehicle and a learning (offline) module 101. The learning module 101 includes a learning controller 118, such as, for example, a fuzzy neural network (FNN). The learning controller (hereinafter "the FNN 118") can be any type of control system configured to receive a training input and adapt a control strategy using the training input. A control output from the FNN 118 is provided to a control input of a kinetic model 120 and to an input of a first entropy production calculator 116. A sensor output from the kinetic model is provided to a sensor input of the FNN 118 and to an input of a second entropy production calculator 114. An output from the first entropy production calculator 116 is provided to a negative input of an adder 119 and an output from the second entropy calculator 114 is provided to a positive input of the adder 119. An output from the adder 119 is provided to an input of a fitness (performance) function calculator 112. An output from the fitness function calculator 112 is provided to an input of a genetic analyzer 110. A training output from the genetic analyzer 110 is provided to a training input of the FNN 118.

The actual control module 102 includes a fuzzy controller 124. A control-rule output from the FNN 118 is provided to a control-rule input of a fuzzy controller 124. A sensor-data input of the fuzzy controller 124 receives sensor data from a suspension system 126. A control output from the fuzzy controller 124 is provided to a control input of the suspension system 126. A disturbance, such as a road-surface signal, is provided to a disturbance input of the kinetic model 120 and to the vehicle and suspension system 126.

The actual control module 102 is installed into a vehicle and controls the vehicle suspension system 126. The learning module 101 optimizes the actual control module 102 by using the kinetic model 120 of the vehicle and the suspension system 126. After the learning control module 101 is optimized by using a computer simulation, one or more parameters from the FNN 118 are provided to the actual control module 101.

In one embodiment, a damping coefficient control-type shock absorber is employed, wherein the fuzzy controller 124 outputs signals for controlling a throttle in an oil passage in one or more shock absorbers in the suspension system 126.

Figure 2A:
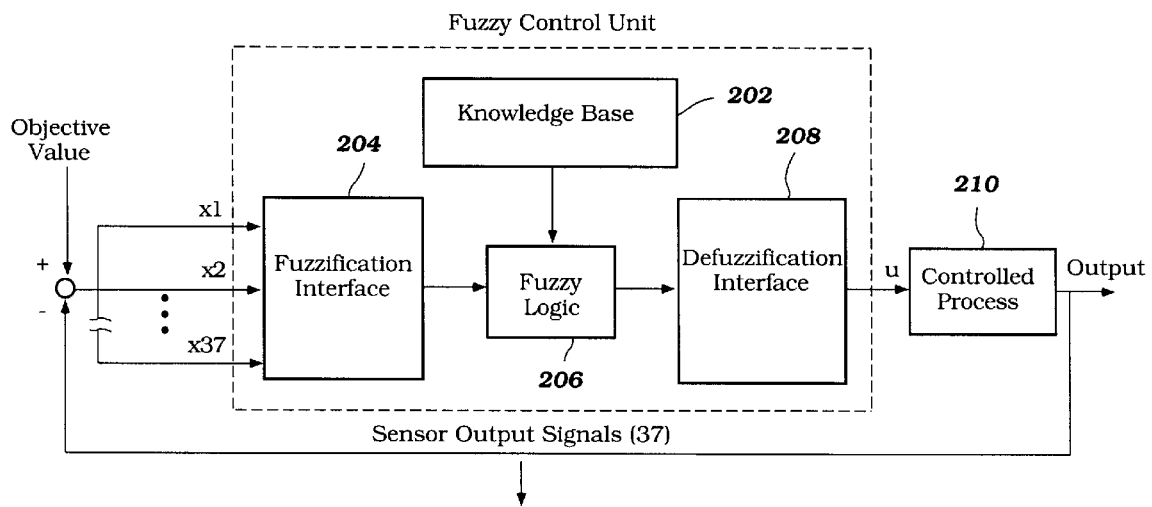
FIG. 2A is a block diagram showing a fuzzy control unit that estimates an optimal throttle amount for each shock absorber and outputs signals according to the predetermined fuzzy rule based on the detection results.
Figure 2B:
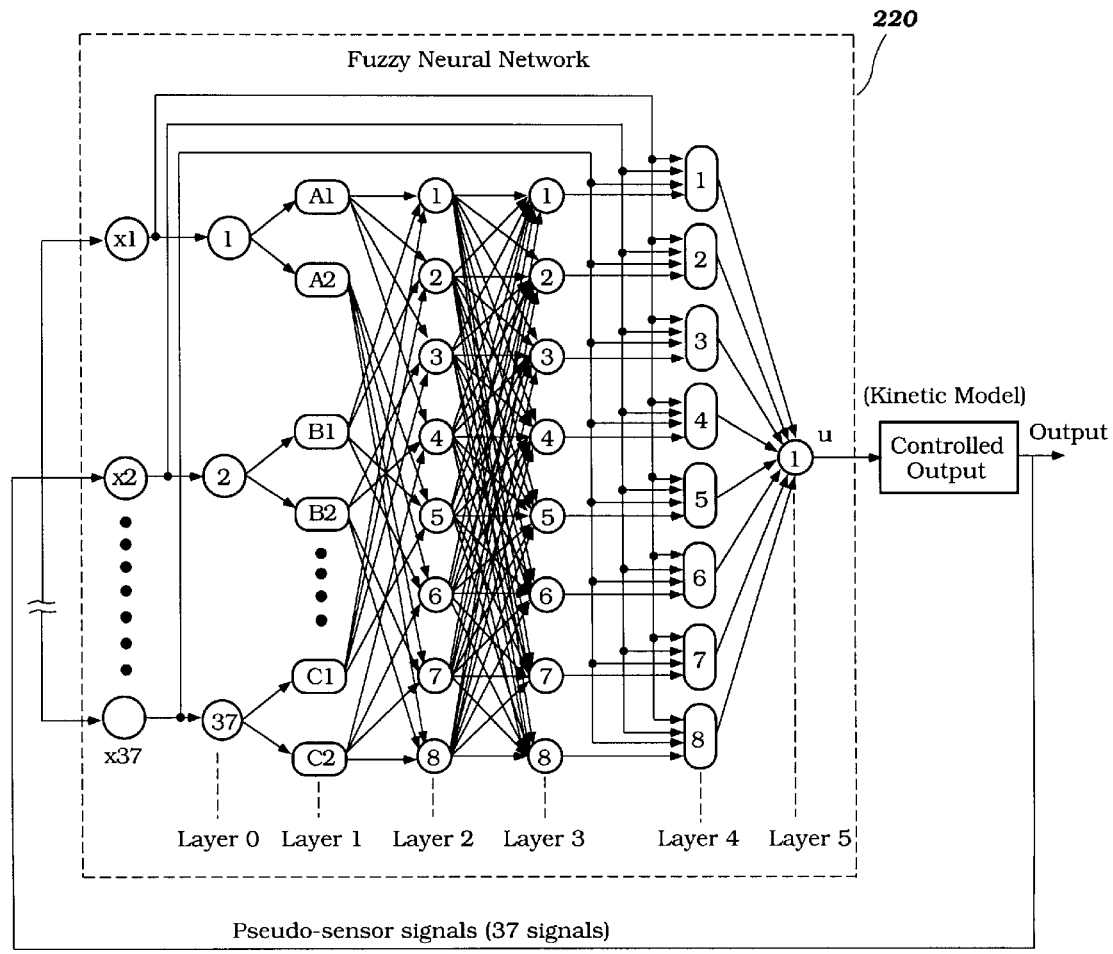
FIG. 2B is a block diagram showing a learning control unit having a fuzzy neural network.

FIGS. 2A and 2B illustrate one embodiment of a fuzzy controller 200 suitable for use in the FNN 118 and/or the fuzzy controller 124. In the fuzzy controller 200, data from one or more sensors is provided to a fuzzification interface 204. An output from the fuzzification interface 204 is provided to an input of a fuzzy logic module 206. The fuzzy logic module 206 obtains control rules from a knowledge-base 202. An output from the fuzzy logic module 206 is provided to a de-fuzzification interface 208. A control output from the de-fuzzification interface 208 is provided to a controlled process 210 (e.g. the suspension system 126, the kinetic model 120, etc.).

The sensor data shown in FIGS. 1 and 2, can include, for example, vertical positions of the vehicle $z_0$, pitch angle $\beta$, roll angle $\alpha$, suspension angle $\eta$ for each wheel, arm angle $\theta$ for each wheel, suspension length $z_6$ for each wheel, and/or deflection $z_{12}$ for each wheel. The fuzzy control unit estimates the optimal throttle amount for each shock absorber and outputs signals according to the predetermined fuzzy rule based on the detection results.

The learning module 101 includes a kinetic model 120 of the vehicle and suspension to be used with the actual control module 101, a learning control module 118 having a fuzzy neural network corresponding to the actual control module 101 (as shown in FIG. 2B), and an optimizer module 115 for optimizing the learning control module 118.

The optimizer module 115 computes a difference between a time differential of entropy from the FNN 118 (dSc/dt) and a time differential of entropy inside the subject process (i.e., vehicle and suspensions) obtained from the kinetic model 120. The computed difference is used as a performance function by a genetic optimizer 110. The genetic optimizer 110 optimizes (trains) the FNN 118 by genetically evolving a teaching signal. The teaching signal is provided to a fuzzy neural network in the FNN 118. The genetic optimizer 110 optimizes the fuzzy neural network (FNN) such that an output of the FNN, when used as an input to the kinetic module 120, reduces the entropy difference between the time differentials of both entropy values.

The fuzzy rules from the FNN 118 are then provided to a fuzzy controller 124 in the actual control module 102. Thus, the fuzzy rule (or rules) used in the fuzzy controller 124 (in the actual control module 101), are determined based on an output from the FNN 118 (in the learning control unit), that is optimized by using the kinetic model 120 for the vehicle and suspension.

The genetic algorithm 110 evolves an output signal a based on a performance function $f$. Plural candidates for $\alpha$ are produced and these candidates are paired according to which plural chromosomes (parents) are produced. The chromosomes are evaluated and sorted from best to worst by using the performance function $f$. After the evaluation for all parent chromosomes, good offspring chromosomes are selected from among the plural parent chromosomes, and some offspring chromosomes are randomly selected. The selected chromosomes are crossed so as to produce the parent chromosomes for the next generation. Mutation may also be provided. The second-generation parent chromosomes are also evaluated (sorted) and go through the same evolutionary process to produce the next-generation (i.e., third-generation) chromosomes. This evolutionary process is continued until it reaches a predetermined generation or the evaluation function $f$ finds a chromosome with a certain value. The outputs of the genetic algorithm are the chromosomes of the last generation. These chromosomes become input information $\alpha$ provided to the FNN 118.

In the FNN 118, a fuzzy rule to be used in the fuzzy controller 124 is selected from a set of rules. The selected rule is determined based on the input information $\alpha$ from the genetic algorithm 110. Using the selected rule, the fuzzy controller 124 generates a control signal $C_{dn}$ for the vehicle and suspension system 126. The control signal adjusts the operation (damping factor) of one or more shock absorbers to produce a desired ride and handling quality for the vehicle.

The genetic algorithm 110 is a nonlinear optimizer that optimizes the performance function $f$. As is the case with most optimizers, the success or failure of the optimization often ultimately depends on the selection of the performance function $f$.

The fitness function 112 $f$ for the genetic algorithm 110 is given by $$f = \min \frac{dS}{dt} \quad (1)$$

where $$\frac{dS}{dt} = \left( \frac{dS_c}{dt} - \frac{dS_u}{dt} \right) \quad (2)$$

where $$\frac{dS}{dt} = \left( \frac{dS_c}{dt} - \frac{dS_u}{dt} \right) \quad (2)$$

The quantity $dS_u/dt$ represents the rate of entropy production in the output x(t) of the kinetic model 120. The quantity $dS_c/dt$ represents the rate of entropy production in the output $C_{dn}$ of the FNN 118.

Entropy is a concept that originated in physics to characterize the heat, or disorder, of a system. It can also be used to provide a measure of the uncertainty of a collection of events, or, for a random variable, a distribution of probabilities. The entropy function provides a measure of the lack of information in the probability distribution. To illustrate, assume that p(x) represents a probabilistic description of the known state of a parameter, that p(x) is the probability that the parameter is equal to z. If p(x) is uniform, then the parameter p is equally likely to hold any value, and an observer will know little about the parameter p. In this case, the entropy function is at its maximum. However, if one of the elements of p(z) occurs with a probability of one, then an observer will know the parameter p exactly and have complete information about p. In this case, the entropy of p(x) is at its minimum possible value. Thus, by providing a measure of uniformity, the entropy function allows quantification of the information on a probability distribution.

It is possible to apply these entropy concepts to parameter recovery by maximizing the entropy measure of a distribution of probabilities while constraining the probabilities so that they satisfy a statistical model given measured moments or data. Though this optimization, the distribution that has the least possible information that is consistent with the data may be found. In a sense, one is translating all of the information in the data into the form of a probability distribution. Thus, the resultant probability distribution contains only the information in the data without imposing additional structure. In general, entropy techniques are used to formulate the parameters to be recovered in terms of probability distributions and to describe the data as constraints for the optimization. Using entropy formulations, it is possible to perform a wide range of estimations, address ill-posed problems, and combine information from varied sources without having to impose strong distributional assumptions.

Entropy-based optimization of the FNN is based on obtaining the difference between a time differentiation ($dS_u/dt$) of the entropy of the plant and a time differentiation ($dS_c/dt$) of the entropy provided to the kinetic model from the FNN 118 controller that controls the kinetic model 120, and then evolving a control rule using a genetic algorithm. The time derivative of the entropy is called the entropy production rate. The genetic algorithm 110 minimizes the difference between the entropy production rate of the kinetic model 120 (that is, the entropy production of the controlled process) ($dS_u/dt$) and the entropy production rate of the low-level controller ($dS_c/dt$) as a performance function. Nonlinear operation characteristics of the kinetic model (the kinetic model represents a physical plant) are calculated by using a Lyapunov function.

The dynamic stability properties of the model 120 near an equilibrium point can be determined by use of Lyapunov functions as follows. Let V(x) be a continuously differentiable scalar function defined in a domain $D \subset R^n$ that contains the origin. The function V(x) is said to be positive definite if V(0)=0 and V(x)>0 for x≠0. The function V(x) is said to be positive semidefinite if V(x)≧0 for all x. A function V(x) is said to be negative definite or negative semidefinite if –V(x) is positive definite or positive semidefinite, respectively. The derivative of V along the trajectories ẋ=ƒ(x) is given by:

$$\dot{V}(x) = \sum_{i=1}^{n} \frac{\partial V}{\partial x_i} \dot{x}_i = \frac{\partial V}{\partial x} f(x) \qquad (3)$$

where $\partial V/\partial x$ is a row vector whose ith component is $\partial V/\partial x_i$ and the components of the n-dimensional vector ƒ(x) are locally Lipschitz functions of x, defined for all x in the domain D. The Lyapunov stability theorem states that the origin is stable if there is a continuously differentiable positive definite function V(x) so that $\dot{V}(x)$ is negative definite. A function V(x) satisfying the conditions for stability is called a Lyapunov function.

The genetic algorithm realizes 110 the search of optimal controllers with a simple structure using the principle of minimum entropy production.

The fuzzy tuning rules are shaped by the learning system in the fuzzy neural network 118 with acceleration of fuzzy rules on the basis of global inputs provided by the genetic algorithm 110.

In general, the equation of motion for non-linear systems is expressed as follows by defining "q" as generalized coordinates, "f" and "g" random functions, "Fe" as control input.

$$q = f(\dot{q}, q) + g(q) - F_e \qquad (a)$$

In the above equation, when the dissipation term and control input in the second term are multiplied by a speed, the following equation can be obtained for the time differentials of the entropy.

$$\frac{dS}{dt} = f(\dot{q}, q)\dot{q} - Feq = \frac{dS_u}{dt} - \frac{dS_c}{dt} \qquad (b)$$

dS/dt is a time differential of entropy for the entire system. $dS_u/dt$ is a time differential of entropy for the plant, that is the controlled process. $dS_c/dt$ is a time differential of entropy for the control system for the plant.

The following equation is selected as Lyapunov function for the equation (a).

$$V = \left(\sum q^2 + S^2\right)/2 = \left(\sum q^2 + (S_u - S_c)^2\right)/2 \qquad (c)$$

The greater the integral of the Lyapunov function, the more stable the kinetic characteristic of the plant.

Thus, for the stabilization of the systems, the following equation is introduced as a relationship between the Lyapunov function and entropy production for the open dynamic system.

$$DV/dt = \sum qq + (S_u - S_c)(dS_u/dt - dS_c/dt) < 0 \qquad (d)$$

$$\sum qq < (S_u - S_c)(dS_c/dt - dS_u/dt) \qquad (e)$$

A Duffing oscillator is one example of a dynamic system. In the Duffing oscillator, the equation of motion is expressed as:

$$\ddot{x} + \dot{x} + x + x^3 = 0 \qquad (f)$$

the entropy production from this equation is calculated as:

$$dS/dt = x^3 \qquad (g)$$

Further, Lyapunov function relative to the equation (f) becomes:

$$V = (1/2)\dot{x}^2 + U(x), \quad U(x) = (1/4)x^4 - (1/2)x^2 \qquad (h)$$

If the equation (f) is modified by using the equation (h), it is expressed as:

$$\ddot{x} + \dot{x} + \frac{\partial U(x)}{\partial x} = 0 \qquad (i)$$

If the left side of the equation (i) is multiplied by x as:

$$\ddot{x} + \dot{x} + \frac{\partial U(x)}{\partial x} x = 0$$

Then, if the Lyapunov function is differentiated by time, it becomes:

$$dV/dt = x\ddot{x} + (\partial U(x)/\partial x)\dot{x}$$

If this is converted to a simple algebra, it becomes:

$$dV/dt = (1/T)(dS/dt) \qquad (j)$$

wherein "T" is a normalized factor.

dS/dt is used for evaluating the stability of the system. $dS_u/dt$ is a time change of the entropy for the plant. $–dS_c/dt$ is considered to be a time change of negative entropy given to the plant from the control system.

The present invention calculates waste such as disturbances for the entire control system of the plant based on a difference between the time differential $dS_u/dt$ of the entropy of the plant that is a controlled process and time differential dSu/dt of the entropy of the plant. Then, the evaluation is conducted by relating to the stability of the controlled process that is expressed by Lyapunov function. In other words, the smaller the difference of both entropy, the more stable the operation of the plants.

Suspension Control

In one embodiment, the control system 100 of FIGS. 1–2 is applied to a suspension control system, such as, for example, in an automobile, truck, tank, motorcycle, etc.

Figure 3:
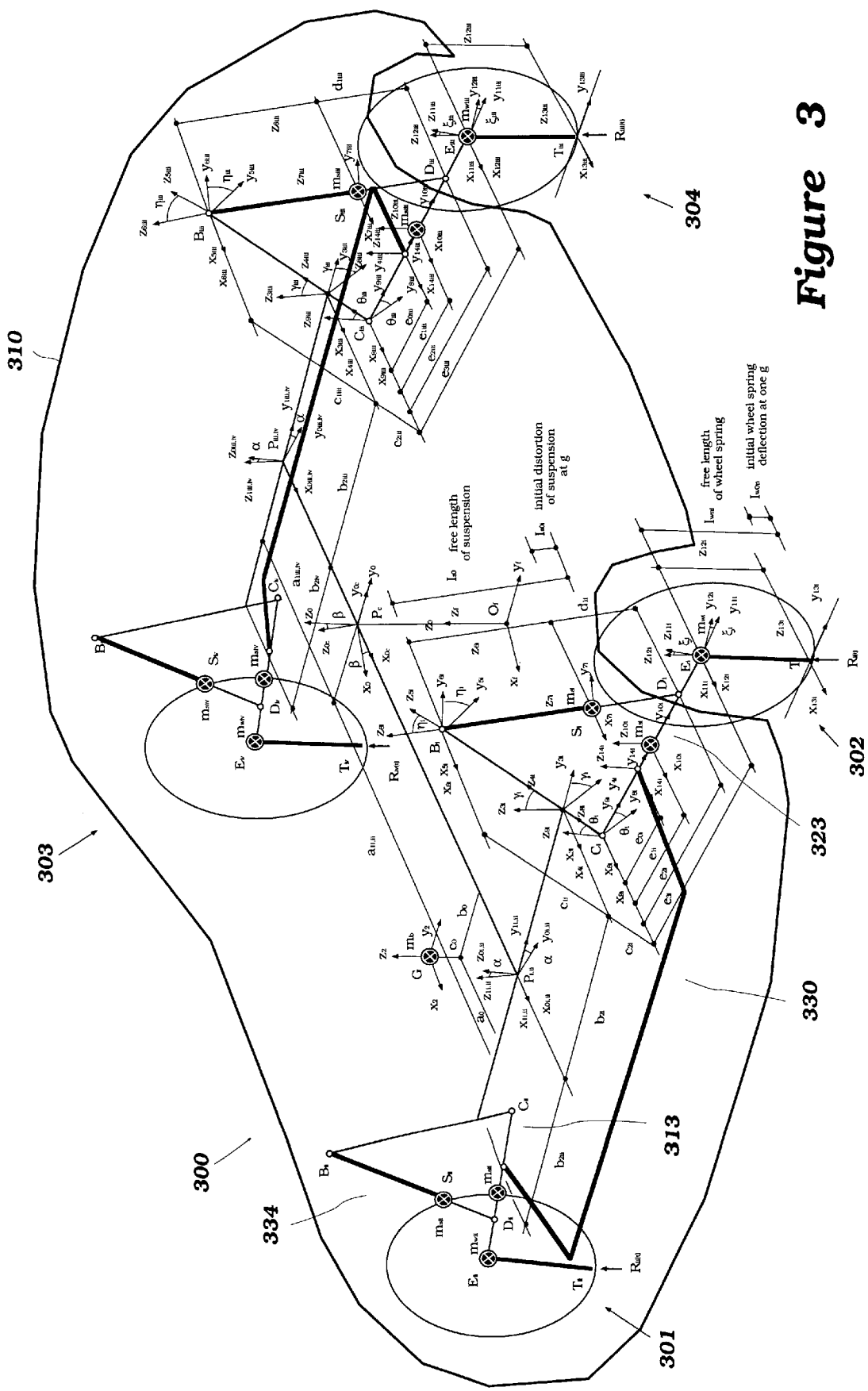
FIG. 3 is a schematic diagram of a four-wheel vehicle suspension system showing the parameters of the kinetic models for the vehicle and suspension system.
Figure 4:
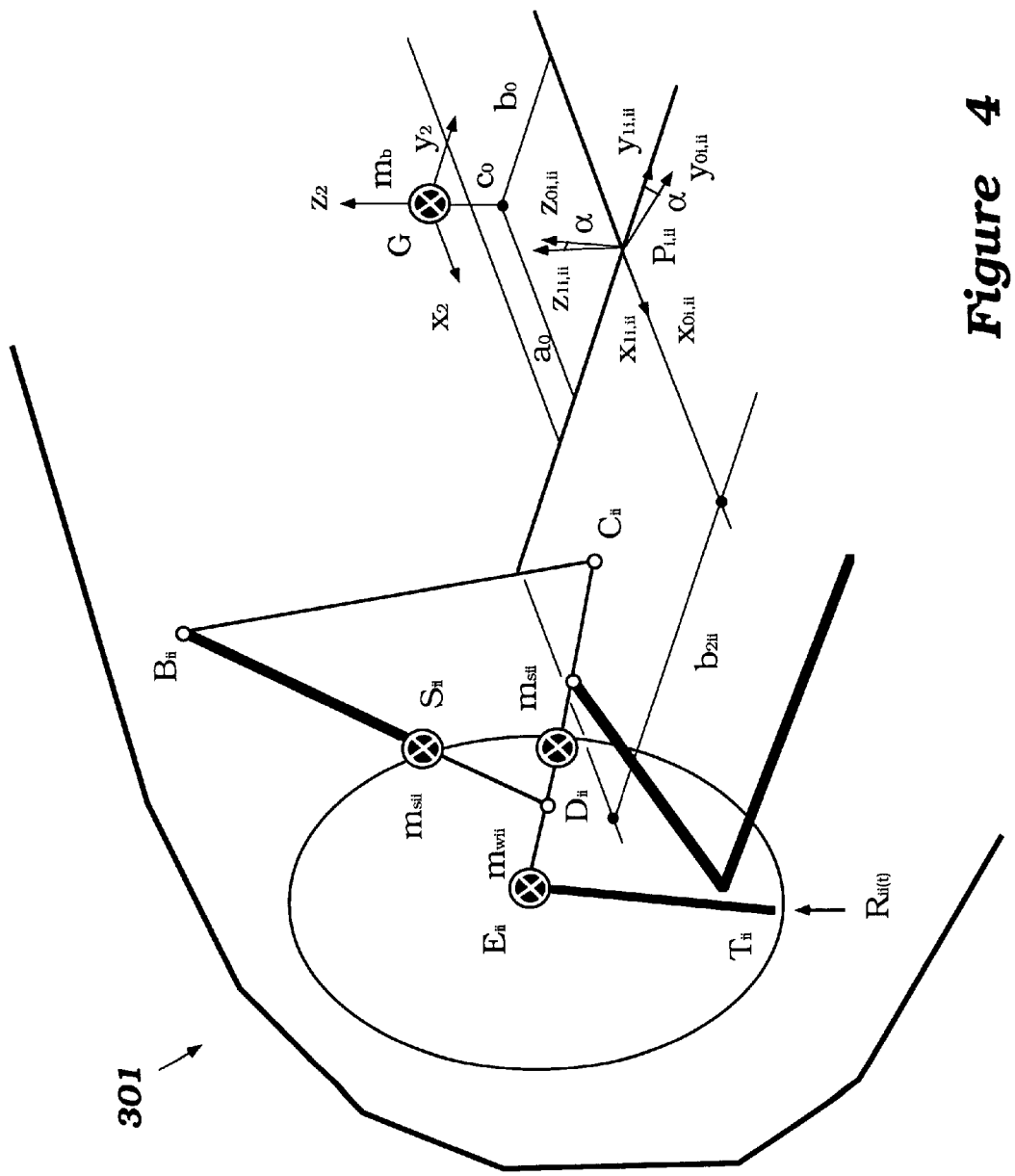
FIG. 4 is a detailed view of the parameters associated with the right-front wheel from FIG. 3.
Figure 5:
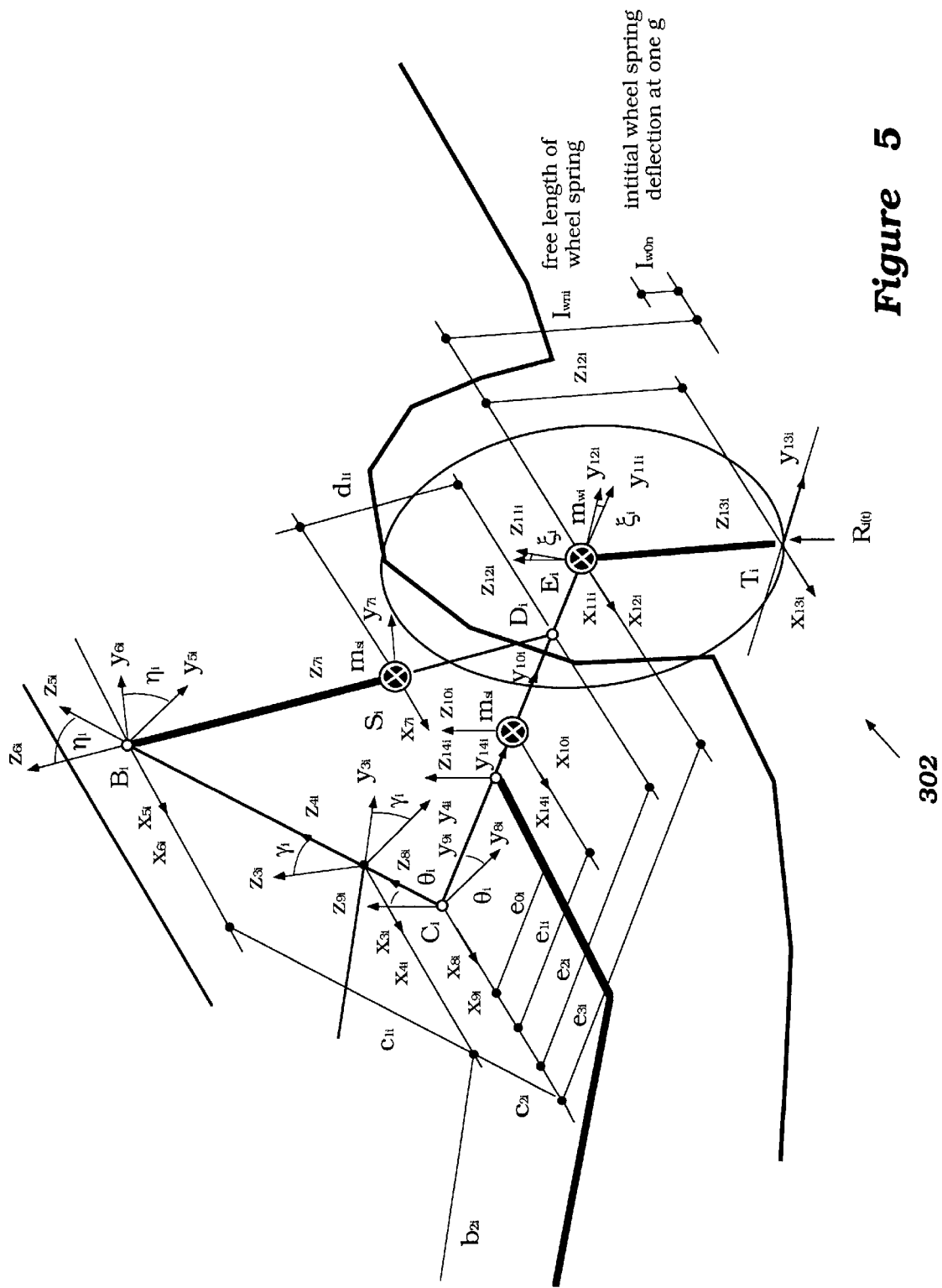
FIG. 5 is a detailed view of the parameters associated with the left-front wheel from FIG. 3.
Figure 6:
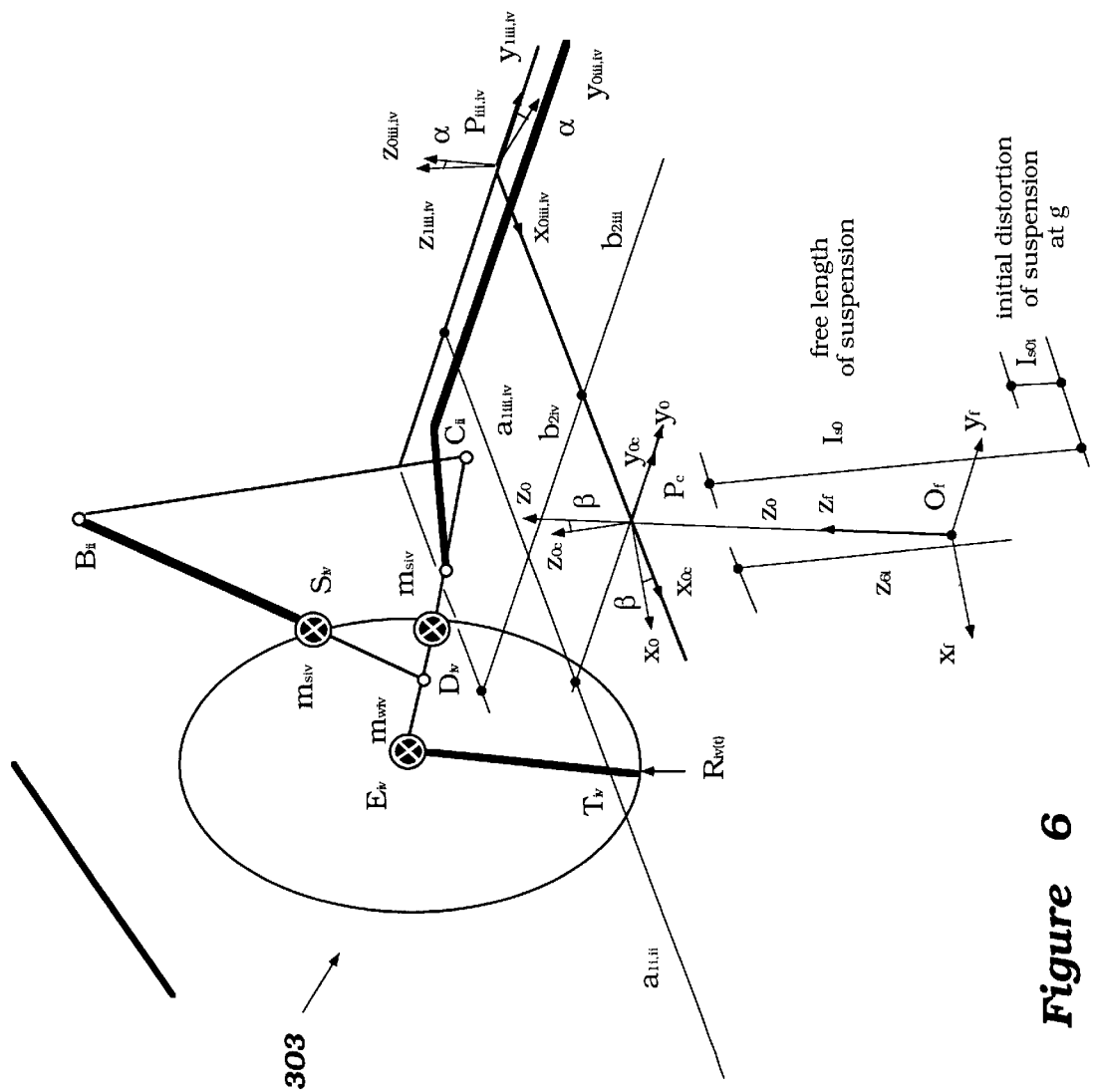
FIG. 6 is a detailed view of the parameters associated with the right-rear wheel from FIG. 3.
Figure 7:
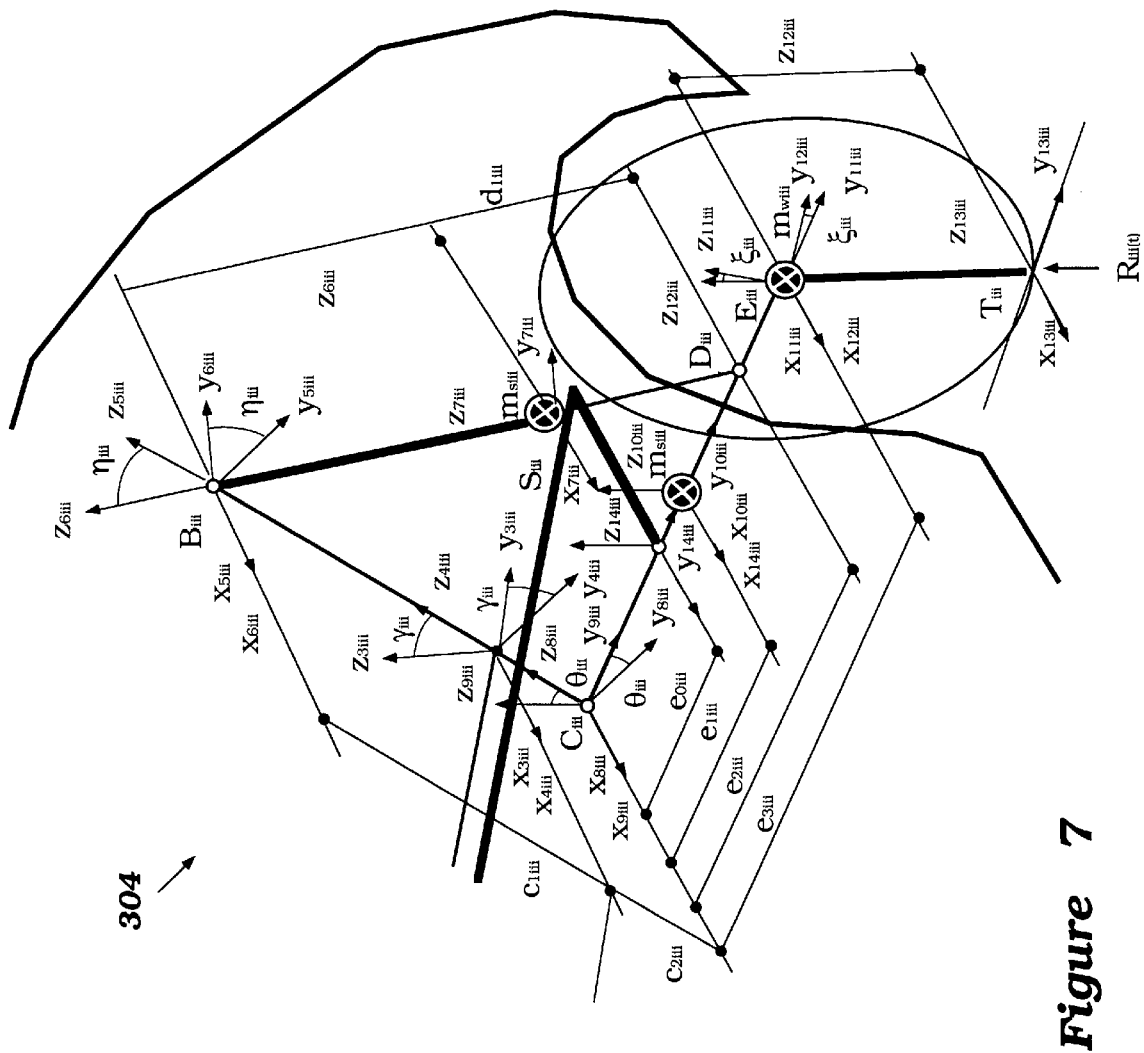

FIG. 3 is a schematic diagram of an automobile suspension system. In FIG. 3, a right front wheel 301 is connected to a right arm 313. A spring and damper linkage 334 controls the angle of the arm 313 with respect to a body 310. A left front wheel 302 is connected to a left arm 323 and a spring and damper 324 controls the angle of the arm 323. A front stabilizer 330 controls the angle of the left arm 313 with respect to the right arm 323. Detail views of the four wheels are shown in FIG. 4–7. Similar linkages are shown for a right rear wheel 303 and a left rear wheel 304. The In one embodiment of the suspension control system, the learning module 101 uses a kinetic model 120 for the vehicle and suspension. FIG. 3 illustrates each parameter of the kinetic models for the vehicle and suspensions. FIGS. 4–7 illustrate exploded views for each wheel as illustrated in FIG. 3.

A kinetic model 120 for the suspension system in the vehicle 300 shown in FIGS. 3–7 is developed as follows.

1. Description of Transformation Matrices 1.1 A Global Reference Coordinate $x_r$, $y_r$, $z_r\{r\}$ is Assumed to be at the Geometric Center $P_r$ of the Vehicle Body 310

The following are the transformation matrices to describe the local coordinates for:

{2} is a local coordinate in which an origin is the center of gravity of the vehicle body 310;

{7} is a local coordinate in which an origin is the center of gravity of the suspension;

{10n} is a local coordinate in which an origin is the center of gravity of the n'th arm;

{12n} is a local coordinate in which an origin is the center of gravity of the n'th wheel;

{13n} is a local coordinate in which an origin is a contact point of the n'th wheel relative to the road surface; and {14} is a local coordinate in which an origin is a connection point of the stabilizer.

Note that in the development that follows, the wheels 302, 301, 304, and 303 are indexed using "i", "ii", "iii", and "iv", respectively.

1.2 Transformation Matrices

As indicated, "n" is a coefficient indicating wheel positions such as i, ii, iii, and iv for left front, right front, left rear and right rear respectively. The local coordinate systems $x_0$, $y_0$, and $z_0$ {0} are expressed by using the following conversion matrix that moves the coordinate {r} along a vector $(0,0,z_0)$ $$^r_0 T = \begin{bmatrix} 1 & 0 & 0 & 0 \\ 0 & 1 & 0 & 0 \\ 0 & 0 & 1 & z_0 \\ 0 & 0 & 0 & 1 \end{bmatrix}$$

Rotating the vector {r} along $y_r$ with an angle $\beta$ makes a local coordinate system $x_{0c}$, $y_{0c}$, $z_{0c}\{0r\}$ with a transformation matrix $^0_{0c}T$.

$$^0_{0c} T = \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \quad (4)$$

Transferring {0r} through the vector $(a_{1n}, 0, 0)$ makes a local coordinate system $x_{0f}$, $y_{0f}$, $z_{0f}$ {0f} with a transformation matrix $^{0r}_{0f}T$.

$$^{0c}_{0n} T = \begin{bmatrix} 1 & 0 & 0 & a_{1n} \\ 0 & 1 & 0 & 0 \\ 0 & 0 & 1 & 0 \\ 0 & 0 & 0 & 1 \end{bmatrix} \quad (5)$$

The above procedure is repeated to create other local coordinate systems with the following transformation matrices.

$$^{0n}_{1n} T = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \quad (6)$$

$$^{1i}_{2} T = \begin{bmatrix} 1 & 0 & 0 & a_0 \\ 0 & 1 & 0 & b_0 \\ 0 & 0 & 1 & c_0 \\ 0 & 0 & 0 & 1 \end{bmatrix} \quad (7)$$

1.3 Coordinates for the Wheels (Index n: i for the Left Front, ii for the Right Front, etc.) are Generated as Follows Transferring {1n} through the vector $(0, b_{2n}, 0)$ makes local coordinate system $x_{3n}$, $y_{3n}$, $z_{3n}$ {3n} with transformation matrix $^{1f}_{3n}T$.

$$^{1n}_{3n} T = \begin{bmatrix} 1 & 0 & 0 & 0 \\ 0 & 1 & 0 & b_{2n} \\ 0 & 0 & 1 & 0 \\ 0 & 0 & 0 & 1 \end{bmatrix} \quad (8)$$

$$^{3n}_{4n} T = \begin{bmatrix} 1 & 0 & 0 & 0 \\ 0 & \cos\gamma_n & -\sin\gamma_n & 0 \\ 0 & \sin\gamma_n & \cos\gamma_n & 0 \\ 0 & 0 & 0 & 1 \end{bmatrix} \quad (9)$$

$$^{4n}_{5n} T = \begin{bmatrix} 1 & 0 & 0 & 0 \\ 0 & 1 & 0 & 0 \\ 0 & 0 & 1 & c_{1n} \\ 0 & 0 & 0 & 1 \end{bmatrix} \quad (10)$$

$${}^{5n}_{6n}T = \begin{bmatrix} 1 & 0 & 0 & 0 \\ 0 & \cos\eta_n & -\sin\eta_n & 0 \\ 0 & \sin\eta_n & \cos\eta_n & 0 \\ 0 & 0 & 0 & 1 \end{bmatrix} \quad (11)$$

$${}^{6n}_{7n}T = \begin{bmatrix} 1 & 0 & 0 & 0 \\ 0 & 1 & 0 & 0 \\ 0 & 0 & 1 & z_{6n} \\ 0 & 0 & 0 & 1 \end{bmatrix} \quad (12)$$

$${}^{4n}_{8n}T = \begin{bmatrix} 1 & 0 & 0 & 0 \\ 0 & 1 & 0 & 0 \\ 0 & 0 & 1 & c_{2n} \\ 0 & 0 & 0 & 1 \end{bmatrix} \quad (13)$$

$${}^{8n}_{9n}T = \begin{bmatrix} 1 & 0 & 0 & 0 \\ 0 & \cos\theta_n & -\sin\theta_n & 0 \\ 0 & \sin\theta_n & \cos\theta_n & 0 \\ 0 & 0 & 0 & 1 \end{bmatrix} \quad (14)$$

$${}^{9n}_{10n}T = \begin{bmatrix} 1 & 0 & 0 & 0 \\ 0 & 1 & 0 & e_{1n} \\ 0 & 0 & 1 & 0 \\ 0 & 0 & 0 & 1 \end{bmatrix} \quad (15)$$

$${}^{9n}_{11n}T = \begin{bmatrix} 1 & 0 & 0 & 0 \\ 0 & 1 & 0 & e_{3n} \\ 0 & 0 & 1 & 0 \\ 0 & 0 & 0 & 1 \end{bmatrix} \quad (16)$$

$${}^{11n}_{12n}T = \begin{bmatrix} 1 & 0 & 0 & 0 \\ 0 & \cos\zeta_n & -\sin\zeta_n & 0 \\ 0 & \sin\zeta_n & \cos\zeta_n & 0 \\ 0 & 0 & 0 & 1 \end{bmatrix} \quad (17)$$

$${}^{12n}_{13n}T = \begin{bmatrix} 1 & 0 & 0 & 0 \\ 0 & 1 & 0 & 0 \\ 0 & 0 & 1 & z_{12n} \\ 0 & 0 & 0 & 1 \end{bmatrix} \quad (18)$$

$${}^{9n}_{14n}T = \begin{bmatrix} 1 & 0 & 0 & 0 \\ 0 & 1 & 0 & e_{0n} \\ 0 & 0 & 1 & 0 \\ 0 & 0 & 0 & 1 \end{bmatrix} \quad (19)$$

1.4 Some Matrices are Sub-Assembled to Make the Calculation Simpler $${}^{r}_{1n}T = {}^{r}_{0}T {}^{0c}_{0n}T {}^{0n}_{1n}T \quad (20)$$

$$= \begin{bmatrix} 1 & 0 & 0 & 0 \\ 0 & 1 & 0 & 0 \\ 0 & 0 & 1 & z_0 \\ 0 & 0 & 0 & 1 \end{bmatrix} \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \begin{bmatrix} 1 & 0 & 0 & a_{1n} \\ 0 & 1 & 0 & 0 \\ 0 & 0 & 1 & 0 \\ 0 & 0 & 0 & 1 \end{bmatrix} \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}$$

$$= \begin{bmatrix} \cos\beta & 0 & \sin\beta & a_{1n}\cos\beta \\ 0 & 1 & 0 & 0 \\ -\sin\beta & 0 & \cos\beta & z_0 - a_1\sin\beta \\ 0 & 0 & 0 & 1 \end{bmatrix} \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}$$

$$= \begin{bmatrix} \cos\beta & \sin\beta\sin\alpha & \sin\beta\cos\alpha & a_{1n}\cos\beta \\ 0 & \cos\alpha & -\sin\alpha & 0 \\ -\sin\beta & \cos\beta\sin\alpha & \cos\beta\cos\alpha & z_0 - a_{1n}\sin\beta \\ 0 & 0 & 0 & 1 \end{bmatrix}$$

$${}^{r}_{4n}T = {}^{r}_{1n}T\,{}^{1n}_{3n}T\,{}^{3n}_{4n}T \quad (21)$$

$$= \begin{bmatrix} \cos\beta & \sin\beta\sin\alpha & \sin\beta\cos\alpha & a_{1n}\cos\beta \\ 0 & \cos\alpha & -\sin\alpha & 0 \\ -\sin\beta & \cos\beta\sin\alpha & \cos\beta\cos\alpha & z_0 - a_{1n}\sin\beta \\ 0 & 0 & 0 & 1 \end{bmatrix} \begin{bmatrix} 1 & 0 & 0 & 0 \\ 0 & 1 & 0 & b_{2n} \\ 0 & 0 & 1 & 0 \\ 0 & 0 & 0 & 1 \end{bmatrix} \cdot \begin{bmatrix} 1 & 0 & 0 & 0 \\ 0 & \cos\gamma_n & -\sin\gamma_n & 0 \\ 0 & \sin\gamma_n & \cos\gamma_n & 0 \\ 0 & 0 & 0 & 1 \end{bmatrix}$$

$$= \begin{bmatrix} \cos\beta & \sin\beta\sin(\alpha+\gamma_n) & \sin\beta\cos(\alpha+\gamma_n) & b_{2n}\sin\beta\sin\alpha + a_{1n}\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & z_0 - b_{2n}\cos\beta\sin\alpha - a_{1n}\sin\beta \\ 0 & 0 & 0 & 1 \end{bmatrix}$$

$${}^{4n}_{7n}T = {}^{4n}_{5n}T\,{}^{5n}_{6n}T\,{}^{6n}_{7n}T \quad (22)$$

$$= \begin{bmatrix} 1 & 0 & 0 & 0 \\ 0 & 1 & 0 & 0 \\ 0 & 0 & 1 & c_{1n} \\ 0 & 0 & 0 & 1 \end{bmatrix} \begin{bmatrix} 1 & 0 & 0 & 0 \\ 0 & \cos\eta_n & -\sin\eta_n & 0 \\ 0 & \sin\eta_n & \cos\eta_n & 0 \\ 0 & 0 & 0 & 1 \end{bmatrix} \begin{bmatrix} 1 & 0 & 0 & 0 \\ 0 & 1 & 0 & 0 \\ 0 & 0 & 1 & z_{6n} \\ 0 & 0 & 0 & 1 \end{bmatrix}$$

$$= \begin{bmatrix} 1 & 0 & 0 & 0 \\ 0 & \cos\eta_n & -\sin\eta_n & 0 \\ 0 & \sin\eta_n & \cos\eta_n & c_{1n} \\ 0 & 0 & 0 & 1 \end{bmatrix} \begin{bmatrix} 1 & 0 & 0 & 0 \\ 0 & 1 & 0 & 0 \\ 0 & 0 & 1 & z_{6n} \\ 0 & 0 & 0 & 1 \end{bmatrix}$$

$$= \begin{bmatrix} 1 & 0 & 0 & 0 \\ 0 & \cos\eta_n & -\sin\eta_n & -z_{6n}\sin\eta_n \\ 0 & \sin\eta_n & \cos\eta_n & c_{1n} + z_{6n}\cos\eta_n \\ 0 & 0 & 0 & 1 \end{bmatrix}$$

$${}^{4n}_{10n}T = {}^{4n}_{8n}T\,{}^{8n}_{9n}T\,{}^{9n}_{10n}T \quad (23)$$

$$= \begin{bmatrix} 1 & 0 & 0 & 0 \\ 0 & 1 & 0 & 0 \\ 0 & 0 & 1 & c_{2n} \\ 0 & 0 & 0 & 1 \end{bmatrix} \begin{bmatrix} 1 & 0 & 0 & 0 \\ 0 & \cos\theta_n & -\sin\theta_n & 0 \\ 0 & \sin\theta_n & \cos\theta_n & 0 \\ 0 & 0 & 0 & 1 \end{bmatrix} \begin{bmatrix} 1 & 0 & 0 & 0 \\ 0 & 1 & 0 & e_{1n} \\ 0 & 0 & 1 & 0 \\ 0 & 0 & 0 & 1 \end{bmatrix}$$

$$= \begin{bmatrix} 1 & 0 & 0 & 0 \\ 0 & \cos\theta_n & -\sin\theta_n & 0 \\ 0 & \sin\theta_n & \cos\theta_n & c_{2n} \\ 0 & 0 & 0 & 1 \end{bmatrix} \begin{bmatrix} 1 & 0 & 0 & 0 \\ 0 & 1 & 0 & e_{1n} \\ 0 & 0 & 1 & 0 \\ 0 & 0 & 0 & 1 \end{bmatrix}$$

$$= \begin{bmatrix} 1 & 0 & 0 & 0 \\ 0 & \cos\theta_n & -\sin\theta_n & e_{1n}\cos\theta_n \\ 0 & \sin\theta_n & \cos\theta_n & c_{2n} + e_{1n}\sin\theta_n \\ 0 & 0 & 0 & 1 \end{bmatrix}$$

$${}^{4n}_{12n}T = {}^{4n}_{8n}T\,{}^{8n}_{9n}T\,{}^{9n}_{11n}T\,{}^{11n}_{12n}T \quad (24)$$

$$= \begin{bmatrix} 1 & 0 & 0 & 0 \\ 0 & 1 & 0 & 0 \\ 0 & 0 & 1 & c_{2n} \\ 0 & 0 & 0 & 1 \end{bmatrix} \begin{bmatrix} 1 & 0 & 0 & 0 \\ 0 & \cos\theta_n & -\sin\theta_n & 0 \\ 0 & \sin\theta_n & \cos\theta_n & 0 \\ 0 & 0 & 0 & 1 \end{bmatrix} \begin{bmatrix} 1 & 0 & 0 & 0 \\ 0 & 1 & 0 & e_{3n} \\ 0 & 0 & 1 & 0 \\ 0 & 0 & 0 & 1 \end{bmatrix} \begin{bmatrix} 1 & 0 & 0 & 0 \\ 0 & \cos\zeta_n & -\sin\zeta_n & 0 \\ 0 & \sin\zeta_n & \cos\zeta_n & 0 \\ 0 & 0 & 0 & 1 \end{bmatrix}$$

$$= \begin{bmatrix} 1 & 0 & 0 & 0 \\ 0 & \cos\theta_n & -\sin\theta_n & 0 \\ 0 & \sin\theta_n & \cos\theta_n & c_{2n} \\ 0 & 0 & 0 & 1 \end{bmatrix} \begin{bmatrix} 1 & 0 & 0 & 0 \\ 0 & 1 & 0 & e_{3n} \\ 0 & 0 & 1 & 0 \\ 0 & 0 & 0 & 1 \end{bmatrix} \begin{bmatrix} 1 & 0 & 0 & 0 \\ 0 & \cos\zeta_n & -\sin\zeta_n & 0 \\ 0 & \sin\zeta_n & \cos\zeta_n & 0 \\ 0 & 0 & 0 & 1 \end{bmatrix}$$

$$= \begin{bmatrix} 1 & 0 & 0 & 0 \\ 0 & \cos\theta_n & -\sin\theta_n & e_{3n}\cos\theta_n \\ 0 & \sin\theta_n & \cos\theta_n & c_{2n} + e_{3n}\sin\theta_n \\ 0 & 0 & 0 & 1 \end{bmatrix} \begin{bmatrix} 1 & 0 & 0 & 0 \\ 0 & \cos\zeta_n & -\sin\zeta_n & 0 \\ 0 & \sin\zeta_n & \cos\zeta_n & 0 \\ 0 & 0 & 0 & 1 \end{bmatrix}$$

$$= \begin{bmatrix} 1 & 0 & 0 & 0 \\ 0 & \cos(\theta_n+\zeta_n) & -\sin(\theta_n+\zeta_n) & e_{3n}\cos\theta_n \\ 0 & \sin(\theta_n+\zeta_n) & \cos(\theta_n+\zeta_n) & c_{2n} + e_{3n}\sin\theta_n \\ 0 & 0 & 0 & 1 \end{bmatrix}$$

2. Description of All the Parts of the Model Both in Local Coordinate Systems and Relations to the Coordinate {r} or {1n} Referenced to the Vehicle Body 310

2.1 Description in Local Coordinate Systems $$P_{body}^2 = P_{susp.n}^{7n} = P_{arm.n}^{10n} = P_{wheel.n}^{12n} = P_{touchpoint.n}^{13n} = P_{stab.n}^{14n} = \begin{bmatrix} 0 \\ 0 \\ 0 \\ 1 \end{bmatrix} \quad (25)$$

2.2 Description in Global Reference Coordinate System {r}

$$P_{body}^r = {}_{1i}^r T \, {}_2^{1i} T P_{body}^2 \qquad (26)$$

$$= \begin{bmatrix} \cos\beta & \sin\beta\sin\alpha & \sin\beta\cos\alpha & a_{1i}\cos\beta \\ 0 & \cos\alpha & -\sin\alpha & 0 \\ -\sin\beta & \cos\beta\sin\alpha & \cos\beta\cos\alpha & z_0 - a_{1i}\sin\beta \\ 0 & 0 & 0 & 1 \end{bmatrix} \begin{bmatrix} 1 & 0 & 0 & a_0 \\ 0 & 1 & 0 & b_0 \\ 0 & 0 & 1 & c_0 \\ 0 & 0 & 0 & 1 \end{bmatrix} \begin{bmatrix} 0 \\ 0 \\ 0 \\ 1 \end{bmatrix}$$

$$= \begin{bmatrix} a_0\cos\beta + b_0\sin\beta\sin\alpha + c_0\sin\beta\cos\alpha + a_{1i}\cos\beta \\ b_0\cos\alpha - c_0\sin\alpha \\ -a_0\sin\beta + b_0\cos\beta\sin\alpha + c_0\cos\beta\cos\alpha - a_{1i}\sin\beta \\ 1 \end{bmatrix}$$

$$P_{susp.n}^r = {}_{4n}^r T \, {}_{7n}^{4n} T P_{susp.n}^{7n} \qquad (27)$$

$$= \begin{bmatrix} \cos\beta & \sin\beta\sin(\alpha+\gamma_n) & \sin\beta\cos(\alpha+\gamma_n) & b_{2n}\sin\beta\sin\alpha + a_{1n}\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & z_0 + b_{2n}\cos\beta\sin\alpha - a_{1n}\sin\beta \\ 0 & 0 & 0 & 1 \end{bmatrix} \cdot$$

$$\begin{bmatrix} 1 & 0 & 0 & 0 \\ 0 & \cos\eta_n & -\sin\eta_n & -z_{6n}\sin\eta_n \\ 0 & \sin\eta_n & \cos\eta_n & c_{1n} + z_{6n}\cos\eta_n \\ 0 & 0 & 0 & 1 \end{bmatrix} \begin{bmatrix} 0 \\ 0 \\ 0 \\ 1 \end{bmatrix}$$

$$= \begin{bmatrix} \{z_{6n}\cos(\alpha+\gamma_n+\eta_n) + c_{1n}\cos(\alpha+\gamma_n) + b_{2n}\sin\alpha\}\sin\beta + a_{1n}\cos\beta \\ -z_{6n}\sin(\alpha+\gamma_n+\eta_n) - c_{1n}\sin(\alpha+\gamma_n) + b_{2n}\cos\alpha \\ \{z_{6n}\cos(\alpha+\gamma_n+\eta_n) + c_{1n}\cos(\alpha+\gamma_n) + b_{2n}\sin\alpha\}\cos\beta - a_{1n}\sin\beta \\ 1 \end{bmatrix}$$

$$P_{arm.n}^r = {}_{4n}^r T \, {}_{10n}^{4n} T P_{arm.n}^{10n} \qquad (28)$$

$$= \begin{bmatrix} \cos\beta & \sin\beta\sin(\alpha+\gamma_n) & \sin\beta\cos(\alpha+\gamma_n) & b_{2n}\sin\beta\sin\alpha + a_{1n}\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & z_0 + b_{2n}\cos\beta\sin\alpha - a_{1n}\sin\beta \\ 0 & 0 & 0 & 1 \end{bmatrix} \cdot \begin{bmatrix} 1 & 0 & 0 & 0 \\ 0 & \cos\theta_n & -\sin\theta_n & e_{3n}\cos\theta_n \\ 0 & \sin\theta_n & \cos\theta_n & c_{2n} + e_{1n}\sin\theta_n \\ 0 & 0 & 0 & 1 \end{bmatrix} \begin{bmatrix} 0 \\ 0 \\ 0 \\ 1 \end{bmatrix}$$

$$= \begin{bmatrix} \{e_{1n}\sin(\alpha+\gamma_n+\theta_n) + c_{2n}\cos(\alpha+\gamma_n) + b_{2n}\sin\alpha\}\sin\beta + a_{1n}\cos\beta \\ e_{1n}\cos(\alpha+\gamma_n+\theta_n) - c_{2n}\sin(\alpha+\gamma_n) + b_{2n}\cos\alpha \\ \{e_{1n}\sin(\alpha+\gamma_n+\theta_n) + c_{2n}\cos(\alpha+\gamma_n) + b_{2n}\sin\alpha\}\cos\beta - a_{1n}\sin\beta \\ 1 \end{bmatrix}$$

$$P_{wheel.n}^r = {}_{4n}^r T \, {}_{12n}^{4n} T P_{wheel.n}^{12n} \qquad (29)$$

$$= \begin{bmatrix} \cos\beta & \sin\beta\sin(\alpha+\gamma_n) & \sin\beta\cos(\alpha+\gamma_n) & b_{2n}\sin\beta\sin\alpha + a_{1n}\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & b_{2n}\cos\beta\sin\alpha - a_{1n}\sin\beta \\ 0 & 0 & 0 & 1 \end{bmatrix} \begin{bmatrix} 1 & 0 & 0 & 0 \\ 0 & \cos(\theta_n+\zeta_n) & -\sin(\theta_n+\zeta_n) & e_{3n}\cos\theta_n \\ 0 & \sin(\theta_n+\zeta_n) & \cos(\theta_n+\zeta_n) & c_{2n} + e_{3n}\sin\theta_n \\ 0 & 0 & 0 & 1 \end{bmatrix} \begin{bmatrix} 0 \\ 0 \\ 0 \\ 1 \end{bmatrix}$$

-continued $$= \begin{bmatrix} \{e_{3n}\sin(\alpha+\gamma_n+\theta_n) + c_{2n}\cos(\alpha+\gamma_n) + b_{2n}\sin\alpha\}\sin\beta + a_{1n}\cos\beta \\ e_{3n}\cos(\alpha+\gamma_n+\theta_n) - c_{2n}\sin(\alpha+\gamma_n) + b_{2n}\cos\alpha \\ \{z_0 + \{e_{3n}\sin(\alpha+\gamma_n+\theta_n) + c_{2n}\cos(\alpha+\gamma_n) + b_{2n}\sin\alpha\}\cos\beta - a_{1n}\sin\beta \\ 1 \end{bmatrix}$$

$$P^r_{touchpoint.n} = {}^r_{4n}T^{4n}_{12n}T^{12n}_{13n}TP^{13n}_{touchpoint.n} \quad (30)$$

$$= \begin{bmatrix} \cos\beta & \sin\beta\sin(\alpha+\gamma_n) & \sin\beta\cos(\alpha+\gamma_n) & b_{2n}\sin\beta\sin\alpha + a_{1n}\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & z_0 + b_{2n}\cos\beta\sin\alpha - a_{1n}\sin\beta \\ 0 & 0 & 0 & 1 \end{bmatrix}$$

$$\begin{bmatrix} 1 & 0 & 0 & 0 \\ 0 & \cos(\theta_n+\zeta_n) & -\sin(\theta_n+\zeta_n) & e_{3n}\cos\theta_n \\ 0 & \sin(\theta_n+\zeta_n) & \cos(\theta_n+\zeta_n) & c_{2n}+e_{3n}\sin\theta_n \\ 0 & 0 & 0 & 1 \end{bmatrix} \begin{bmatrix} 1 & 0 & 0 & 0 \\ 0 & 1 & 0 & 0 \\ 0 & 0 & 1 & z_{12n} \\ 0 & 0 & 0 & 1 \end{bmatrix} \begin{bmatrix} 0 \\ 0 \\ 0 \\ 1 \end{bmatrix}$$

$$= \begin{bmatrix} \{z_{12n}\cos\alpha + e_{3n}\sin(\alpha+\gamma_n+\theta_n) + c_{2n}\cos(\alpha+\gamma_n) + b_{2n}\sin\alpha\}\sin\beta + a_{1n}\cos\beta \\ -z_{12n}\sin\alpha + e_{3n}\cos(\alpha+\gamma_n+\theta_n) - C_{2n}\sin(\alpha+\gamma_n) + b_{2n}\cos\alpha \\ z_0 + \{z_{12n}\cos\alpha + e_{3n}\sin(\alpha+\gamma_n+\theta_n) + c_{2n}\cos(\alpha+\gamma_n) + b_{2n}\sin\alpha\}\cos\beta - a_{1n}\sin\beta \\ 1 \end{bmatrix}$$

where $\zeta$ is substituted by, $$\zeta_n = -\gamma_n - \theta_n$$

because of the link mechanism to support a wheel at this geometric relation.

2.3 Description of the Stabilizer Linkage Point in the Local Coordinate System $\{1n\}$ The stabilizer works as a spring in which force is proportional to the difference of displacement between both arms in a local coordinate system $\{1n\}$ fixed to the body 310.

$$P^{1n}_{stab.n} = {}^{1n}_{3n}T^{3n}_{4n}T^{4n}_{8n}T^{8n}_{9n}T^{9n}_{14n}TP^{14n}_{stab.n} \quad (31)$$

$$= \begin{bmatrix} 1 & 0 & 0 & 0 \\ 0 & 1 & 0 & b_{2n} \\ 0 & 0 & 1 & 0 \\ 0 & 0 & 0 & 1 \end{bmatrix} \begin{bmatrix} 1 & 0 & 0 & 0 \\ 0 & \cos\gamma_n & -\sin\gamma_n & 0 \\ 0 & \sin\gamma_n & \cos\gamma_n & 0 \\ 0 & 0 & 0 & 1 \end{bmatrix} \begin{bmatrix} 1 & 0 & 0 & 0 \\ 0 & 1 & 0 & 0 \\ 0 & 0 & 1 & c_{2n} \\ 0 & 0 & 0 & 1 \end{bmatrix}$$

$$\begin{bmatrix} 1 & 0 & 0 & 0 \\ 0 & \cos\theta_n & -\sin\theta_n & 0 \\ 0 & \sin\theta_n & \cos\theta_n & 0 \\ 0 & 0 & 0 & 1 \end{bmatrix} \begin{bmatrix} 1 & 0 & 0 & 0 \\ 0 & 1 & 0 & e_{0n} \\ 0 & 0 & 1 & 0 \\ 0 & 0 & 0 & 1 \end{bmatrix} \begin{bmatrix} 0 \\ 0 \\ 0 \\ 1 \end{bmatrix}$$

$$= \begin{bmatrix} 0 \\ e_{0n}\cos(\gamma_n+\theta_n) - c_{2n}\sin\gamma_n + b_{2n} \\ e_{0n}\sin(\gamma_n+\theta_n) + c_{2n}\cos\gamma_n \\ 0 \end{bmatrix}$$

3. Kinetic Energy, Potential Energy and Dissipative Functions for the <Body>, <Suspension>, <Arm>, <Wheel> and <Stabilizer>

Kinetic energy and potential energy except by springs are calculated based on the displacement referred to the inertial global coordinate $\{r\}$. Potential energy by springs and dissipative functions are calculated based on the movement in each local coordinate.

<Body>

$$T^{tr}_b = \frac{1}{2}m_b(\dot{x}_b^2 + \dot{y}_b^2 + \dot{z}_b^2) \quad (32)$$

where $$x_b = (a_0 + a_{1n})\cos\beta + (b_0\sin\alpha + c_0\cos\alpha)\sin\beta \quad (33)$$

$$y_b = b_0\cos\alpha - c_0\sin\alpha$$

$$z_b = z_0 - (a_0 + a_{1n})\sin\beta + (b_0\sin\alpha + c_0\cos\alpha)\cos\beta$$

and $$q_{j,k} = \beta, \alpha, z_0 \quad (34)$$

$$\frac{\partial x_b}{\partial \beta} = -(a_0 + a_{1n})\sin\beta + (b_0\sin\alpha + c_0\cos\alpha)\cos\beta$$

$$\frac{\partial x_b}{\partial \alpha} = (b_0\cos\alpha - c_0\sin\alpha)\sin\beta$$

$$\frac{\partial y_b}{\partial \beta} = \frac{\partial x_b}{\partial z_0} = \frac{\partial y_b}{\partial z_0} = 0$$

$$\frac{\partial y_b}{\partial \alpha} = -b_0\sin\alpha - c_0\cos\alpha$$

$$\frac{\partial z_b}{\partial \beta} = -(a_0 + a_{1n})\cos\beta - (b_0\sin\alpha + c_0\cos\alpha)\sin\beta$$

$$\frac{\partial z_b}{\partial \alpha} = (b_0\cos\alpha - c_0\sin\alpha)\cos\beta$$

$$\frac{\partial z_b}{\partial z_0} = 1$$

and thus $$T^{tr}_b = \frac{1}{2}m_b(\dot{x}_b^2 + \dot{y}_b^2 + \dot{z}_b^2) \quad (35)$$

-continued $$= \frac{1}{2}m_b \sum_{j,k}\left(\frac{\partial x_b}{\partial q_j}\frac{\partial x_b}{\partial q_k}\dot{q}_j\dot{q}_k + \frac{\partial y_b}{\partial q_j}\frac{\partial y_b}{\partial q_k}\dot{q}_j\dot{q}_k + \frac{\partial z_b}{\partial q_j}\frac{\partial z_b}{\partial q_k}\dot{q}_j\dot{q}_k\right)$$

$$= \frac{1}{2}m_b\langle \dot{\beta}^2\{-(a_0+a_1)\sin\beta + (b_0\sin\alpha + c_0\cos\alpha)\cos\beta\}^2 +$$
$$\dot{\alpha}^2\{(b_0\cos\alpha - c_0\sin\alpha)\sin\beta\}^2 + \dot{\alpha}^2(-b_0\sin\alpha - c_0\cos\alpha)^2 +$$
$$\dot{\beta}^2\{-(a_0+a_1)\cos\beta - (b_0\sin\alpha + c_0\cos\alpha)\sin\beta\}^2 +$$
$$\dot{\alpha}^2\{(b_0\cos\alpha - c_0\sin\alpha)\cos\beta\}^2 + \dot{z}_0^2 + 2\dot{\alpha}\dot{\beta}[\{-(a_0+a_1)\sin\beta + (b_0\sin\alpha + c_0\cos\alpha)\cos\beta\}(b_0\cos\alpha -$$
$$c_0\sin\alpha)\sin\beta + \{-(a_0+a_1)\cos\beta - (b_0\sin\alpha +$$
$$c_0\cos\alpha)\sin\beta\}(b_0\cos\alpha - c_0\sin\alpha)\cos\beta] - 2\dot{\beta}\dot{z}_0\{(a_0+$$
$$a_{1n})\cos\beta + (b_0\sin\alpha - c_0\cos\alpha)\sin\beta\} + 2\dot{\alpha}\dot{z}_0(b_0\cos\alpha -$$
$$c_0\sin\alpha)\cos\beta\rangle$$

$$= \frac{1}{2}m_b\langle \dot{\alpha}^2(b_0^2+c_0^2) + \dot{\beta}^2\{(a_0+a_{1i})^2 + (b_0\sin\alpha + \cos\alpha)^2\} +$$
$$\dot{z}_0^2 - 2\dot{\alpha}\dot{\beta}(a_0+a_{1i})(b_0\cos\alpha - c_0\sin\alpha) - 2\dot{\beta}\dot{z}_0\{(a_0+$$
$$a_{1i})\cos\beta + (b_0\sin\alpha - c_0\cos\alpha)\sin\beta\} + 2\dot{\alpha}\dot{z}_0(b_0\cos\alpha -$$
$$c_0\sin\alpha)\cos\beta\rangle$$

$$T_b^{ro} = \frac{1}{2}(I_{bx}\omega_{bx}^2 + I_{by}\omega_{by}^2 + I_{bz}\omega_{bz}^2) \qquad (36)$$

where $$\omega_{bx} = \dot{\alpha}$$
$$\omega_{by} = \dot{\beta}$$
$$\omega_{bz} = 0$$
$$\therefore$$

$$T_b^{ro} = \frac{1}{2}(I_{bx}\dot{\alpha}^2 + I_{by}\dot{\beta}^2)$$
$$U_b = m_b g z_b$$
$$= m_b g\{-(a_0+a_{1n})\sin\beta + (b_0\sin\alpha + c_0\cos\alpha)\cos\beta\}$$

<Suspension>

$$T_{sn}^{tr} = \frac{1}{2}m_{sn}(\dot{x}_{sn}^2 + \dot{y}_{sn}^2 + \dot{z}_{sn}^2) \qquad (37)$$

where $$x_{sn} = \{z_{6n}\cos(\alpha + \gamma_n + \eta_n) + c_{1n}\cos(\alpha + \gamma_n) + b_{2n}\sin\alpha\}\sin\beta + a_{1n}\cos\beta$$
$$y_{sn} = -z_{6n}\sin(\alpha + \gamma_n + \eta_n) - c_{1n}\sin(\alpha + \gamma_n) + b_{2n}\cos\alpha$$
$$z_{sn} = z_0 + \{z_{6n}\cos(\alpha + \gamma_n + \eta_n) + c_{1n}\cos(\alpha + \gamma_n) + b_{2n}\sin\alpha\}\cos\beta - a_{1n}\sin\beta$$

$$q_{j,k} = z_{6n}, \eta_n, \alpha, \beta, z_0 \qquad (38)$$

$$\frac{\partial x_{sn}}{\partial z_{6n}} = \cos(\alpha + \gamma_n + \eta_n)\sin\beta$$

$$\frac{\partial x_{sn}}{\partial \eta_n} = -z_{6n}\sin(\alpha + \gamma_n + \eta_n)\sin\beta$$

$$\frac{\partial x_{sn}}{\partial \alpha} = \{-z_{6n}\sin(\alpha + \gamma_n + \eta_n) - c_{1n}\sin(\alpha + \gamma_n) + b_{2n}\cos\alpha\}\sin\beta$$

$$\frac{\partial x_{sn}}{\partial \beta} = \{z_{6n}\cos(\alpha + \gamma_n + \eta_n) + c_{1n}\cos(\alpha + \gamma_n) + b_{2n}\sin\alpha\}\cos\beta - a_{1n}\sin\beta$$

$$\frac{\partial y_{sn}}{\partial z_{6n}} = -\sin(\alpha + \gamma_n + \eta_n)$$

$$\frac{\partial y_{sn}}{\partial \eta_n} = -z_{6n}\cos(\alpha + \gamma_n + \eta_n)$$

$$\frac{\partial y_{sn}}{\partial \alpha} = -z_{6n}\cos(\alpha + \gamma_n + \eta_n) - c_{1n}\cos(\alpha + \gamma_n) - b_{2n}\sin\alpha$$

$$\frac{\partial y_{sn}}{\partial \beta} = \frac{\partial x_{sn}}{\partial z_0} = \frac{\partial y_{sn}}{\partial z_0} = 0$$

$$\frac{\partial z_{sn}}{\partial z_0} = 1$$

$$\frac{\partial z_{sn}}{\partial z_{6n}} = \cos(\alpha + \gamma_n + \eta_n)\cos\beta \qquad (39)$$

$$\frac{\partial z_{sn}}{\partial \eta_n} = -z_{6n}\sin(\alpha + \gamma_n + \eta_n)\cos\beta$$

$$\frac{\partial z_{sn}}{\partial \alpha} = \{-z_{6n}\sin(\alpha + \gamma_n + \eta_n) - c_{1n}\sin(\alpha + \gamma_n) + b_{2n}\cos\alpha\}\cos\beta$$

$$\frac{\partial z_{sn}}{\partial \beta} = -\{z_{6n}\cos(\alpha + \gamma_n + \eta_n) + c_{1n}\cos(\alpha + \gamma_n) + b_{2n}\sin\alpha\}\sin\beta - a_{1n}\cos\beta$$

$$\therefore T_{sn}^{tr} = \frac{1}{2}m_{sn}(\dot{x}_{sn}^2 + \dot{y}_{sn}^2 + \dot{z}_{sn}^2) \qquad (40)$$

$$= \frac{1}{2}m_{sn}\sum_{j,k}\left(\frac{\partial x_{sn}}{\partial q_j}\frac{\partial x_{sn}}{\partial q_k}\dot{q}_j\dot{q}_k + \frac{\partial y_{sn}}{\partial q_j}\frac{\partial y_{sn}}{\partial q_k}\dot{q}_j\dot{q}_k + \frac{\partial z_{sn}}{\partial q_j}\frac{\partial z_{sn}}{\partial q_k}\dot{q}_j\dot{q}_k\right)$$

$$= \frac{1}{2}m_{sn}\langle \dot{z}_{6n}^2 + \dot{\eta}_n^2 z_{6n}^2 + \dot{\alpha}^2[z_{6n}^2 + c_{1n}^2 + b_{2n}^2 + \qquad (41)$$
$$2\{z_{6n}c_{1n}\cos\eta_n - z_{6n}b_{2n}\sin(\gamma_n + \eta_n) - c_{1n}b_{2n}\sin\gamma_n\}] +$$
$$\dot{\beta}^2[\{(z_{6n}\cos(\alpha + \gamma_n + \eta_n) + c_{1n}\cos(\alpha + \gamma_n) +$$
$$b_{2n}\sin\alpha)\}^2 + a_{1n}^2] + \dot{z}_0^2 + 2z_{6n}\dot{\alpha}\{c_{1n}\sin\eta_n +$$
$$b_{2n}\cos(\gamma_n + \eta_n)\} - 2\dot{z}_{6n}\dot{\beta}a_{1n}\cos(\alpha + \gamma_n + \eta_n) +$$
$$2\dot{\eta}_n\dot{\alpha}z_{6n}\{z_{6n} + c_{1n}\cos\eta_n - b_{2n}\sin(\gamma_n - \eta_n)\} +$$
$$2\dot{\eta}_n\dot{\beta}z_{6n}a_{1n}\sin(\alpha + \gamma_n + \eta_n) +$$
$$2\dot{\alpha}\dot{\beta}a_{1n}\{z_{6n}\sin(\alpha + \gamma_n + \eta_n) + c_{1n}\sin(\alpha + \gamma_n) -$$
$$b_{2n}\cos\alpha\} + 2\dot{z}_{6n}\dot{z}_0\cos(\alpha + \gamma_n + \eta_n)\cos\beta -$$

-continued $$2\dot{\eta}_n \dot{z}_0 z_{6n} \sin(\alpha + \gamma_n + \eta_n) \cos\beta +$$
$$2\dot{\alpha}\dot{z}_0 \{z_{6n} \sin(\alpha + \gamma_n + \eta_n) - c_{1n}\sin(\alpha + \gamma_n) +$$
$$b_{2n}\cos\alpha\}\cos\beta + 2\dot{\beta}\dot{z}_0 \{z_{6n}\cos(\alpha + \gamma_n + \eta_n) +$$
$$c_{1n}\sin(\alpha + \gamma_n) + b_{2n}\cos\alpha\}\sin\beta + a_{1n}\cos\beta])$$

$$T_{sn}^{ro} \cong 0 \tag{42}$$

$$U_{sn} = m_{sn}g z_{sn} + \frac{1}{2}k_{sn}(z_{6n} - l_{sn})^2$$
$$= m_{sn}g[z_0 + \{z_{6n}\cos(\alpha + \gamma_n + \eta_n) + c_{1n}\cos(\alpha + \gamma_n) +$$
$$b_{2n}\sin\alpha\}\cos\beta - a_{1n}\sin\beta] + \frac{1}{2}k_{sn}(z_{6n} - l_{sn})^2$$

$$F_{sn} = \frac{1}{2}c_{sn}\dot{z}_{6n}^2$$

<Arm>

$$T_{an}^{tr} = \frac{1}{2}m_{an}(\dot{x}_{an}^2 + \dot{y}_{an}^2 + \dot{z}_{an}^2) \tag{43}$$

where $$x_{an} = \{e_{1n}\sin(\alpha + \gamma_n + \theta_n) + c_{2n}\cos(\alpha + \gamma_n) + \tag{44}$$
$$b_{2n}\sin\alpha\}\sin\beta + a_{1n}\cos\beta$$
$$y_{an} = e_{1n}\cos(\alpha + \gamma_n + \theta_n) - c_{2n}\sin(\alpha + \gamma_n) + b_{2n}\cos\alpha$$
$$z_{an} = z_0 + \{e_{1n}\sin(\alpha + \gamma_n + \theta_n) + c_{2n}\cos(\alpha + \gamma_n) +$$
$$b_{2n}\sin\alpha\}\cos\beta - a_{1n}\sin\beta$$

and $$q_{j,k} = \theta_n, \alpha, \beta, z_0 \tag{45}$$

$$\frac{\partial x_{an}}{\partial \theta_n} = e_{1n}\cos(\alpha + \gamma_n + \theta_n)\sin\beta$$

$$\frac{\partial x_{an}}{\partial \alpha} = \{e_{1n}\cos(\alpha + \gamma_n + \theta_n) - c_{2n}\sin(\alpha + \gamma_n) +$$
$$b_{2n}\cos\alpha\}\sin\beta$$

$$\frac{\partial x_{an}}{\partial \beta} = \{e_{1n}\sin(\alpha + \gamma_n + \theta_n) + c_{2n}\cos(\alpha + \gamma_n) +$$
$$b_{2n}\sin\alpha\}\cos\beta - a_{1n}\sin\beta$$

$$\frac{\partial y_{an}}{\partial \theta_n} = -e_{1n}\sin(\alpha + \gamma_n + \theta_n)$$

$$\frac{\partial y_{an}}{\partial \alpha} = -e_{1n}\sin(\alpha + \gamma_n + \theta_n) - c_{2n}\cos(\alpha + \gamma_n) - b_{2n}\sin\alpha$$

$$\frac{\partial y_{an}}{\partial \beta} = \frac{\partial x_{an}}{\partial z_0} = \frac{\partial y_{an}}{\partial z_0} = 0$$

$$\frac{\partial z_{an}}{\partial \theta_n} = e_{1n}\cos(\alpha + \gamma_n + \theta_n)\cos\beta$$

$$\frac{\partial z_{an}}{\partial \alpha} = \{e_{1n}\cos(\alpha + \gamma_n + \theta_n) - c_{2n}\sin(\alpha + \gamma_n) +$$
$$b_{2n}\cos\alpha\}\cos\beta$$

$$\frac{\partial z_{an}}{\partial \beta} = -\{e_{1n}\sin(\alpha + \gamma_n + \theta_n) + c_{2n}\cos(\alpha + \gamma_n) +$$
$$b_{2n}\sin\alpha\}\sin\beta - a_{1n}\cos\beta$$

$$\frac{\partial z_{an}}{\partial z_0} = 1$$

thus $$T_{an}^{tr} = \frac{1}{2}m_{an}(\dot{x}_{an}^2 + \dot{y}_{an}^2 + \dot{z}_{an}^2) \tag{46}$$
$$= \frac{1}{2}m_{an}\sum_{j,k}\left(\frac{\partial x_{an}}{\partial q_j}\frac{\partial x_{an}}{\partial q_k}\dot{q}_j\dot{q}_k + \frac{\partial y_{an}}{\partial q_j}\frac{\partial y_{an}}{\partial q_k}\dot{q}_j\dot{q}_k + \frac{\partial z_{an}}{\partial q_j}\frac{\partial z_{an}}{\partial q_k}\dot{q}_j\dot{q}_k\right)$$

$$= \frac{1}{2}m_{an}\langle\dot{\theta}_n^2 e_{1n}^2 + \dot{\alpha}^2[e_{1n}^2 + c_{2n}^2 + b_{2n}^2 - \tag{47}$$
$$2\{e_{1n}c_{2n}\sin\theta_n + e_{1n}b_{2n}\cos(\gamma_n + \theta_n) + c_{2n}b_{2n}\sin\gamma_n\}] +$$
$$\dot{\beta}^2[\{e_{1n}\sin(\alpha + \gamma_n + \theta_n) + c_{2n}\cos(\alpha + \gamma_n) +$$
$$b_{2n}\sin\alpha)\}^2 + a_{1n}^2] + \dot{z}_0^2 + 2\dot{\theta}\dot{\alpha}e_{1n}\{e_{1n} - c_{2n}\sin\theta_n +$$
$$b_{2n}\cos(\gamma_n + \theta_n)\} - 2\dot{\theta}_n\dot{\beta}e_{1n}a_{1n}\cos(\alpha + \gamma_n + \theta_n) -$$
$$2\dot{\alpha}\dot{\beta}a_{1n}\{e_{1n}\cos(\alpha + \gamma_n + \theta_n) - c_{1n}\sin(\alpha + \gamma_n) +$$
$$b_{2n}\cos\alpha\} - 2\dot{\theta}_n\dot{z}_0 e_{1n}\cos(\alpha + \gamma_n + \theta_n)\cos\beta +$$
$$2\dot{\alpha}\dot{z}_0\{e_{1n}\cos(\alpha + \gamma_n + \theta_n) - c_{2n}\sin(\alpha + \gamma_n) +$$
$$b_{2n}\cos\alpha\}\cos\beta + 2\dot{\beta}\dot{z}_0 [\{e_{1n}\sin(\alpha + \gamma_n + \theta_n) +$$
$$c_{2n}\cos(\alpha + \gamma_n) + b_{2n}\sin\alpha\}\sin\beta + a_{1n}\cos\beta])$$

$$T_{an}^{ro} = \frac{1}{2}I_{ax}\omega_{ax}^2 \tag{48}$$
$$= \frac{1}{2}I_{ax}(\dot{\alpha} + \dot{\theta}_n)^2$$

$$U_{an} = m_{an}g z_{an}$$
$$= m_{an}g[z_0 + \{e_{1n}\sin(\alpha + \gamma_n + \theta_n) + c_{2n}\cos(\alpha + \gamma_n) +$$
$$b_{2n}\sin\alpha\}\cos\beta - a_{1n}\sin\beta]$$

<Wheel>

$$T_{wn}^{tr} = \frac{1}{2}m_{wn}(\dot{x}_{wn}^2 + \dot{y}_{wn}^2 + \dot{z}_{wn}^2) \tag{49}$$

where $$x_{wn} = \{e_{3n}\sin(\alpha + \gamma_n + \theta_n) + c_{2n}\cos(\alpha + \gamma_n) + \tag{50}$$
$$b_{2n}\sin\alpha\}\sin\beta + a_{1n}\cos\beta$$
$$y_{wn} = e_{3n}\cos(\alpha + \gamma_n + \theta_n) - c_{2n}\sin(\alpha + \gamma_n) + b_{2n}\cos\alpha$$
$$z_{wn} = z_0 + \{e_{3n}\sin(\alpha + \gamma_n + \theta_n) + c_{2n}\cos(\alpha + \gamma_n) +$$
$$b_{2n}\sin\alpha\}\cos\beta - a_{1n}\sin\beta$$

Substituting $m_{an}$ with $m_{wn}$ and $e_{1n}$ with $e_{3n}$ in the equation for the arm, yields an equation for the wheel as:

$$T_{wn}^{tr} = \frac{1}{2}m_{wn}\langle\dot{\theta}_n^2 e_{3n}^2 + \dot{\alpha}^2[e_{3n}^2 + c_{2n}^2 + b_{2n}^2 - \tag{51}$$

-continued $$2\{e_{3n}c_{2n}\sin\theta_n + e_{3n}b_{2n}\cos(\gamma_n + \theta_n) + c_{2n}b_{2n}\sin\gamma_n\}] +$$
$$\dot{\beta}^2[\{e_{3n}\sin(\alpha + \gamma_n + \theta_n) + c_{2n}\cos(\alpha + \gamma_n) +$$
$$b_{2n}\sin\alpha\}^2 + a_{1n}^2] + \dot{z}_0^2 + 2\dot{\theta}_n\dot{\alpha}e_{3n}\{e_{3n} - c_{2n}\sin\theta_n +$$
$$b_{2n}\cos(\gamma_n + \theta_n)\} - 2\dot{\theta}_n\dot{\beta}e_{3n}a_{1n}\cos(\alpha + \gamma_n + \theta_n) -$$
$$2\dot{\alpha}\dot{\beta}a_{1n}\{e_{3n}\cos(\alpha + \gamma_n + \theta_n) - c_{1n}\sin(\alpha + \gamma_n) +$$
$$b_{2n}\cos\alpha\} + 2\dot{\theta}_n\dot{z}_0e_{3n}\cos(\alpha + \gamma_n + \theta_n)\cos\beta +$$
$$2\dot{\alpha}\dot{z}_0\{e_{3n}\cos(\alpha + \gamma_n + \theta_n) - c_{2n}\sin(\alpha + \gamma_n) +$$
$$b_{2n}\cos\alpha\}\cos\beta - 2\dot{\beta}\dot{z}_0\,[\{e_{3n}\sin(\alpha + \gamma_n + \theta_n) +$$
$$c_{2n}\sin(\alpha + \gamma_n) + b_{2n}\sin\alpha\}\sin\beta + a_{1n}\cos\beta]\rangle$$

$$T_{wn}^{ro} = 0 \tag{52}$$

$$U_{wn} = m_{wn}gz_{wn} + \frac{1}{2}k_{wn}(z_{12n} - l_{wn})^2$$
$$= m_{wn}g[z_0 + \{e_{3n}\sin(\alpha + \gamma_n + \theta_n) + c_{2n}\cos(\alpha + \gamma_n) +$$
$$b_{2n}\sin\alpha\}\cos\beta - a_{1n}\sin\beta] + \frac{1}{2}k_{wn}(z_{12n} - l_{wn})^2$$

$$F_{wn} = \frac{1}{2}c_{wn}\dot{z}_{12n}^2$$

<Stabilizer>

$$T_{zn}^{tr} \cong 0 \tag{53}$$

$$T_{zn}^{ro} \cong 0 \tag{54}$$

$$U_{zi,ii} \cong \frac{1}{2}k_{zi}(z_{zi} - z_{zii})^2 \tag{55}$$
$$= \frac{1}{2}k_{zi}[\{e_{0i}\sin(\gamma_i + \theta_i) + c_{2i}\cos\gamma_i\} -$$
$$\{e_{0ii}\sin(\gamma_{ii} + \theta_{ii}) + c_{2ii}\cos\gamma_{ii}\}]^2$$
$$= \frac{1}{2}k_{zi}e_{0i}^2\{\sin(\gamma_i + \theta_i) + \sin(\gamma_{ii} + \theta_{ii})\}^2$$
where $e_{0ii} = -e_{0i}, c_{2ii} = c_{2i}, \gamma_{ii} = -\gamma_i$ $$U_{ziii,iv} \cong \frac{1}{2}k_{ziii}(z_{ziii} - z_{ziv})^2$$
$$= \frac{1}{2}k_{ziii}[\{e_{0iii}\sin(\gamma_{iii} + \theta_{iii}) + c_{2iii}\cos\gamma_{iii}\} -$$
$$\{e_{0iv}\sin(\gamma_{iv} + \theta_{iv}) + c_{2iv}\cos\gamma_{iv}\}]^2$$
$$= \frac{1}{2}k_{ziii}e_{0iii}^2\{\sin(\gamma_{iii} + \theta_{iii}) + \sin(\gamma_{iv} + \theta_{iiv})\}^2$$
where $e_{0ii} = -e_{0iii}\ c_{2iv} = c_{2iii}, \gamma_{iv} = -\gamma_{iii}$ $$F_{zn} \cong 0 \tag{56}$$

Therefore the total kinetic energy is:

$$T_{tot} = T_b^{tr} + \sum_{n=i}^{iv}|T_{sn}^{tr} + T_{an}^{tr} + T_{wn}^{tr} + T_b^{ro} + T_{an}^{ro}| \tag{57}$$

$$T_{tot} = T_b^{tr} + \sum_{n=i}^{iv}|T_{sn}^{tr} + T_{an}^{tr} + T_{wn}^{tr} + T_b^{ro} + T_{an}^{ro}| \tag{58}$$

$$= \frac{1}{2}m_b\langle\dot{\alpha}^2(b_0^2 + c_0^2) + \dot{\beta}^2\{(a_0 + a_{1i})^2 + (b_0\sin\alpha + \cos\alpha)^2\} +$$
$$\dot{z}_0^2 - 2\dot{\alpha}\dot{\beta}(a_0 + a_{1i})(b_0\cos\alpha - c_0\sin\alpha) - 2\dot{\beta}\dot{z}_0\{(a_0 +$$
$$a_{1i})\cos\beta + (b_0\sin\alpha + c_0\cos\alpha)\sin\beta\} + 2\dot{\alpha}\dot{z}_0(b_0\cos\alpha -$$
$$c_0\sin\alpha)\cos\beta\rangle + \sum_{n=i}^{iv}\left|\frac{1}{2}m_{sn}\langle\dot{z}_{6n}^2 + \dot{\eta}_n^2z_{6n}^2 + \dot{\alpha}^2[z_{6n}^2 + c_{1n}^2 +\right.$$
$$b_{2n}^2 + 2\{z_{6n}c_{1n}\cos\eta_n - z_{6n}b_{2n}\sin(\gamma_n + \eta_n) -$$
$$c_{1n}b_{2n}\sin\gamma_n\}] + \dot{\beta}^2[\{(z_{6n}\cos(\alpha + \gamma_n + \eta_n) +$$
$$c_{1n}\cos(\alpha + \gamma_n) + b_{2n}\sin\alpha\}^2 + a_{1n}^2] + \dot{z}_0^2 +$$
$$2\dot{z}_{6n}\dot{\alpha}\{c_{1n}\sin\eta_n + b_{2n}\cos(\gamma_n + \eta_n)\} -$$
$$2\dot{z}_{6n}\dot{\beta}a_{1n}\cos(\alpha + \gamma_n + \eta_n) +$$
$$2\dot{\eta}_n\dot{\alpha}z_{6n}\{z_{6n} + c_{1n}\cos\eta_n - b_{2n}\sin(\gamma_n - \eta_n)\} +$$
$$2\dot{\eta}_n\dot{\beta}z_{6n}a_{1n}\sin(\alpha + \gamma_n + \eta_n) +$$
$$2\dot{\alpha}\dot{\beta}a_{1n}\{z_{6n}\sin(\alpha + \gamma_n + \eta_n) + c_{1n}\sin(\alpha + \gamma_n) -$$
$$b_{2n}\cos\alpha\} + 2\dot{z}_{6n}\dot{z}_0\cos(\alpha + \gamma_n + \eta_n)\cos\beta -$$
$$2\dot{\eta}_n\dot{z}_0z_{6n}\sin(\alpha + \gamma_n + \eta_n)\cos\beta +$$
$$2\dot{\alpha}\dot{z}_0\{-z_{6n}\sin(\alpha + \gamma_n + \eta_n) - c_{1n}\sin(\alpha + \gamma_n) +$$
$$b_{2n}\cos\alpha\}\cos\beta - 2\dot{\beta}\dot{z}_0\,[\{z_{6n}\cos(\alpha + \gamma_n + \eta_n) -$$
$$c_{1n}\cos(\alpha + \gamma_n) + b_{2n}\sin\alpha\} + a_{1n}\cos\beta]\rangle +$$

$$\frac{1}{2}m_{an}\langle\dot{\theta}_n^2e_{1n}^2 + \dot{\alpha}^2[e_{1n}^2 + c_{2n}^2 + b_{2n}^2 -$$
$$2\{e_{1n}c_{2n}\sin\theta_n + e_{1n}b_{2n}\cos(\gamma_n + \theta_n) + c_{2n}b_{2n}\sin\gamma_n\}] +$$
$$\dot{\beta}^2[\{e_{1n}\sin(\alpha + \gamma_n + \theta_n) + c_{2n}\cos(\alpha + \gamma_n) +$$
$$(b_{2n}\sin\alpha)\}^2 + a_{1n}^2] + \dot{z}_0^2 + 2\dot{\theta}_n\dot{\alpha}e_{1n}\{e_{1n} - c_{2n}\sin\theta_n +$$
$$b_{2n}\cos(\gamma_n + \theta_n)\} - 2\dot{\theta}_n\dot{\beta}e_{1n}a_{1n}\cos(\alpha + \gamma_n + \theta_n) -$$
$$2\dot{\alpha}\dot{\beta}a_{1n}\{e_{1n}\cos(\alpha + \gamma_n + \theta_n) - c_{1n}\sin(\alpha + \gamma_n) +$$
$$b_{2n}\cos\alpha\} + 2\dot{\theta}_n\dot{z}_0e_{1n}\cos(\alpha + \gamma_n + \theta_n)\cos\beta +$$
$$2\dot{\alpha}\dot{z}_0\{e_{1n}\cos(\alpha + \gamma_n + \theta_n) - c_{2n}\sin(\alpha + \gamma_n) +$$
$$b_{2n}\cos\alpha\}\cos\beta - 2\dot{\beta}\dot{z}_0\,[\{e_{1n}\sin(\alpha + \gamma_n + \theta_n) +$$
$$c_{2n}\cos(\alpha + \gamma_n) + b_{2n}\sin\alpha\} + a_{1n}\cos\beta\rangle +$$

$$\frac{1}{2}m_{wn}\langle\dot{\theta}_n^2e_{3n}^2 + \dot{\alpha}^2[e_{3n}^2 + c_{2n}^2 + b_{2n}^2 -$$
$$2\{e_{3n}c_{2n}\sin\theta_n - e_{3n}b_{2n}\cos(\gamma_n + \theta_n) + c_{2n}b_{2n}\sin\gamma_n\}] +$$
$$\dot{\beta}^2[\{e_{3n}\sin(\alpha + \gamma_n + \theta_n) + c_{2n}\cos(\alpha + \gamma_n) +$$
$$b_{2n}\sin\alpha\}^2 + a_{1n}^2] + \dot{z}_0^2 + 2\dot{\theta}_n\dot{\alpha}e_{3n}\{e_{3n} - c_{2n}\sin\theta_n +$$
$$b_{2n}\cos(\gamma_n + \theta_n)\} - 2\dot{\theta}_n\dot{\beta}e_{3n}a_{1n}\cos(\alpha + \gamma_n + \theta_n) -$$
$$2\dot{\alpha}\dot{\beta}a_{1n}\{e_{3n}\cos(\alpha + \gamma_n + \theta_n) - c_{1n}\sin(\alpha + \gamma_n) +$$
$$b_{2n}\cos\alpha\} + 2\dot{\theta}_n\dot{z}_0e_{3n}\cos(\alpha + \gamma_n + \eta_n)\cos\beta +$$
$$2\dot{\alpha}\dot{z}_0\{e_{3n}\cos(\alpha + \gamma_n + \theta_n) - c_{2n}\sin(\alpha + \gamma_n) +$$
$$b_{2n}\cos\alpha\}\cos\beta - 2\dot{\beta}\dot{z}_0\,[\{e_{3n}\sin(\alpha + \gamma_n + \theta_n) -$$
$$c_{2n}\cos(\alpha + \gamma_n) + b_{2n}\sin\alpha\} + a_{1n}\cos\beta\rangle +$$

$$\frac{1}{2}(I_{bx}\dot{\alpha}^2 + I_{by}\dot{\beta}^2) + \frac{1}{2}I_{anx}(\dot{\alpha} + \dot{\theta}_n)^2\Big|$$

$$\begin{aligned}
&= \frac{1}{2}\dot{\alpha}^2 m_{bbl} + \dot{\beta}^2\{m_{bal} + m_b(b_0\sin\alpha + c_0\cos\alpha)^2\} + \dot{z}_0^2 m_b - \\
&\quad 2\dot{\alpha}(\dot{\beta}m_{ba} - \dot{z}_0 m_b\cos\beta)(b_0\cos\alpha - c_0\sin\alpha) - \\
&\quad 2\dot{\beta}\dot{z}_0\{m_{ba}\cos\beta + m_b(b_0\sin\alpha + c_0\cos\alpha)\sin\beta\}] + \\
&\quad \frac{1}{2}\sum_{n=i}^{iv}[m_{sn}(\dot{z}_{6n}^2 + \dot{\eta}_n^2 z_{6n}^2) + \dot{\theta}_n^2 m_{aw2ln} + \dot{z}_0^2 m_{sawn} + \\
&\quad \dot{\alpha}^2\langle m_{sawln} + m_{sn}z_{6n}[z_{6n} + 2m_{sn}\{c_{1n}\cos\eta_n - \\
&\quad b_{2n}\sin(\gamma_n + \eta_n)\}] - 2m_{awln}\{c_{2n}\sin\theta_n - \\
&\quad b_{2n}\cos(\gamma_n + \theta_n)\}\rangle + \dot{\beta}^2\langle m_{saw2n} + \\
&\quad m_{sn}\{z_{6n}\cos(\alpha + \gamma_n + \eta_n) + c_{1n}\cos(\alpha + \gamma_n) + \\
&\quad b_{2n}\sin\alpha\}^2 + m_{an}\{e_1\sin(\alpha + \gamma_n + \theta_n) + \\
&\quad c_{2n}\cos(\alpha + \gamma_n) + b_{2n}\sin\alpha\}^2 + m_{wn}\{e_3\sin(\alpha + \gamma_n + \theta_n) + \\
&\quad c_{2n}\cos(\alpha + \gamma_n) + b_{2n}\sin\alpha\}^2\rangle + 2\dot{z}_{6n}\dot{\alpha}m_{sn}\{c_{1n}\sin\eta_n + \\
&\quad b_{2n}\cos(\gamma_n + \eta_n)\} - 2\dot{z}_{6n}\dot{\beta}m a_{1n}\cos(\alpha + \gamma_n + \eta_n) + \\
&\quad 2\dot{\eta}_n\dot{\alpha}m_{sn}z_{6n}\{z_{6n} + c_{1n}\cos\eta_n - b_{2n}\sin(\gamma_n + \eta_n)\} + \\
&\quad 2\dot{\eta}_n\dot{\beta}m_{sn}z_{6n}a_{1n}\sin(\alpha + \gamma_n + \eta_n) + \\
&\quad 2\dot{\theta}\dot{\alpha}[m_{aw2ln} - m_{awln}\{c_{2n}\sin\theta_n - b_{2n}\cos(\gamma_n + \theta_n)\}] - \\
&\quad 2\dot{\theta}\dot{\beta}m_{awln}a_{1n}\cos(\alpha + \gamma_n + \theta_n) + \\
&\quad 2\dot{\alpha}\dot{\beta}a_{1n}\{m_{sawcn}\sin(\alpha + \gamma_n) - m_{sawbn}\cos\alpha + \\
&\quad m_{sn}z_{6n}\sin(\alpha + \gamma_n + \eta_n) - m_{awln}\cos(\alpha + \gamma_n + \theta_n)\} + \\
&\quad 2\dot{z}_{6n}\dot{z}_0 m_{sn}\cos(\alpha + \gamma_n + \eta_n)\cos\beta - \\
&\quad 2(\dot{\alpha} + \dot{\eta}_n)\dot{z}_0 z_{6n}m_{sn}\sin(\alpha + \gamma_n + \eta_n)\cos\beta + \\
&\quad 2\dot{\theta}_n\dot{z}_0 m_{awln}\cos(\alpha + \gamma_n + \theta_n)\cos\beta + \\
&\quad 2\dot{\alpha}\dot{z}_0\{m_{awln}\sin(\alpha + \gamma_n + \theta_n) - m_{sawcn}\sin(\alpha + \gamma_n) + \\
&\quad m_{sawbn}\cos\alpha\}\cos\beta - 2\dot{\beta}\dot{z}_0[\{z_{6n}m_{sn}\cos(\alpha + \gamma_n + \eta_n) - \\
&\quad m_{awln}\sin(\alpha + \gamma_n) + m_{sawcn}\cos(\alpha + \gamma_n) + \\
&\quad m_{sawbn}\sin\alpha\}\sin\beta + m_{sawan}\cos\beta])]
\end{aligned} \quad (59)$$

where $$\begin{aligned}
m_{ba} &= m_b(a_0 + a_{1i}) \\
m_{bbl} &= m_b(b_0^2 + c_0^2) + I_{bx} \\
m_{bal} &= m_b(a_0 + a_{1i})^2 + I_{by} \\
m_{sawn} &= m_{sn} + m_{an} + m_{wn} \\
m_{sawan} &= (m_{sn} + m_{an} + m_{wn})a_{1n} \\
m_{sawbn} &= (m_{sn} + m_{an} + m_{wn})b_{2n} \\
m_{sawcn} &= m_{sn}c_{1n} + (m_{an} + m_{wn})c_{2n} \\
m_{saw2n} &= (m_{sn} + m_{an} + m_{wn})a_{1n}^2 \\
m_{sawln} &= m_{an}e_{1n}^2 + m_{wn}e_{3n}^2 + m_{sn}(c_{1n}^2 + b_{2n}^2 - 2c_{1n}b_{2n}\sin\gamma_n) + \\
&\quad (m_{an} + m_{wn})(c_{2n}^2 + b_{2n}^2 - 2c_{2n}b_{2n}\sin\gamma_n) + I_{axn} \\
m_{aw2ln} &= m_{an}e_{1n}^2 + m_{wn}e_{3n}^2 + I_{axn} \\
m_{awln} &= m_{an}e_{1n} + m_{wn}e_{3n} \\
m_{aw2n} &= m_{an}e_{1n}^2 + m_{wn}e_{3n}^2
\end{aligned} \quad (60)$$

Hereafter variables and coefficients which have index "n" implies implicit or explicit that they require summation with n=i, ii, iii, and iv.

Total potential energy is:

$$U_{tot} = U_b + \sum_{n=i}^{iv} |U_{sn} + U_{an} + U_{wn} + U_{zn}| \quad (61)$$

$$\begin{aligned}
&= m_b g\{z_0 - (a_0 + a_{1n})\sin\beta + (b_0\sin\alpha + c_0\cos\alpha)\cos\beta\} + \\
&\quad \sum_{n=i}^{iv}\left|m_{sn}g[z_0 + \{z_{6n}\cos(\alpha + \gamma_n + \eta_n) + \right. \\
&\quad c_{1n}\cos(\alpha + \gamma_n) + b_{2n}\sin\alpha\}\cos\beta - a_{1n}\sin\beta] + \\
&\quad \frac{1}{2}k_{sn}(z_{6n} - l_{sn})^2 + m_{an}g[z_0 + \{e_{1n}\sin(\alpha + \gamma_n + \theta_n) + \\
&\quad c_{2n}\cos(\alpha + \gamma_n) + b_{2n}\sin\alpha\}\cos\beta - a_{1n}\sin\beta] + \\
&\quad m_{wn}g[z_0 + \{e_{3n}\sin(\alpha + \gamma_n + \theta_n) + c_{2n}\cos(\alpha + \gamma_n) + \\
&\quad \left. b_{2n}\sin\alpha\}\cos\beta - a_{1n}\sin\beta] + \frac{1}{2}k_{wn}(z_{12n} - l_{wn})^2\right| + \\
&\quad \frac{1}{2}k_{zi}e_{oi}^2\{\sin(\gamma_i + \theta_i) + \sin(\gamma_{ii} + \theta_{ii})\}^2 + \\
&\quad \frac{1}{2}k_{ziii}e_{oiii}^2\{\sin(\gamma_{iii} + \theta_{iii}) + \sin(\gamma_{iv} + \theta_{iv})\}^2
\end{aligned} \quad (62)$$

$$\begin{aligned}
&= g\{z_0 m_b - m_{ba}\sin\beta + m_b(b_0\sin\alpha + c_0\cos\alpha)\cos\beta\} + \\
&\quad \sum_{n=i}^{iv}\left\langle g[\{z_0 m_{sawn} + m_{sn}z_{6n}\cos(\alpha + \gamma_n + \eta_n) + \right. \\
&\quad m_{awln}\sin(\alpha + \gamma_n + \theta_n) + m_{sawcn}\cos(\alpha + \gamma_n) + \\
&\quad m_{sawbn}\sin\alpha\}\cos\beta - m_{sawan}\sin\beta] + \\
&\quad \left. \frac{1}{2}k_{sn}(z_{6n} - l_{sn})^2 + \frac{1}{2}k_{wn}(z_{12n} - l_{wn})^2\right\rangle + \\
&\quad \frac{1}{2}k_{zi}e_{0i}^2\{\sin(\gamma_i + \theta_i) + \sin(\gamma_{ii} + \theta_{ii})\}^2 + \\
&\quad \frac{1}{2}k_{ziii}e_{oiii}^2\{\sin(\gamma_{iii} + \theta_{iii}) + \sin(\gamma_{iv} + \theta_{iv})\}^2
\end{aligned} \quad (63)$$

where $$\begin{aligned}
m_{ba} &= m_b(a_0 + a_{1i}) \\
m_{sawan} &= (m_{sn} + m_{an} + m_{wn})a_{1n} \\
m_{sawbn} &= (m_{sn} + m_{an} + m_{wn})b_{2n} \\
m_{sawcn} &= m_{sn}c_{1n} + (m_{an} + m_{wn})c_{2n} \\
\gamma_{ii} &= -\gamma_i
\end{aligned} \quad (64)$$

4. Lagrange's Equation

The Lagrangian is written as:

$$L = T_{tot} - U_{tot} \quad (65)$$

$$\begin{aligned}
&= \frac{1}{2}[\dot{\alpha}^2 m_{bbl} + \dot{\beta}^2\{m_{bal} + m_b(b_0\sin\alpha + c_0\cos\alpha)^2\} + \dot{z}_0^2 m_b - \\
&\quad (2\dot{\alpha}\dot{\beta}m_{ba} - \dot{z}_0 m_b\cos\beta)(b_0\cos\alpha - c_0\sin\alpha)] - \\
&\quad 2\dot{\beta}\dot{z}_0\{m_{ba}\cos\beta + m_b(b_0\sin\alpha + c_0\cos\alpha)\sin\beta\}] +
\end{aligned}$$

-continued $$\frac{1}{2}\sum_{n=i}^{iv}\left[m_{sn}(\dot{z}_{6n}^2+\dot{\eta}_n^2 z_{6n}^2)+\dot{\theta}_n^2 m_{aw2ln}+z_0^2 m_{sawn}+\right.$$

$$\dot{\alpha}^2\{m_{sawln}+m_{sn}z_{6n}[z_{6n}+2\{c_{1n}\cos\eta_n-b_{2n}\sin(\gamma_n+\eta_n)\}]-2m_{awln}\{c_{2n}\sin\theta_n-b_{2n}\cos(\gamma_n+\theta_n)\})+\dot{\beta}^2\langle m_{saw2n}+m_{sn}\{z_{6n}\cos(\alpha+\gamma_n+\eta_n)+c_{1n}\cos(\alpha+\gamma_n)+b_{2n}\sin\alpha\}^2+m_{an}\{e_1\sin(\alpha+\gamma_n+\theta_n)+c_{2n}\cos(\alpha+\gamma_n)+b_{2n}\sin\alpha\}^2+m_{wn}\{e_3\sin(\alpha+\gamma_n+\theta_n)+c_{2n}\cos(\alpha+\gamma_n)+b_{2n}\sin\alpha\}^2\rangle+2\dot{z}_{6n}\dot{\alpha}m_{sn}\{c_{1n}\sin\eta_n+b_{2n}\cos(\gamma_n+\eta_n)\}-2\dot{z}_{6n}\dot{\beta}m_{sn}a_{1n}\cos(\alpha+\gamma_n+\eta_n)+2\dot{\eta}_n\dot{\alpha}m_{sn}z_{6n}\{z_{6n}+c_{1n}\cos\eta_n-b_{2n}\sin(\gamma_n+\eta_n)\}+2\dot{\eta}_n\dot{\beta}m_{sn}z_{6n}a_{1n}\sin(\alpha+\gamma_n+\eta_n)+2\dot{\theta}\dot{\alpha}[m_{aw2ln}-m_{awln}\{c_{2n}\sin\theta_n-b_{2n}\cos(\gamma_n+\theta_n)\}]-2\dot{\theta}\dot{\beta}m_{awln}a_{1n}\cos(\alpha+\gamma_n+\theta_n)+2\dot{\alpha}\dot{\beta}a_{1n}\{m_{sawcn}\sin(\alpha+\gamma_n)-m_{sawbn}\cos\alpha+m_{sn}z_{6n}\sin(\alpha+\gamma_n+\eta_n)-m_{awln}\cos(\alpha+\gamma_n+\theta_n)\}+2\dot{z}_0\{z_{6n}m_{sn}\cos(\alpha+\gamma_n+\eta_n)+(\dot{\alpha}+\dot{\theta}_n)m_{awln}\cos(\alpha+\gamma_n+\theta_n)-(\dot{\alpha}+\dot{\eta}_n)z_{6n}m_{sn}\sin(\alpha+\gamma_n+\eta_n)-\dot{\alpha}m_{sawcn}\sin(\alpha+\gamma_n)+\dot{\alpha}m_{sawbn}\cos\alpha-\dot{\beta}m_{sawcn}\}\cos\beta-2\dot{\beta}\dot{z}_0[\{z_{6n}m_{sn}\sin(\alpha+\gamma_n+\eta_n)-m_{awln}\sin(\alpha+\gamma_n+\theta_n)+m_{sawcn}\cos(\alpha+\gamma_n)+m_{sawbn}\sin\alpha\}\sin\beta]-g\{z_0 m_b-m_{ba}\sin\beta+m_b(b_0\sin\alpha+c_0\cos\alpha)\cos\beta\}-\frac{1}{2}k_{zi}e_{0i}^2\{\sin(\gamma_i+\theta_i)+\sin(\gamma_{ii}+\theta_{ii})\}^2-\frac{1}{2}k_{ziii}e_{0iii}^2\{\sin(\gamma_{iii}+\theta_{iii})+\sin(\gamma_{iv}+\theta_{iv})\}^2-\sum_{n=i}^{iv}\left\langle g[z_0 m_{sawn}+\{m_{sn}z_{6n}\cos(\alpha+\gamma_n+\eta_n)+m_{awln}\sin(\alpha+\gamma_n+\theta_n)+m_{sawcn}\cos(\alpha+\gamma_n)+m_{sawbn}\sin\alpha\}\cos\beta-m_{sawan}\sin\beta]+\frac{1}{2}k_{sn}(z_{6n}-l_{sn})^2+\frac{1}{2}k_{wn}(z_{12n}-l_{wn})^2\right\rangle$$

$$\frac{\partial L}{\partial z_0}=-g(m_b+m_{sawn})$$

$$\frac{\partial L}{\partial \dot{z}_0}=\dot{z}_0 m_b+\dot{\alpha}m_b\cos\beta(b_0\cos\alpha-c_0\sin\alpha)-\dot{\beta}\{m_{ba}\cos\beta+m_b(b_0\sin\alpha+c_0\cos\alpha)\sin\beta\}+\dot{z}_0 m_{sawn}+\{z_{6n}m_{sn}\cos(\alpha+\gamma_n+\eta_n)+(\dot{\alpha}+\dot{\theta}_n)m_{awln}\cos(\alpha+\gamma_n+\theta_n)-(\dot{\alpha}+\dot{\eta}_n)z_{6n}m_{sn}\sin(\alpha+\gamma_n+\eta_n)-\dot{\alpha}m_{sawcn}\sin(\alpha+\gamma_n)+\dot{\alpha}m_{sawbn}\cos\alpha-\dot{\beta}m_{sawan}\}\cos\beta-\dot{\beta}\{m_{awln}\sin(\alpha+\gamma_n+\theta_n)-z_{6n}m_{sn}\cos(\alpha+\gamma_n+\eta_n)+m_{sawcn}\cos(\alpha+\gamma_n)+m_{sawbn}\sin\alpha\}\sin\beta$$

$$\frac{d}{dt}\left(\frac{\partial L}{\partial \dot{z}_0}\right)=\ddot{z}_0(m_b+m_{sawn})+\ddot{\alpha}m_b(b_0\cos\alpha-c_0\sin\alpha)-\dot{\beta}\dot{\alpha}m_b\sin\beta(b_0\cos\alpha-c_0\sin\alpha)+\dot{\alpha}^2 m_b\cos\beta(b_0\sin\alpha+c_0\cos\alpha)-\ddot{\beta}\{m_{ba}\cos\beta+m_b(b_0\sin\alpha+c_0\cos\alpha)\sin\beta\}+\dot{\beta}\{\dot{\beta}m_{ba}\sin\beta+\dot{\alpha}m_b(b_0\cos\alpha-c_0\sin\alpha)\sin\beta+\dot{\beta}m_b(b_0\sin\alpha+c_0\cos\alpha)\cos\beta\}+\{\ddot{z}_{6n}m_{sn}\cos(\alpha+\gamma_n+\eta_n)-(\dot{\alpha}+\dot{\eta}_n)\dot{z}_{6n}m_{sn}\sin(\alpha+\gamma_n+\eta_n)\}-(\ddot{\alpha}+\ddot{\eta}_n)z_{6n}m_{sn}\sin(\alpha+\gamma_n+\eta_n)-(\dot{\alpha}+\dot{\eta}_n)\dot{z}_{6n}m_{sn}\sin(\alpha+\gamma_n+\eta_n)-(\dot{\alpha}+\dot{\eta}_n)^2 z_{6n}m_{sn}\cos(\alpha+\gamma_n+\eta_n)-\ddot{\alpha}m_{sawcn}\sin(\alpha+\gamma_n)-\dot{\alpha}^2 m_{sawcn}\sin(\alpha+\gamma_n)+\ddot{\alpha}m_{sawbn}\cos\alpha-\dot{\alpha}^2 m_{sawbn}\sin\alpha-\ddot{\beta}m_{sawan}\}\cos\beta-\dot{\beta}\{\dot{z}_{6n}m_{sn}\cos(\alpha+\gamma_n+\eta_n)-(\dot{\alpha}+\dot{\theta}_n)m_{awln}\cos(\alpha+\gamma_n+\theta_n)-(\dot{\alpha}+\dot{\eta}_n)z_{6n}m_{sn}\sin(\alpha+\gamma_n+\eta_n)-\dot{\alpha}m_{sawcn}\sin(\alpha+\gamma_n)-\dot{\alpha}m_{sawbn}\cos\alpha-\dot{\beta}m_{sawan}\}\sin\beta-\ddot{\beta}\{m_{awln}\sin(\alpha+\gamma_n+\theta_n)+z_{6n}m_{sn}\cos(\alpha+\gamma_n+\eta_n)+m_{sawcn}\cos(\alpha+\gamma_n)+m_{sawbn}\sin\alpha\}\sin\beta-\dot{\beta}\{(\dot{\alpha}+\dot{\theta}_n)m_{awln}\cos(\alpha+\gamma_n+\theta_n)+\dot{z}_{6n}m_{sn}\cos(\alpha+\gamma_n+\eta_n)-(\dot{\alpha}+\dot{\eta}_n)z_{6n}m_{sn}\sin(\alpha+\gamma_n+\eta_n)-\dot{\alpha}m_{sawcn}\sin(\alpha+\gamma_n)+\dot{\alpha}m_{sawbn}\cos\alpha\}\sin\beta-\dot{\beta}^2\{m_{awln}\sin(\alpha+\gamma_n+\theta_n)-z_{6n}m_{sn}\cos(\alpha+\gamma_n+\eta_n)+m_{sawcn}\cos(\alpha+\gamma_n)+m_{sawbn}\sin\alpha\}\cos\beta$$

$$\frac{\partial L}{\partial \beta}=-\dot{\alpha}\dot{z}_0 m_b\sin\beta(b_0\cos\alpha-c_0\sin\alpha)+\dot{\beta}\dot{z}_0\{m_{ba}\sin\beta-m_b(b_0\sin\alpha-c_0\cos\alpha)\cos\beta\})g\{m_{ba}\cos\beta+m_b(b_0\sin\alpha+c_0\cos\alpha)\sin\beta+\langle g[\{m_{sn}z_{6n}\cos(\alpha+\gamma_n+\eta_n)+m_{awln}\sin(\alpha+\gamma_n+\theta_n)+m_{sawcn}\cos(\alpha+\gamma_n)+m_{sawbn}\sin\alpha\}\sin\beta+m_{sawan}\cos\beta]-\dot{z}_0\{z_{6n}m_{sn}\cos(\alpha+\gamma_n+\eta_n)+(\dot{\alpha}+\dot{\theta}_n)m_{awln}\cos(\alpha+\gamma_n+\theta_n)-(\dot{\alpha}+\dot{\eta}_n)z_{6n}m_{sn}\sin(\alpha+\gamma_n+\eta_n)-\dot{\alpha}m_{sawcn}\sin(\alpha+\gamma_n)+\dot{\alpha}m_{sawbn}\cos\alpha-$$

(66)

$\dot{\beta} m_{sawcn}\} \sin\beta + \dot{\beta}\dot{z}_0 \{m_{awln}\sin(\alpha+\gamma_n+\theta_n) +$ $z_{6n} m_{sn}\cos(\alpha+\gamma_n+\eta_n) +$ $m_{sawcn}\cos(\alpha+\gamma_n) + m_{sawbn}\sin\alpha\}\cos\beta\rangle$ $$\frac{\partial L}{\partial \alpha} = \{\dot{\beta}^2 m_b(b_0\cos\alpha - c_0\sin\alpha) + \dot{\alpha}\dot{\beta} m_{ba}\}(b_0\sin\alpha + \tag{67}$$

$c_0\cos\alpha) - \dot{\alpha}\dot{z}_0 m_b\cos\beta(b_0\sin\alpha +$ $c_0\cos\alpha) - \dot{\beta}\dot{z}_0 m_b(b_0\cos\alpha - c_0\sin\alpha)\sin\beta +$ $|\dot{\beta}^2\langle m_{sn}\{z_{6n}\cos(\alpha+\gamma_n+\eta_n) + c_{1n}\cos(\alpha+\gamma_n) +$ $b_{2n}\sin\alpha\}\{-z_{6n}\sin(\alpha+\gamma_n+\eta_n) -$ $c_{1n}\sin(\alpha+\gamma_n) + b_{2n}\cos\alpha\} +$ $m_{an}\{e_{1n}\sin(\alpha+\gamma_n+\theta_n) + c_{2n}\cos(\alpha+\gamma_n) +$ $b_{2n}\sin\alpha\}\{e_1\cos(\alpha+\gamma_n+\theta_n) - c_{2n}\sin(\alpha+\gamma_n) +$ $b_{2n}\cos\alpha\} + m_{wn}\{e_{3n}\sin(\alpha+\gamma_n+\theta_n) +$ $c_{2n}\cos(\alpha+\gamma_n) + b_{2n}\sin\alpha\}\{e_3\cos(\alpha+\gamma_n+\theta_n) -$ $c_{2n}\sin(\alpha+\gamma_n) + b_{2n}\cos\alpha\}\rangle +$ $\dot{z}_{6n}\dot{\beta}m_{sn}a_{1n}\sin(\alpha+\gamma_n+\eta_n) +$ $\dot{\eta}_n\dot{\beta}m_{sn}z_{6n}a_{1n}\cos(\alpha+\gamma_n+\eta_n) +$ $\dot{\theta}\dot{\beta}m_{awln}a_{1_n}\sin(\alpha+\gamma_n+\theta_n) +$ $\dot{\alpha}\dot{\beta}a_{1n}\{m_{sawcn}\cos(\alpha+\gamma_n) + m_{sawbn}\sin\alpha +$ $m_{sn}z_{6n}\cos(\alpha+\gamma_n+\eta_n) + m_{awln}\sin(\alpha+\gamma_n+\theta_n)\} -$ $\dot{z}_0\{\dot{z}_{6n}m_{sn}\sin(\alpha+\gamma_n+\eta_n) +$ $(\dot{\alpha}+\dot{\theta}_n)m_{awln}\sin(\alpha+\gamma_n+\theta_n) +$ $(\dot{\alpha}+\dot{\eta}_n)z_{6n}m_{sn}\cos(\alpha+\gamma_n+\eta_n) +$ $\dot{\alpha}m_{sawcn}\cos(\alpha+\gamma_n) + \dot{\alpha}m_{sawbn}\sin\alpha\}\cos\beta -$ $\dot{\beta}\dot{z}_0[\{m_{awln}\cos(\alpha+\gamma_n+\theta_n) - z_{6n}m_{sn}\sin(\alpha+\gamma_n+\eta_n) -$ $m_{sawcn}\sin(\alpha+\gamma_n) + m_{sawbn}\cos\alpha\}\sin\beta] -$ $gm_b(b_0\cos\alpha - c_0\sin\alpha)\cos\beta + g\{m_{sn}z_{6n}\sin(\alpha+\gamma_n+\eta_n) -$ $m_{awln}\cos(\alpha+\gamma_n+\theta_n) +$ $m_{sawcn}\sin(\alpha+\gamma_n) - m_{sawbn}\cos\alpha\}\cos\beta$ $$\frac{\partial L}{\partial \eta_n} = \dot{\alpha}^2 m_{sn}z_{6n}\{-c_{1n}\sin\eta_n - b_{2n}\cos(\gamma_n+\eta_n)\} + \tag{68}$$

$\dot{\beta}^2 m_{sn}\{z_{6n}\cos(\alpha+\gamma_n+\eta_n) +$ $c_{1n}\cos(\alpha+\gamma_n) + b_{2n}\sin\alpha\}\{-z_{6n}\sin(\alpha+\gamma_n+\eta_n)\} +$ $+\dot{z}_{6n}\dot{\alpha}m_{sn}\{c_{1n}\cos\eta_n - b_{2n}\sin(\gamma_n+\eta_n)\} +$ $\dot{z}_{6n}\dot{\beta}m_{sn}a_{1n}\sin(\alpha+\gamma_n+\eta_n) -$ $\dot{\eta}_n\dot{\alpha}m_{sn}z_{6n}\{c_{1n}\sin\eta_n + b_{2n}\cos(\gamma_n+\eta_n)\} +$ $\dot{\eta}_n\dot{\beta}m_{sn}z_{6n}a_{1_n}\cos(\alpha+\gamma_n+\eta_n) +$ $\dot{\alpha}\dot{\beta}a_{1n}m_{sn}z_{6n}\cos(\alpha+\gamma_n+\eta_n) +$ $gm_{sn}z_{6n}\sin(\alpha+\gamma_n+\eta_n)\cos\beta -$ $\dot{z}_0\{z_{6n}m_{sn}\sin(\alpha+\gamma_n+\eta_n) +$ $(\dot{\alpha}+\dot{\eta}_n)z_{6n}m_{sn}\cos(\alpha+\gamma_n+\eta_n)\}\cos\beta +$ $\dot{\beta}\dot{z}_0 z_{6n} m_{sn}\sin(\alpha+\gamma_n+\eta_n)\sin\beta$ $$\frac{\partial L}{\partial \theta_n} = -k_{zi}e_{0i}^2\{\sin(\gamma_i+\theta_i) + \sin(\gamma_{ii}+\theta_{ii})\}\{\cos(\gamma_i+\theta_i) + \tag{69}$$

$\cos(\gamma_{ii}+\theta_{ii})\} - k_{ziii}e_{0iii}^2\{\sin(\gamma_{iii}+\theta_{iii}) +$ $\sin(\gamma_{iv}+\theta_{iv})\}\{\cos(\gamma_{iii}+\theta_{iii}) + \cos(\gamma_{iv}+\theta_{iv})\} -$ $\dot{\alpha}^2 m_{awln}\{c_{2n}\cos\theta_n + b_{2n}\sin(\gamma_n+\theta_n)\} +$ $\dot{\beta}^2\langle m_{an}\{e_{1n}\sin(\alpha+\gamma_n+\theta_n)c_{2n}\cos(\alpha+\gamma_n) +$ $b_{2n}\sin\alpha\}e_{1n}\cos(\alpha+\gamma_n+\theta_n) +$ $m_{wn}\{e_{3n}\sin(\alpha+\gamma_n+\theta_n) + c_{2n}\cos(\alpha+\gamma_n) +$ $b_{2n}\sin\alpha\}e_{3n}\cos(\alpha+\gamma_n+\theta_n)\rangle -$ $\dot{\theta}\dot{\alpha}m_{awln}\{c_{2n}\cos\theta_n + b_{2n}\sin(\gamma_n+\theta_n)\} +$ $\dot{\theta}\dot{\beta}m_{awln}a_{1n}\sin(\alpha+\gamma_n+\theta_n) +$ $\dot{\alpha}\dot{\beta}a_{1n}m_{awlm}\sin(\alpha+\gamma_n+\theta_n) -$ $gm_{awln}\cos(\alpha+\gamma_n+\theta_n)\cos\beta -$ $\dot{z}_0(\dot{\alpha}+\dot{\theta}_n)m_{awln}\sin(\alpha+\gamma_n+\theta_n)\cos\beta -$ $\dot{\beta}\dot{z}_0 m_{awln}\cos(\alpha+\gamma_n+\theta_n)\sin\beta$ $$\frac{\partial L}{\partial z_{6n}} = m_{sn}\dot{\eta}_n^2 z_{6n} + \dot{\alpha}^2 m_{sn}[z_{6n} + \{c_{1n}\cos\eta_n - \tag{70}$$

$b_{2n}\sin(\gamma_n+\eta_n)\}] +$ $\dot{\beta}^2 m_{sn}\{z_{6n}\cos(\alpha+\gamma_n+\eta_n) +$ $c_{1n}\cos(\alpha+\gamma_n) + b_{2n}\sin\alpha\}\cos(\alpha+\gamma_n+\eta_n) +$ $\dot{\eta}_n\dot{\alpha}m_{sn}\{2z_{6n} + c_{1n}\cos\eta_n - b_{2n}\sin(\gamma_n+\eta_n)\} +$ $\dot{\eta}_n\dot{\beta}m_{sn}a_{1n}\sin(\alpha+\gamma_n+\eta_n) +$ $\dot{\alpha}\dot{\beta}a_{1n}m_{sn}\sin(\alpha+\gamma_n+\eta_n) -$ $gm_{sn}\cos(\alpha+\gamma_n+\eta_n)\cos\beta - k_{sn}(z_{6n}-l_{sn}) -$ $(\dot{\alpha}+\dot{\eta}_n)\dot{z}_0 m_{sn}\sin(\alpha+\gamma_n+\eta_n)\cos\beta -$ $\dot{\beta}\dot{z}_0 m_{sn}\cos(\alpha+\gamma_n+\eta_n)\sin\beta$ $$\frac{\partial L}{\partial z_{12n}} = -k_{wn}(z_{12n}-l_{wn}) \tag{71}$$

$$\frac{\partial L}{\partial \dot{\beta}} = \dot{\beta}\langle m_{saw2n} + m_{bal} + m_b(b_0\sin\alpha + c_0\cos\alpha)^2 + \tag{72}$$

$m_{sn}\{z_{6n}\cos(\alpha+\gamma_n+\eta_n) + c_{1n}\cos(\alpha+\gamma_n) +$ $b_{2n}\sin\alpha\}^2 + m_{an}\{e_{1n}\sin(\alpha+\gamma_n+\theta_n) +$ $c_{2n}\cos(\alpha+\gamma_n) + b_{2n}\sin\alpha\}^2 +$ $m_{wn}\{e_{3n}\sin(\alpha+\gamma_n+\theta_n) + c_{2n}\cos(\alpha+\gamma_n) +$ $b_{2n}\sin\alpha\}^2\rangle - \dot{\alpha}m_{ba}(b_0\cos\alpha - c_0\sin\alpha) -$ $\dot{z}_{6n}m_{sn}a_{1n}\cos(\alpha+\gamma_n+\eta_n) +$ $\dot{\eta}_n m_{sn} z_{6n} a_{1n}\sin(\alpha+\gamma_n+\eta_n) -$ $\dot{\theta}m_{awln}a_{1n}\cos(\alpha+\gamma_n+\theta_n) +$ -continued $\dot{\alpha}a_{1n}\{m_{sawcn}\sin(\alpha+\gamma_n)-m_{sawbn}\cos\alpha+$ $m_{sn}\dot{z}_{6n}\sin(\alpha+\gamma_n+\eta_n)-$ $m_{aw1n}\cos(\alpha+\gamma_n+\theta_n)\}-\dot{z}_0[\{m_b b_0 \sin\alpha+$ $c_0\cos\alpha)+m_{aw1n}\sin(\alpha+\gamma_n+\eta_n)+$ $z_{6n}m_{sn}\cos(\alpha+\gamma_n+\eta_n)+$ $m_{sawcn}\cos(\alpha+\gamma_n)+m_{sawbn}\sin\alpha\}\sin\beta+$ $(m_{ba}+m_{sawcn})\cos\beta]$ $$\frac{d}{dt}\left(\frac{\partial L}{\partial\dot{\beta}}\right)=\ddot{\beta}\langle m_{saw2n}+m_{ba1}+m_b(b_0\sin\alpha+c_0\cos\alpha)^2+ \tag{73}$$

$m_{sn}\{z_{6n}\cos(\alpha+\gamma_n+\eta_n)+c_{1n}\cos(\alpha+\gamma_n)+$ $b_{2n}\sin\alpha\}^2+m_{an}\{e_{1n}\sin(\alpha+\gamma_n+\theta_n)+$ $c_{2n}\cos(\alpha+\gamma_n)+b_{2n}\sin\alpha\}^2+$ $m_{wn}\{e_{3n}\sin(\alpha+\gamma_n+\theta_n)+c_{2n}\cos(\alpha+\gamma_n)+$ $b_{2n}\sin\alpha\}^2\rangle+2\dot{\beta}\langle\dot{\alpha}m_b(b_0\sin\alpha+$ $c_0\cos\alpha)(b_0\cos\alpha-c_0\sin\alpha)+$ $m_{sn}\{z_{6n}\cos(\alpha+\gamma_n+\eta_n)+c_{1n}\cos(\alpha+\gamma_n)+$ $b_{2n}\sin\alpha\}\{\dot{z}_{6n}\cos(\alpha+\gamma_n+\eta_n)-$ $(\dot{\alpha}+\dot{\eta}_n)z_{6n}\sin(\alpha+\gamma_n+\eta_n)-$ $\dot{\alpha}[c_{1n}\sin(\alpha+\gamma_n)-b_{2n}\cos\alpha]\}+$ $m_{an}\{e_{1n}\sin(\alpha+\gamma_n+\theta_n)+c_{2n}\cos(\alpha+\gamma_n)+$ $b_{2n}\sin\alpha\}\{(\dot{\alpha}+\dot{\theta}_n)e_{1n}\cos(\alpha+\gamma_n+\theta_n)-$ $\dot{\alpha}[c_{2n}\sin(\alpha+\gamma_n)-b_{2n}\cos\alpha]\}+$ $m_{wn}\{e_{3n}\sin(\alpha+\gamma_n+\theta_n)+c_{2n}\cos(\alpha+\gamma_n)+$ $b_{2n}\sin\alpha\}\{(\dot{\alpha}+\dot{\theta}_n)e_{3n}\sin(\alpha+\gamma_n+\theta_n)-$ $\dot{\alpha}[c_{2n}\sin(\alpha+\gamma_n)-b_{2n}\cos\alpha]\}\rangle-$ $\ddot{\alpha}m_{ba}(b_0\cos\alpha-c_0\sin\alpha)+$ $\dot{\alpha}^2 m_{ba}(b_0\sin\alpha+c_0\cos\alpha)-$ $\ddot{z}_{6n}m_{sn}a_{1n}\cos(\alpha+\gamma_n+\eta_n)+$ $\dot{z}_{6n}(\dot{\alpha}+\dot{\eta}_n)m_{sn}a_{1n}\sin(\alpha+\gamma_n+\eta_n)+$ $\ddot{\eta}_n m_{sn}\dot{z}_{6n}a_{1n}\sin(\alpha+\gamma_n+\eta_n)+$ $\dot{\eta}_n m_{sn}\dot{z}_{6n}a_{1n}\sin(\alpha+\gamma_n+\eta_n)+$ $\dot{\eta}_n(\dot{\alpha}+\dot{\eta}_n)m_{sn}z_{6n}a_{1n}\cos(\alpha+\gamma_n+\eta_n)-$ $\ddot{\theta}_n m_{aw1n}a_{1n}\cos(\alpha+\gamma_n+\theta_n)+$ $\dot{\theta}_n(\dot{\alpha}+\dot{\theta}_n)m_{aw1n}a_{1n}\sin(\alpha+\gamma_n+\theta_n)+$ $\ddot{\alpha}a_{1n}\{m_{sawcn}\sin(\alpha+\gamma_n)-$ $m_{sawbn}\cos\alpha+m_{sn}z_{6n}\sin(\alpha+\gamma_n+\eta_n)-$ $m_{aw1n}\cos(\alpha+\gamma_n+\theta_n)\}+$ $\dot{\alpha}a_{1n}\{\dot{\alpha}m_{sawcn}\cos(\alpha+\gamma_n)+\dot{\alpha}m_{sawbn}\sin\alpha+$ $(\dot{\alpha}+\dot{\eta}_n)m_{sn}z_{6n}\cos(\alpha+\gamma_n+\eta_n)+$ $m_{sn}\dot{z}_{6n}\sin(\alpha+\gamma_n+\eta_n)+$ $(\dot{\alpha}+\dot{\theta}_n)m_{aw1n}\sin(\alpha+\gamma_n+\theta_n)\}-$ $\ddot{z}_0[\{m_b(b_0\sin\alpha+c_0\cos\alpha)+$ -continued $m_{aw1n}\sin(\alpha+\gamma_n+\theta_n)+$ $z_{6n}m_{sn}\cos(\alpha+\gamma_n+\eta_n)m_{sawcn}\cos(\alpha+\gamma_n)+$ $m_{sawbn}\sin\alpha\}\sin\beta+(m_{ba}+m_{sawcn}\cos\beta]-$ $\dot{z}_0[\{\dot{\alpha}m_b(b_0\cos\alpha-c_0\sin\alpha)-$ $(\dot{\alpha}+\dot{\theta}_n)m_{aw1n}\cos(\alpha+\gamma_n+\theta_n)+$ $\dot{z}_{6n}m_{sn}(\alpha+\gamma_n+\eta_n)-$ $(\dot{\alpha}+\dot{\eta}_n)z_{6n}m_{sn}\sin(\alpha+\gamma_n+\eta_n)-$ $\dot{\alpha}m_{sawcn}\sin(\alpha+\gamma_n)+\dot{\alpha}m_{sawbn}\cos\alpha\}\sin\beta+$ $\dot{\beta}\{m_b(b_0\sin\alpha+c_0\cos\alpha)+$ $m_{aw1n}\sin(\alpha+\gamma_n+\theta_n)+z_{6n}m_{sn}\cos(\alpha+\gamma_n+\eta_n)+$ $m_{sawcn}\cos(\alpha+\gamma_n)+m_{sawbn}\sin\alpha\}\cos\beta-$ $\dot{\beta}(m_{ba}+m_{sawan})\sin\beta\}$ $$\frac{\partial L}{\partial\dot{\alpha}}=\dot{\alpha}m_{bb1}-\dot{\beta}m_{ba}(b_0\cos\alpha-c_0\sin\alpha)+ \tag{74}$$

$\dot{z}_0 m_b\cos\beta(b_0\cos\alpha-c_0\sin\alpha)+$ $\dot{\alpha}\langle m_{sawln}+m_{sn}z_{6n}[z_{6n}+2\{c_{1n}\cos\eta_n-$ $b_{2n}\sin(\gamma_n+\eta_n)\}]-$ $2m_{aw1n}\{c_{2n}\sin\theta_n-b_{2n}\cos(\gamma_n+\theta_n)\}\rangle+$ $\dot{z}_{6n}m_{sn}\{c_{1n}\sin\eta_n+b_{2n}\cos(\gamma_n+\eta_n)\}+$ $\dot{\eta}_n m_{sn}z_{6n}\{z_{6n}+c_{1n}\cos\eta_n-b_{2n}\sin(\gamma_n+\eta_n)\}+$ $\dot{\theta}[m_{aw2ln}-m_{aw1n}\{c_{2n}\sin\theta_n-b_{2n}\cos(\gamma_n+\theta_n)\}]+$ $\dot{\beta}a_{1n}\{m_{sawcn}\sin(\alpha+\gamma_n)-m_{sawbn}\cos\alpha+$ $m_{sn}z_{6n}\sin(\alpha+\gamma_n+\eta_n)-m_{aw1n}\cos(\alpha+\gamma_n+\theta_n)\}+$ $\dot{z}_0\{m_{aw1n}\cos(\alpha+\gamma_n+\theta_n)-z_{6n}m_{sn}\sin(\alpha+\gamma_n+\eta_n)-$ $m_{sawcn}\sin(\alpha+\gamma_n)+m_{sawbn}\cos\alpha\}\cos\beta$ $$\frac{d}{dt}\left(\frac{\partial L}{\partial\dot{\alpha}}\right)=\ddot{\beta}\ddot{m}_{ba}(b_0\cos\alpha-c_0\sin\alpha)+\dot{\beta}\dot{\alpha}m_{ba}(b_0\sin\alpha+ \tag{75}$$

$c_0\cos\alpha)+\ddot{z}_0 m_b\cos\beta(b_0\cos\alpha-c_0\sin\alpha)-$ $\dot{\beta}\dot{z}_0 m_b\sin\beta(b_0\cos\alpha-c_0\sin\alpha)-$ $\dot{\alpha}\dot{z}_0 m_b\cos\beta(b_0\sin\alpha+c_0\cos\alpha)+$ $\ddot{\alpha}\langle m_{bb1}+m_{sawln}+m_{sn}z_{6n}[z_{6n}+2\{c_{1n}\cos\eta_n-$ $b_{2n}\sin(\gamma_n+\eta_n)\}]-2m_{aw1n}\{c_{2n}\sin\theta_n-$ $b_{2n}\cos(\gamma_n+\theta_n)\}\rangle+\dot{\alpha}\langle m_{sn}\dot{z}_{6n}[z_{6n}+2\{c_{1n}\cos\eta_n-$ $b_{2n}\sin(\gamma_n+\eta_n)\}]+m_{sn}z_{6n}[\dot{z}_{6n}-2\dot{\eta}_n\{c_{1n}\sin\eta_n+$ $b_{2n}\cos(\gamma_n+\eta_n)\}]-2\dot{\theta}_n m_{aw1n}\{c_{2n}\cos\theta_n+$ $b_{2n}\sin(\gamma_n+\theta_n)\}\rangle+\ddot{z}_{6n}m_{sn}\{c_{1n}\sin\eta_n+b_{2n}\cos(\gamma_n+$ $\eta_n)\}+\dot{z}_{6n}\dot{\eta}_n m_{sn}\{c_{1n}\cos\eta_n-b_{2n}\sin(\gamma_n+\eta_n)\}+$ $\ddot{\eta}_n m_{sn}z_{6n}\{z_{6n}+c_{1n}\cos\eta_n-b_{2n}\sin(\gamma_n+\eta_n)\}+$ $\dot{\eta}_n m_{sn}\dot{z}_{6n}\{z_{6n}+c_{1n}\cos\eta_n-b_{2n}\sin(\gamma+\eta_n)\}+$ $\dot{\eta}_n m_{sn}z_{6n}\{\dot{z}_{6n}-\dot{\eta}_n[c_{1n}\sin\eta_n+b_{2n}\cos(\gamma_n+\eta_n)]\}+$ $\ddot{\theta}[m_{aw2ln}-m_{aw1n}\{c_{2n}\sin\theta_n-b_{2n}\cos(\gamma_n+\theta_n)\}]-$ -continued $\dot{\theta}_n^2 m_{awIn}\{c_{2n}\cos\theta_n + b_{2n}\sin(\gamma_n + \theta_n)\}] +$ $\ddot{\beta}a_{1n}\{m_{sawcn}\sin(\alpha+\gamma_n) - m_{sawbn}\cos\alpha +$ $m_{sn}z_{6n}\sin(\alpha+\gamma_n+\eta_n) - m_{awIn}\cos(\alpha+\gamma_n+\theta_n)\} +$ $\dot{\beta}a_{1n}\{\dot{\alpha}[m_{sawcn}\cos(\alpha+\gamma_n)+m_{sawbn}\sin\alpha] +$ $m_{sn}\dot{z}_{6n}\sin(\alpha+\gamma_n+\eta_n) +$ $(\dot{\alpha}+\dot{\eta}_n)m_{sn}z_{6n}\cos(\alpha+\gamma_n+\eta_n) +$ $(\dot{\alpha}+\dot{\theta}_n)m_{awIn}\sin(\alpha+\gamma_n+\theta_n)\} -$ $\ddot{z}_0\{m_{awIn}\cos(\alpha+\gamma_n+\theta_n)+z_{6n}m_{sn}\sin(\alpha+\gamma_n+\eta_n) - m_{sawcn}\sin(\alpha+\gamma_n)+m_{sawbn}\cos\alpha\}\cos\beta -$ $\dot{z}_0\{-(\dot{\alpha}+\dot{\theta}_n)m_{awIn}\sin(\alpha+\gamma_n+\theta_n) +$ $\dot{z}_{6n}m_{sn}\sin(\alpha+\gamma_n+\eta_n) -$ $(\dot{\alpha}+\dot{\eta}_n)z_{6n}m_{sn}\cos(\alpha+\gamma_n+\eta_n) -$ $\dot{\alpha}m_{sawcn}\cos(\alpha+\gamma_n) - \dot{\alpha}m_{sawbn}\sin\alpha\}\cos\beta -$ $\dot{\beta}\dot{z}_0\{m_{awIn}\cos(\alpha+\gamma_n+\theta_n) -$ $z_{6n}m_{sn}\sin(\alpha+\gamma_n+\eta_n) -$ $m_{sawcn}\sin(\alpha+\gamma_n)+m_{sawbn}\cos\alpha\}\sin\beta$ $$\frac{\partial L}{\partial \dot{\eta}_n} = m_{sn}\dot{\eta}_n z_{6n}^2 + \dot{\alpha}m_{sn}z_{6n}\{z_{6n}+c_{1n}\cos\eta_n - b_{2n}\sin(\gamma_n+\eta_n)\} + \dot{\beta}m_{sn}6_{6n}a_{1n}\sin(\alpha+\gamma_n+\eta_n) - \dot{z}_0 z_{6n} m_{sn}\sin(\alpha+\gamma_n+\eta_n)\cos\beta \quad (76)$$

$$\frac{d}{dt}\left(\frac{\partial L}{\partial \dot{\eta}_n}\right) = m_{sn}\ddot{\eta}_n z_{6n}^2 + 2m_{2n}\dot{\eta}_n \dot{z}_{6n}z_{6n} + \quad (77)$$

$\ddot{\alpha}m_{sn}z_{6n}\{z_{6n}+c_{1n}\cos\eta_n-b_{2n}\sin(\gamma_n+\eta_n)\} +$ $\dot{\alpha}m_{sn}\dot{z}_{6n}\{z_{6n}+c_{1n}\cos\eta_n-b_{2n}\sin(\gamma_n+\eta_n)\} +$ $\dot{\alpha}m_{sn}z_{6n}\{\dot{z}_{6n}-\dot{\eta}_n[c_{1n}\sin\eta_n+b_{2n}\cos(\gamma_n+\eta_n)]\} +$ $\ddot{\beta}m_{sn}z_{6n}a_{1n}\sin(\alpha+\gamma_n+\eta_n) +$ $\dot{\beta}m_{sn}\dot{z}_{6n}a_{1n}\sin(\alpha+\gamma_n+\eta_n) +$ $\dot{\beta}(\dot{\alpha}+\dot{\eta}_n)m_{sn}z_{6n}a_{1n}\cos(\alpha+\gamma_n+\eta_n) -$ $\ddot{z}_0 z_{6n} m_{sn}\sin(\alpha+\gamma_n+\eta_n)\cos\beta -$ $\dot{z}_0 \dot{z}_{6n} m_{sn}\sin(\alpha+\gamma_n+\eta_n)\cos\beta -$ $(\dot{\alpha}+\dot{\eta}_n)\dot{z}_0 z_{6n} m_{sn}\cos(\alpha+\gamma_n+\eta_n)\cos\beta -$ $\dot{\beta}\dot{z}_0 z_{6n} m_{sn}\sin(\alpha+\gamma_n+\eta_n)\cos\beta$ $$\frac{\partial L}{\partial \dot{\theta}_n} = \dot{\theta}_n m_{aw2In} + \dot{\alpha}[m_{aw2In} - m_{awIn}\{c_{2n}\sin\theta_n - b_{2n}\cos(\gamma_n+\theta_n)\}] - \dot{\beta}m_{awIn}a_{1n}\cos(\alpha+\gamma_n+\theta_n) + \dot{z}_0 m_{awIn}\cos(\alpha+\gamma_n+\theta_n)\cos\beta \quad (78)$$

$$\frac{d}{dt}\left(\frac{\partial L}{\partial \dot{\theta}_n}\right) = \ddot{\theta}_n m_{aw2In} + \ddot{\alpha}[m_{aw2In} - m_{awIn}\{c_{2n}\sin\theta_n - \quad (79)$$

$b_{2n}\cos(\gamma_n+\theta_n)\}] - \dot{\alpha}\dot{\theta}_n m_{awIn}\{c_{2n}\cos\theta_n +$ $b_{2n}\sin(\gamma_n+\theta_n)\} - \ddot{\beta}m_{awIn}a_{1n}\cos(\alpha+\gamma_n+\theta_n) +$ $\dot{\beta}(\dot{\alpha}+\dot{\theta}_n)m_{awIn}a_{1n}\sin(\alpha+\gamma_n+\theta_n) +$ $\ddot{z}_0 m_{awIn}\cos(\alpha+\gamma_n+\theta_n)\cos\beta -$ $(\dot{\alpha}+\dot{\theta}_n)\dot{z}_0 m_{awIn}\sin(\alpha+\gamma_n+\theta_n)\cos\beta -$ $\dot{\beta}\dot{z}_0 m_{awIn}\cos(\alpha+\gamma_n+\theta_n)\sin\beta$ $$\frac{\partial L}{\partial \dot{z}_{6n}} = m_{sn}\dot{z}_{6n} + \dot{\alpha}m_{sn}\{c_{1n}\sin\eta_n + b_{2n}\cos(\gamma_n+\eta_n)\} - \quad (80)$$

$\dot{\beta}m_{sn}a_{1n}\cos(\alpha+\gamma_n+\eta_n) +$ $\dot{z}_0 m_{sn}\cos(\alpha+\gamma_n+\eta_n)\cos\beta$ $$\frac{d}{dt}\left(\frac{\partial L}{\partial \dot{z}_{6n}}\right) = m_{sn}\ddot{z}_{6n} + \ddot{\alpha}m_{sn}\{c_{1n}\sin\eta_n+b_{2n}\cos(\gamma_n+\eta_n)\} + \quad (81)$$

$\dot{\alpha}\dot{\eta}_n m_{sn}\{\cos\eta_n - b_{2n}\sin(\gamma_n+\eta_n)\} -$ $\ddot{\beta}m_{sn}a_{1n}\cos(\alpha+\gamma_n+\eta_n) +$ $\dot{\beta}(\dot{\alpha}+\dot{\eta}_n)m_{sn}a_{1n}\sin(\alpha+\gamma_n+\eta_n) +$ $\ddot{z}_0 m_{sn}\cos(\alpha+\gamma_n+\eta_n)\cos\beta -$ $(\dot{\alpha}+\dot{\eta}_n)\dot{z}_0 m_{sn}\sin(\alpha+\gamma_n+\eta_n)\cos\beta -$ $\dot{\beta}\dot{z}_0 m_{sn}\cos(\alpha+\gamma_n+\eta_n)\sin\beta$ $$\frac{\partial L}{\partial \dot{z}_{12n}} = 0 \quad (82)$$

$$\frac{d}{dt}\left(\frac{\partial L}{\partial \dot{z}_{12n}}\right) = 0 \quad (83)$$

The dissipative function is:

$$F_{tot} = -\frac{1}{2}(c_{sn}\dot{z}_{6n}^2 + c_{wn}\dot{z}_{12n}^2) \quad (84)$$

The constraints are based on geometrical constraints, and the touch point of the road and the wheel. The geometrical constraint is expressed as $$e_{2n}\cos\theta_n = -(z_{6n}-d_{1n})\sin\eta_n \quad (85)$$

$$e_{2n}\sin\theta_n - (z_{6n}-d_{1n})\cos\eta_n = c_{1n}-c_{2n}$$

The touch point of the road and the wheel is defined as $$z_{tn} = z_{p^r_{touchpointn}} \quad (86)$$

$$= z_0 + \{z_{12n}\cos\alpha + e_{3n}\sin(\alpha+\gamma_n+\theta_n) + c_{2n}\cos(\alpha+\gamma_n) + b_{2n}\sin\alpha\}\cos\beta - a_{1n}\sin\beta$$

$$= R_n(t)$$

where $R_n(t)$ is road input at each wheel.

Differentials are:

$$\dot{\theta}_n e_{2n}\sin\theta_n - \dot{z}_{6n}\sin\eta_n - \dot{\eta}_n(z_{6n} - d_{1n})\cos\eta_n = 0 \quad (87)$$

$$\dot{\theta}_n e_{2n}\cos\theta_n - \dot{z}_{6n}\cos\eta_n + \dot{\eta}_n(z_{6n} - d_{1n})\sin\eta_n = 0$$

$$\dot{z}_0 + \{\dot{z}_{12n}\cos\alpha - \dot{\alpha}z_{12n}\sin\alpha + (\dot{\alpha} + \dot{\theta}_n)\, e_{3n}\cos(\alpha + \gamma_n + \theta_n) -$$

$$\dot{\alpha}c_{2n}\sin(\alpha + \gamma_n) + \dot{\alpha}b_{2n}\cos\alpha\}\cos\beta -$$

$$\dot{\beta}[\{z_{12n}\cos\alpha + e_{3n}\sin(\alpha + \gamma_n + \theta_n) + c_{2n}\cos(\alpha + \gamma_n) + b_{2n}\sin\alpha\}$$

$$\sin\beta + a_{1n}\cos\beta] - \dot{R}_n(t) = 0$$

Since the differentials of these constraints are written as $$\sum_j a_{lnj}d\dot{q}_j + a_{lnt}dt = 0 \quad (l = 1, 2, 3 \quad n = i, ii, iii, iv) \quad (88)$$

then the values $a_{lnj}$ are obtained as follows.

$$a_{1n0} = 0 \quad (89)$$
$$a_{2n0} = 0$$
$$a_{3n0} = 1$$

$$a_{1n1} = 0, \; a_{1n2} = 0, \; a_{1n3} = -(z_{6n} - d_{1n})\cos\eta_n, \; a_{1n4} = e_{2n}\sin\theta_n,$$
$$a_{1n5} = -\sin\eta_n, \; a_{1n6} = 0$$
$$a_{2n1} = 0, \; a_{2n2} = 0, \; a_{2n3} = (z_{6n} - d_{1n})\sin\eta_n, \; a_{2n4} = e_{2n}\cos\theta_n,$$
$$a_{2n5} = -\cos\eta_n, \; a_{2n6} = 0$$
$$a_{3n1} =$$
$$-\{z_{12n}\cos\alpha + e_{3n}\sin(\alpha + \gamma_n + \theta_n) + c_{2n}\cos(\alpha + \gamma_n) + b_{2n}\sin\alpha\}$$
$$\sin\beta + a_{1n}\cos\beta,$$
$$a_{3n2} = \{-z_{12n}\sin\alpha + e_{3n}\cos(\alpha + \gamma_n + \theta_n) -$$
$$c_{2n}\sin(\alpha + \gamma_n) + b_{2n}\cos\alpha\}\cos\beta,$$
$$a_{3n3} = 0, \; a_{3n4} = e_{3n}\cos(\alpha + \gamma_n + \theta_n)\cos\beta, \; a_{3n5} = 0,$$
$$a_{3n6} = \cos\alpha\cos\beta$$

From the above, Lagrange's equation becomes $$\frac{d}{dt}\left(\frac{\partial L}{\partial \dot{q}_j}\right) - \frac{\partial L}{\partial q_j} = Q_j + \sum_{l,n}\lambda_{ln}a_{lnj} \quad (90)$$

where $$q_0 = z_0 \quad (91)$$

$$q_1 = \beta, \; q_2 = \alpha,$$

| | | | |
|---|---|---|---|
| $q_{3i} = \eta_i,$ | $q_{4i} = \theta_i,$ | $q_{5i} = z_{6i},$ | $q_{6i} = z_{12i}$ |
| $q_{3ii} = \eta_{ii},$ | $q_{4ii} = \theta_{ii},$ | $q_{5ii} = z_{6ii},$ | $q_{6ii} = z_{12ii}$ |
| $q_{3iii} = \eta_{iii},$ | $q_{4iii} = \theta_{iii},$ | $q_{5iii} = z_{6iii},$ | $q_{6iii} = z_{12iii}$ |
| $q_{3iv} = \eta_{iv},$ | $q_{4iv} = \theta_{iv},$ | $q_{5iv} = z_{6iv},$ | $q_{6iv} = z_{12iv}$ |

$$\frac{d}{dt}\left(\frac{\partial L}{\partial \dot{z}_0}\right) - \frac{\partial L}{\partial z_0} = \frac{\partial F}{\partial \dot{z}_0} + \sum_{l,n}\lambda_{ln}a_{ln0} \quad l = 1, 2, 3 \quad n = i, ii, iii, iv$$

$$\ddot{z}_0(m_b + m_{sawn}) + \ddot{\alpha}m_b\cos\beta(b_0\cos\alpha - c_0\sin\alpha) -$$
$$\dot{\beta}\dot{\alpha}m_b\sin\beta(b_0\cos\alpha - c_0\sin\alpha) - \dot{\alpha}^2 m_b\cos\beta(b_0\sin\alpha - c_0\cos\alpha) -$$
$$\ddot{\beta}\{m_{ba}\cos\beta + m_b(b_0\sin\alpha - c_0\cos\alpha)\sin\beta\} + \dot{\beta}\{\dot{\beta}m_{ba}\sin\beta +$$
$$\dot{\alpha}m_b(b_0\cos\alpha - c_0\sin\alpha)\sin\beta + \dot{\beta}m_b(b_0\sin\alpha - c_0\cos\alpha)\cos\beta\} +$$
$$\{\ddot{z}_{6n}m_{sn}\cos(\alpha + \gamma_n + \eta_n) - (\dot{\alpha} + \dot{\eta}_n)\dot{z}_{6n}m_{sn}\sin(\alpha + \gamma_n + \eta_n) +$$
$$(\ddot{\alpha} + \ddot{\theta}_n)m_{awln}\cos(\alpha + \gamma_n + \theta_n) - (\dot{\alpha} + \dot{\theta}_n)^2 m_{awln}\sin(\alpha + \gamma_n + \theta_n) +$$
$$(\ddot{\alpha} + \ddot{\theta}_n)z_{6n}m_{sn}\sin(\alpha + \gamma_n + \eta_n) - (\dot{\alpha} + \dot{\eta}_n)^2 z_{6n}m_{sn}\sin(\alpha + \gamma_n + \eta_n) +$$
$$(\dot{\alpha} + \dot{\theta}_n)^2 z_{6n}m_{sn}\cos(\alpha + \gamma_n + \eta_n) - \ddot{\alpha}m_{sawcn}\sin(\alpha + \gamma_n) -$$
$$\dot{\alpha}^2 m_{sawcn}\cos(\alpha + \gamma_n) + \ddot{\alpha}m_{sawbn}\cos\alpha - \dot{\alpha}^2 m_{sawbn}\sin\alpha - \ddot{\beta}m_{sawan}\}\cos$$
$$\beta - \dot{\beta}\{\dot{z}_{6n}m_{sn}\cos(\alpha + \gamma_n + \eta_n) + (\dot{\alpha} + \dot{\theta}_n)m_{awln}\cos(\alpha + \gamma_n + \theta_n) -$$
$$(\dot{\alpha} + \dot{\eta}_n)z_{6n}m_{sn}\sin(\alpha + \gamma_n + \eta_n) - \dot{\alpha}m_{sawcn}\sin(\alpha + \gamma_n)$$
$$+ \dot{\alpha}m_{sawbn}\cos\alpha - \dot{\beta}m_{sawan}\}\sin\beta - \dot{\beta}(m_{awln}\sin(\alpha + \gamma_n + \theta_n) -$$
$$z_{6n}m_{sn}\cos(\alpha + \gamma_n + \eta_n) + m_{sawcn}\cos(\alpha + \gamma_n) + m_{sawbn}\sin\alpha\}\sin\beta -$$
$$\dot{\beta}\{(\dot{\alpha} + \dot{\theta}_n)m_{awln}\cos(\alpha + \gamma_n + \theta_n) - \dot{z}_{6n}m_{sn}\cos(\alpha + \gamma_n + \eta_n) - (\dot{\alpha} + \dot{\eta}_n)z_{6n}$$
$$m_{sn}\sin(\alpha + \gamma_n + \eta_n) - \dot{\alpha}m_{sawcn}\sin(\alpha + \gamma_n) + \dot{\alpha}m_{sawbn}\cos\alpha\}\sin\beta -$$
$$\dot{\beta}^2\{m_{awln}\sin(\alpha + \gamma_n + \theta_n) + z_{6n}m_{sn}\cos(\alpha + \gamma_n + \eta_n) +$$
$$m_{sawcn}\cos(\alpha + \gamma_n) + m_{sawbn}\sin\alpha\}\cos\beta + g(m_b + m_{sawn}) = \lambda_{3n}$$

$$\ddot{z}_0(m_b + m_{sawn}) + \ddot{\alpha}m_b\cos\beta(b_0\cos\alpha - c_0\sin\alpha) -$$
$$\dot{\alpha}^2 m_b\cos\beta(b_0\sin\alpha - c_0\cos\alpha) - \ddot{\beta}\{m_{ba}\cos\beta + m_b(b_0\sin\alpha - c_0\cos\alpha)\sin\beta\} +$$
$$\dot{\beta}\{\dot{\beta}(m_{ba} + m_{sawan})\sin\beta + \dot{\beta}m_b(b_0\sin\alpha - c_0\cos\alpha)\cos\beta\}$$
$$+ \{\ddot{z}_{6n}m_{sn}\cos(\alpha + \gamma_n + \eta_n) - 2(\dot{\alpha} + \dot{\eta}_n)\dot{z}_{6n}m_{sn}\sin(\alpha + \gamma_n + \eta_n) +$$
$$(\ddot{\alpha} + \ddot{\theta}_n)m_{awln}\cos(\alpha + \gamma_n + \theta_n) - (\dot{\alpha} + \dot{\theta}_n)^2 m_{awln}\sin(\alpha + \gamma_n + \theta_n) -$$
$$(\ddot{\alpha} + \ddot{\theta}_n)z_{6n}m_{sn}\sin(\alpha + \gamma_n + \eta_n) - (\dot{\alpha} + \dot{\theta}_n)^2 z_{6n}m_{sn}\cos(\alpha + \gamma_n + \eta_n) -$$
$$\ddot{\alpha}m_{sawcn}\sin(\alpha + \gamma_n) - \dot{\alpha}^2 m_{sawcn}\cos(\alpha + \gamma_n) +$$
$$\ddot{\alpha}m_{sawbn}\cos\alpha - \dot{\alpha}^2 m_{sawbn}\sin\alpha - \ddot{\beta}m_{sawan}\}\cos\beta -$$
$$2\dot{\beta}\{\dot{z}_{6n}m_{sn}\cos(\alpha + \gamma_n + \eta_n) + (\dot{\alpha} + \dot{\theta}_n)m_{awln}\cos(\alpha + \gamma_n + \theta_n) -$$
$$(\dot{\alpha} + \dot{\eta}_n)z_{6n}m_{sn}\sin(\alpha + \gamma_n + \eta_n) - \dot{\alpha}m_{sawcn}\sin(\alpha + \gamma_n)$$
$$+ \dot{\alpha}m_{sawbn}\cos\alpha\}\sin\beta - (\ddot{\beta}\sin\beta + \dot{\beta}^2\cos\beta)$$
$$\{m_{awln}\sin(\alpha + \gamma_n + \theta_n) + z_{6n}m_{sn}\cos(\alpha + \gamma_n + \eta_n) +$$
$$m_{sawcn}\cos(\alpha + \gamma_n) + m_{sawbn}\sin\alpha\} + g(m_b + m_{sawn}) = \lambda_{3n}$$

$$\dot{z}_0 = \lambda_{3n} - g - \frac{\begin{array}{c}\ddot{\alpha}m_b C_\beta A_2 - \dot{\alpha}^2 m_b A_1 - \dot{\beta}\{m_{ba}C_\beta + m_b A_1 S_\beta\} + \\ \dot{\beta}\{m_{ba}S_\beta + \dot{\beta}m_b A_1 C_\beta\} + \{\ddot{z}_{6n}m_{sn}C_{\alpha\gamma\eta} - 2(\dot{\alpha}+\dot{\eta}_n) \\ \dot{z}_{6n}m_{sn}S_{\alpha\gamma\eta} + (\ddot{\alpha}+\ddot{\vartheta}_n)m_{awln}C_{\alpha\gamma\eta} - (\dot{\alpha}+\dot{\vartheta}_n)^2 m_{awln}S_{\alpha\gamma\eta} - \\ (\ddot{\alpha}+\ddot{\eta}_n)z_{6n}m_{sn}S_{\alpha\gamma\eta} - (\dot{\alpha}+\dot{\eta}_n)^2 z_{6n}m_{sn}C_{\alpha\gamma\eta} - \\ \ddot{\alpha}m_{sawcn}S_{\alpha\gamma\eta} - \dot{\alpha}^2 m_{sawcn}C_{\alpha\gamma\eta} + \ddot{\alpha}m_{sawcn}C_\alpha - \\ \dot{\alpha}^2 m_{sawbn}S_\alpha - \ddot{\beta}m_{sawan}\}C_\beta - 2\dot{\beta}\{\dot{z}_{6n}m_{sn}C_{\alpha\gamma\eta} + \\ (\dot{\alpha}-\dot{\vartheta}_n)m_{awln}C_{\alpha\gamma\eta} - (\dot{\alpha}+\dot{\eta}_n)z_{6n}m_{sn}S_{\alpha\gamma\eta} - \\ \dot{\alpha}m_{sawcn}S_{\alpha\gamma\eta} + \dot{\alpha}m_{sawbn}C_\alpha - \dot{\beta}m_{sawan}/2\}S_\beta - \\ (\ddot{\beta}S_\beta + \dot{\beta}^2 C_\beta)\{m_{awln}S_{\alpha\gamma\eta} + z_{6n}m_{sn}C_{\alpha\gamma\eta} + \\ m_{sawcn}C_{\alpha\gamma\eta} + m_{sawbn}S_\alpha\}\end{array}}{m_{bsawn}}$$

$$\frac{d}{dt}\left(\frac{\partial L}{\partial \dot{\beta}}\right) - \frac{\partial L}{\partial \beta} = \frac{\partial F}{\partial \dot{\beta}} + \sum_{l,n}\lambda_{ln}a_{lnl} \quad (92)$$

$l = 1, 2, 3 \quad n = i, ii, iii, iv$ $$\ddot{\beta}(m_{saw2n} + m_{bal} + m_b(b_0\sin\alpha + c_0\cos\alpha)^2 + \quad (93)$$
$$m_{sn}\{z_{6n}\cos(\alpha+\gamma_n+\eta_n) + c_{1n}\cos(\alpha+\gamma_n) + b_{2n}\sin\alpha\}^2 +$$
$$m_{an}\{e_{1n}\sin(\alpha+\gamma_n+\theta_n) + c_{2n}\cos(\alpha+\gamma_n) + b_{2n}\sin\alpha\}^2 +$$
$$m_{wn}\{e_{3n}\sin(\alpha+\gamma_n+\theta_n) + c_{2n}\cos(\alpha+\gamma_n) + b_{2n}\sin\alpha\}^2\rangle +$$
$$2\dot{\beta}\langle\dot{\alpha}m_b(b_0\sin\alpha + c_0\cos\alpha)(b_0\cos\alpha - c_0\sin\alpha) +$$
$$m_{sn}\{z_{6n}\cos(\alpha+\gamma_n+\eta_n) + c_{1n}\cos(\alpha+\gamma_n) + b_{2n}\sin\alpha\}$$
$$\{\dot{z}_{6n}\cos(\alpha+\gamma_n+\eta_n) - (\dot{\alpha}+\dot{\eta}_n)z_{6n}\sin(\alpha+\gamma_n+\eta_n) -$$
$$\dot{\alpha}[c_{1n}\sin(\alpha+\gamma_n) - b_{2n}\cos\alpha]\} +$$
$$m_{an}\{e_{1n}\sin(\alpha+\gamma_n+\theta_n) + c_{2n}\cos(\alpha+\gamma_n) + b_{2n}\sin\alpha\}$$
$$\{(\dot{\alpha}+\dot{\vartheta}_n)e_{1n}\cos(\alpha+\gamma_n+\theta_n) - \dot{\alpha}[c_{2n}\sin(\alpha+\gamma_n) - b_{2n}\cos\alpha]\} +$$
$$m_{wn}\{e_{3n}\sin(\alpha+\gamma_n+\theta_n) + c_{2n}\cos(\alpha+\gamma_n) + b_{2n}\sin\alpha\}\{(\dot{\alpha}+\dot{\vartheta}_n)$$
$$e_{3n}\sin(\alpha+\gamma_n+\theta_n) - \dot{\alpha}[c_{2n}\sin(\alpha+\gamma_n) - b_{2n}\cos\alpha]\}\rangle -$$
$$\ddot{\alpha}m_{ba}(b_0\cos\alpha - c_0\sin\alpha) + \dot{\alpha}^2 m_{ba}(b_0\sin\alpha + c_0\cos\alpha) -$$
$$\ddot{z}_{6n}m_{sn}a_{1n}\cos(\alpha+\gamma_n+\eta_n) +$$
$$\dot{z}_{6n}(\dot{\alpha}+\dot{\eta})m_{sn}a_{1n}\sin(\alpha+\gamma_n+\eta_n) +$$
$$\ddot{\eta}_n m_{sn}z_{6n}a_{1n}\sin(\alpha+\gamma_n+\eta_n) +$$
$$\dot{\eta}_n m_{sn}\dot{z}_{6n}a_{1n}\sin(\alpha+\gamma_n+\eta_n) +$$
$$\dot{\eta}_n(\dot{\alpha}+\dot{\eta}_n)m_{sn}z_{6n}a_{1n}\cos(\alpha+\gamma_n+\eta_n) -$$
$$\ddot{\vartheta}_n m_{awln}a_{1n}\cos(\alpha+\gamma_n+\theta_n) +$$
$$\dot{\vartheta}_n(\dot{\alpha}+\dot{\vartheta}_n)m_{awln}a_{1n}\sin(\alpha+\gamma_n+\theta_n) +$$
$$\ddot{\alpha}a_{1n}\{m_{sawcn}\sin(\alpha+\gamma_n) - m_{sawbn}\cos\alpha +$$
$$m_{sn}z_{6n}\sin(\alpha+\gamma_n+\eta_n) - m_{awln}\cos(\alpha+\gamma_n+\theta_n)\} +$$
$$\dot{\alpha}a_{1n}\{\dot{\alpha}m_{sawcn}\cos(\alpha+\gamma_n) + \dot{\alpha}m_{sawbn}\sin\alpha +$$
$$(\dot{\alpha}+\dot{\eta}_n)m_{sn}z_{6n}\cos(\alpha+\gamma_n+\eta_n) +$$
$$m_{sn}\dot{z}_{6n}\sin(\alpha+\gamma_n+\eta_n) + (\dot{\alpha}+\dot{\vartheta}_n)m_{awln}\sin(\alpha+\gamma_n+\theta_n)\}$$

$$-\ddot{z}_0[\{m_b(b_0\sin\alpha + c_0\cos\alpha) + m_{awln}\sin(\alpha+\gamma_n+\theta_n) +$$
$$z_{6n}m_{sn}\cos(\alpha+\gamma_n+\eta_n) + m_{sawcn}\cos(\alpha+\gamma_n) +$$
$$m_{sawbn}\sin\alpha\}\sin\beta + (m_{ba} + m_{sawan}\cos\beta)] -$$
$$\dot{z}_0[\{\dot{\alpha}m_b(b_0\cos\alpha - c_0\sin\alpha) + (\dot{\alpha}+\dot{\vartheta}_n)m_{awln}$$
$$\cos(\alpha+\gamma_n+\theta_n) + \dot{z}_{6n}m_{sn}\cos(\alpha+\gamma_n+\eta_n) -$$
$$(\dot{\alpha}+\dot{\eta}_n)z_{6n}m_{sn}\sin(\alpha+\gamma_n+\eta_n) -$$
$$\dot{\alpha}m_{sawcn}\sin(\alpha+\gamma_n) + \dot{\alpha}m_{sawbn}\cos\alpha\}\sin\beta +$$
$$\dot{\beta}z_0\{m_b(b_0\sin\alpha + c_0\cos\alpha) + m_{awln}\sin(\alpha+\gamma_n+\theta_n) +$$
$$z_{6n}m_{sn}\cos(\alpha+\gamma_n+\eta_n) + m_{sawcn}\cos(\alpha+\gamma_n) +$$
$$m_{sawbn}\sin\alpha\}\cos\beta - (m_{ba} + m_{sawan}\sin\beta)] +$$
$$\dot{\alpha}\dot{z}_0 m_b\sin\beta(b_0\cos\alpha - c_0\sin\alpha) -$$
$$\dot{\beta}\dot{z}_0\{m_{ba}\sin\beta - m_b(b_0\sin\alpha + c_0\cos\alpha)\cos\beta\} -$$
$$g\{m_{ba}\cos\beta + m_b(b_0\sin\alpha + c_0\cos\alpha)\sin\beta\} -$$
$$\langle g[\{m_{sn}z_{6n}\cos(\alpha+\gamma_n+\eta_n) + m_{awln}\sin(\alpha+\gamma_n+\theta_n) +$$
$$m_{sawcn}\cos(\alpha+\gamma_n) + m_{sawbn}\sin\alpha\}\sin\beta +$$
$$m_{sawan}\cos\beta] - \dot{z}_0[\dot{z}_{6n}m_{sn}\cos(\alpha+\gamma_n+\eta_n) +$$
$$(\dot{\alpha}+\dot{\vartheta}_n)m_{awln}\cos(\alpha+\gamma_n+\theta_n) -$$
$$(\dot{\alpha}+\dot{\eta}_n)z_{6n}m_{sn}\sin(\alpha+\gamma_n+\eta_n) - \dot{\alpha}m_{sawcn}$$
$$\sin(\alpha+\gamma_n) + \dot{\alpha}m_{sawbn}\cos\alpha - \dot{\beta}m_{sawan}\}\sin\beta -$$
$$\dot{\beta}z_0\{m_{awln}\sin(\alpha+\gamma_n+\theta_n) + z_{6n}m_{sn}\cos(\alpha+\gamma_n+\eta_n) +$$
$$m_{sawcn}\cos(\alpha+\gamma_n) +$$
$$m_{sawbn}\sin\alpha\}\cos\beta\rangle =$$
$$\lambda_{3n}[-\{z_{12n}\cos\alpha + e_{3n}\sin(\alpha+\gamma_n+\theta_n) +$$
$$c_{2n}\cos(\alpha+\gamma_n) + b_{2n}\sin\alpha\}\beta + a_{1n}\cos\beta]$$

$$\ddot{\beta}(m_{saw2n} + m_{bal} + m_b A_1^2 + m_{sn}B_1^2 + m_{an}B_2^2 + m_{wn}B_3^2) + \quad (94)$$
$$2\dot{\beta}[\dot{\alpha}m_b A_1 A_2 + m_{sn}B_1\{\dot{z}_{6n}C_{\alpha\gamma\eta m} - (\dot{\alpha}+\dot{\eta})z_{6n}S_{\alpha\gamma\eta n} - \dot{\alpha}A_4\} +$$
$$m_{an}B_2\{(\dot{\alpha}+\dot{\vartheta}_n)e_{1n}C_{\alpha\gamma\theta n} - \dot{\alpha}A_6\} +$$
$$m_{wn}B_3\{(\dot{\alpha}+\dot{\vartheta}_n)e_{3n}S_{\alpha\gamma\theta n} - \dot{\alpha}A_6\}] - \ddot{\alpha}m_{ba}A_2 +$$
$$\dot{\alpha}^2 m_{ba}A_1 - \ddot{z}_{6n}m_{sn}a_{1n}C_{\alpha\gamma\eta m} + 2\dot{z}_{6n}(\dot{\alpha}+\dot{\eta}_n)m_{sn}a_{1n}S_{\alpha\gamma\eta n} +$$
$$\ddot{\eta}_n m_{sn}z_{6n}a_{1n}S_{\alpha\gamma\eta m} + \dot{\eta}_n(2\dot{\alpha}+\dot{\eta}_n)m_{sn}z_{6n}a_{1n}C_{\alpha\gamma\eta m} -$$
$$\ddot{\vartheta}_n m_{awln}a_{1n}C_{\alpha\gamma\theta n} + \dot{\vartheta}_n(2\dot{\alpha}+\dot{\vartheta}_n)m_{awln}a_{1n}S_{\alpha\gamma\theta n} +$$
$$\ddot{\alpha}a_{1n}\{m_{sawcn}S_{\alpha\gamma n} - m_{sawbn}C_\alpha + m_{sn}z_{6n}S_{\alpha\gamma\eta n} - m_{awln}C_{\alpha\gamma\theta n}\} +$$
$$\dot{\alpha}^2 a_{1n}\{m_{sawcn}C_{\alpha\gamma n} + m_{sawbn}S_\alpha + m_{sn}z_{6n}C_{\alpha\gamma\eta n} + m_{awln}S_{\alpha\gamma\theta n}\} -$$
$$\ddot{z}_0[\{m_b(b_0 S_\alpha + c_0 C_\alpha) + m_{awln}S_{\alpha\gamma\theta n} + z_{6n}m_{sn}C_{\alpha\gamma\eta n} +$$
$$m_{sawcn}C_{\alpha\gamma n} + m_{sawbn}S_\alpha\}S_\beta + (m_{ba} + b_{sawan})C_\beta] +$$
$$\dot{z}_0(1-\dot{\beta})(m_{ba} + m_{sawan})\sin\beta - g[m_{ba}C_\beta + m_b A_1 S_\beta +$$
$$\{m_{sn}z_{6n}C_{\alpha\gamma\eta m} + m_{awln}S_{\alpha\gamma\theta n} + m_{sawcn}C_{\alpha\gamma n} + m_{sawbn}S_\alpha\}S_\beta +$$
$$m_{sawan}C_\beta] =$$
$$\lambda_{3n}[-\{z_{12n}C_\alpha + e_{3n}S_{\alpha\gamma\theta n} + c_{2n}C_{\alpha\gamma n} + b_{2n}S_\alpha\}S_\beta + a_{1n}C_\beta]$$

$$2\dot{\beta}[\dot{\alpha}m_bA_1A_2 + m_{sn}B_1\{\dot{z}_{6n}C_{\alpha\gamma\eta\eta} - (\dot{\alpha} + \dot{\eta}_n)z_{6n}S_{\alpha\gamma\eta} - \dot{\alpha}A_4\} + \tag{95}$$
$$m_{an}B_2\{(\dot{\alpha} + \dot{\theta}_n)e_{1n}C_{\alpha\gamma\theta n} - \dot{\alpha}A_6\} +$$
$$m_{wn}B_3\{(\dot{\alpha} + \dot{\theta}_n)e_{3n}S_{\alpha\gamma\theta n} - \dot{\alpha}A_6\}] - \ddot{\alpha}m_{ba}A_2 +$$
$$\dot{\alpha}^2 m_{ba}A_1 - \ddot{z}_{6n}m_{sn}a_{1n}C_{\alpha\gamma\eta\eta} + 2\dot{z}_{6n}(\dot{\alpha} + \dot{\eta}_n)m_{sn}a_{1n}S_{\alpha\gamma\eta\eta} +$$
$$\ddot{\eta}_n m_{sn}z_{6n}a_{1n}S_{\alpha\gamma\eta\eta} + \dot{\eta}_n(2\dot{\alpha} + \dot{\eta}_n)m_{sn}z_{6n}a_{1n}C_{\alpha\gamma\eta\eta} -$$
$$\ddot{\theta}_n m_{awln}a_{1n}C_{\alpha\gamma\theta n} + \dot{\theta}_n(2\dot{\alpha} + \dot{\theta}_n)m_{awln}a_{1n}S_{\alpha\gamma\theta n} +$$
$$\ddot{\alpha}a_{1n}\{m_{sawcn}S_{\alpha\gamma n} - m_{sawbn}C_\alpha + m_{sn}z_{6n}S_{\alpha\gamma\eta n} - m_{awln}C_{\alpha\gamma\theta n}\} +$$
$$\dot{\alpha}^2 a_{1n}\{m_{sawcn}C_{\alpha\gamma n} + m_{sawbn}S_\alpha + m_{sn}z_{6n}C_{\alpha\gamma\eta n} + m_{awln}S_{\alpha\gamma\theta n}\} -$$
$$\ddot{z}_0[\{m_b(b_0S_\alpha + c_0C_\alpha) + m_{awln}S_{\alpha\gamma\eta} + z_{6n}m_{sn}C_{\alpha\gamma\eta n} +$$
$$m_{sawcn}C_{\alpha\gamma n} + m_{sawbn}S_\alpha\}S_\beta + (m_{ba} + m_{sawan})C_\beta] +$$
$$\dot{z}_0(1 - \dot{\beta})(m_{ba} + m_{sawan})\sin\beta - g[m_{ba}C_\beta + m_bA_1S_\beta +$$
$$\{m_{sn}z_{6n}C_{\alpha\gamma\eta n} + m_{awln}S_{\alpha\gamma n} + m_{sawcn}C_{\alpha\gamma n} + m_{sawbn}S_\alpha\}S_\beta +$$
$$m_{sawan}C_b]$$

$$\ddot{\beta} = \frac{+\lambda_{3n}\{(z_{12n}C_\alpha + e_{3n}S_{\alpha\gamma\theta n} + c_{2n}C_{\alpha\gamma n} + b_{2n}S_\alpha)S_\beta - a_{1n}C_\beta\}}{-(m_{saw2n} + m_{ba1} + m_bA_1^2 + m_{sn}B_1^2 + m_{an}B_2^2 + m_{wn}B_3^2)}$$

$$\frac{d}{dt}\left(\frac{\partial L}{\partial \dot{\alpha}}\right) - \frac{\partial L}{\partial \alpha} = \frac{\partial F}{\partial \dot{\alpha}} + \sum_{l,n}\lambda_{ln}a_{ln2} \tag{96}$$
$$l = 1, 2, 3 \quad n = i, ii, iii, iv$$

$$\ddot{\beta}m_{ba}(b_0\cos\alpha - c_0\sin\alpha) + \tag{97}$$
$$\dot{\beta}\dot{\alpha}m_{ba}(b_0\sin\alpha + c_0\cos\alpha) + \ddot{z}_0m_b\cos\beta(b_0\cos\alpha - c_0\sin\alpha) -$$
$$\dot{\beta}\dot{z}_0m_b\sin\beta(b_0\cos\alpha - c_0\sin\alpha) - \dot{\alpha}\dot{z}_0m_b\cos\beta(b_0\sin\alpha + c_0\cos\alpha) +$$
$$\ddot{\alpha}\{m_{bbl} + m_{sawln} + m_{sn}z_{6n}[z_{6n} + 2\{c_{1n}\cos\eta_n - b_{2n}\sin(\gamma_n + \eta_n)\}] -$$
$$2m_{awln}\{c_{2n}\sin\theta_n - b_{2n}\cos(\gamma_n + \theta_n)\}\} +$$
$$\dot{\alpha}\{m_{sn}\dot{z}_{6n}[z_{6n} + 2\{c_1\cos\eta_n - b_{2n}\sin(\gamma_n + \eta_n)\}] +$$
$$m_{sn}z_{6n}[\dot{z}_{6n} - 2\dot{\eta}_n\{\dot{c}_{1n}\sin\eta_n + b_{2n}\cos(\gamma_n + \eta_n)\}] -$$
$$2\dot{\theta}_n m_{awln}\{c_{2n}\cos\theta_n + b_{2n}\sin(\gamma_n + \theta_n)\}\} +$$
$$\dot{z}_{6n}m_{sn}\{c_{1n}\sin\eta_n + b_{2n}\cos(\gamma_n + \eta_n)\} +$$
$$\dot{z}_{6n}\dot{\eta}_n m_{sn}\{c_{1n}\cos\eta_n - b_{2n}\sin(\gamma_n + \eta_n)\} +$$
$$\ddot{\eta}_n m_{sn}z_{6n}\{z_{6n} + c_{1n}\cos\eta_n - b_{2n}\sin(\gamma_n + \eta_n)\} +$$
$$\dot{\eta}_n m_{sn}\dot{z}_{6n}\{z_{6n} + c_{1n}\cos\eta_n - b_{2n}\sin(\gamma_n + \eta_n)\} +$$
$$\dot{\eta}_n m_{sn}z_{6n}\{\dot{z}_{6n} - \dot{\eta}_n[c_{1n}\sin\eta_n + b_{2n}\cos(\gamma_n + \eta_n)]\} +$$
$$\ddot{\theta}[m_{aw2ln} - m_{awln}\{c_{2n}\sin\theta_n - b_{2n}\cos(\gamma_n + \theta)\}] -$$
$$\dot{\theta}_n^2 m_{awln}\{c_{2n}\cos\theta_n + b_{2n}\sin(\gamma_n + \theta_n)\}] +$$
$$\ddot{\beta}a_{1n}\{m_{sawcn}\sin(\alpha + \gamma_n) - m_{sawbn}\cos\alpha +$$
$$m_{sn}z_{6n}\sin(\alpha + \gamma_n + \eta_n) - m_{awln}\cos(\alpha + \gamma_n + \theta_n)\} +$$
$$\dot{\beta}\dot{\alpha}_{1n}\{\dot{\alpha}[m_{sawcn}\cos(\alpha + \gamma_n) + m_{sawbn}\sin\alpha] + m_{sn}\dot{z}_{6n}\sin(\alpha + \gamma_n + \eta_n) +$$
$$(\dot{\alpha} + \dot{\eta}_n)m_{sn}z_{6n}\cos(\alpha + \gamma_n + \eta_n) +$$
$$(\dot{\alpha} + \dot{\theta}_n)m_{awln}\sin(\alpha + \gamma_n + \theta_n)\} +$$
$$\dot{z}_0\{m_{awln}\cos(\alpha + \gamma_n + \theta_n) - z_{6n}m_{sn}\sin(\alpha + \gamma_n + \eta_n) -$$
$$m_{sawcn}\sin(\alpha + \gamma_n) + m_{sawbn}\cos\alpha\}\cos\beta +$$
$$\dot{z}_0\{-(\dot{\alpha} + \dot{\theta}_n)m_{awln}\sin(\alpha + \gamma_n + \theta_n) - \dot{z}_{6n}m_{sn}\sin(\alpha + \gamma_n + \eta_n) -$$
$$(\dot{\alpha} + \dot{\eta}_n)z_{6n}m_{sn}\cos(\alpha + \gamma_n + \eta_n) -$$
$$\dot{\alpha}m_{sawcn}\cos(\alpha + \gamma_n) - \dot{\alpha}m_{sawbn}\sin\alpha\}\cos\beta -$$

-continued $$\dot{\beta}\dot{z}_0\{m_{awln}\cos(\alpha + \gamma_n + \theta_n) - z_{6n}m_{sn}\sin(\alpha + \gamma_n + \eta_n) -$$
$$m_{sawcn}\sin(\alpha + \gamma_n) + m_{sawbn}\cos\alpha\}\cos\beta -$$
$$\{\dot{\beta}^2 m_b(b_0\cos\alpha - c_0\sin\alpha) + \dot{\alpha}\dot{\beta}m_{ba}\}(b_0\sin\alpha + c_0\cos\alpha) -$$
$$[\dot{\beta}^2\langle m_{sn}\{z_{6n}\cos(\alpha + \gamma_n + \eta_n) + c_{1n}\cos(\alpha + \gamma_n) + b_{2n}\sin\alpha\}\{-z_{6n}\sin(\alpha + \gamma_n + \eta_n) - c_{1n}\sin(\alpha + \gamma_n) + b_{2n}\cos\alpha\} +$$
$$m_{an}\{e_{1n}\sin(\alpha + \gamma_n + \theta_n) + c_{2n}\cos(\alpha + \gamma_n) + b_{2n}\sin\alpha\}$$
$$\{e_1\cos(\alpha + \gamma_n + \theta_n) - c_{2n}\sin(\alpha + \gamma_n) + b_{2n}\cos\alpha\} +$$
$$m_{wn}\{e_{3n}\sin(\alpha + \gamma_n + \theta_n) + c_{2n}\cos(\alpha + \gamma_n) + b_{2n}\sin\alpha\}$$
$$\{e_3\cos(\alpha + \gamma_n + \theta_n) - c_{2n}\sin(\alpha + \gamma_n) + b_{2n}\cos\alpha\}\rangle +$$
$$\dot{z}_{6n}\dot{\beta}m_{sn}a_{1n}\sin(\alpha + \gamma_n + \eta_n) + \dot{\eta}_n\dot{\beta}m_{sn}z_{6n}a_{1n}\cos(\alpha + \gamma_n + \eta_n) +$$
$$\dot{\theta}\dot{\beta}m_{awln}a_{1n}\sin(\alpha + \gamma_n + \theta_n) +$$
$$\dot{\alpha}\dot{\beta}a_{1n}\{m_{sawcn}\cos(\alpha + \gamma_n) + m_{sawbn}\sin\alpha +$$
$$m_{sn}z_{6n}\cos(\alpha + \gamma_n + \eta_n) + m_{awln}\sin(\alpha + \gamma_n + \theta_n)\} -$$
$$\dot{z}_0\{\dot{z}_{6n}m_{sn}\sin(\alpha + \gamma_n + \eta_n) + (\dot{\alpha} + \dot{\eta}_n)m_{awln}\sin(\alpha + \gamma_n + \theta_n) +$$
$$(\dot{\alpha} + \dot{\eta}_n)z_{6n}m_{sn}\cos(\alpha + \gamma_n + \eta_n) + \dot{\alpha}m_{sawcn}\cos(\alpha + \gamma_n) +$$
$$\dot{\alpha}m_{sawbn}\sin\alpha\}\cos\beta\dot{\beta}\dot{z}_0 \left[\{m_{awln}\cos(\alpha + \gamma_n + \theta_n) -$$
$$z_{6n}m_{sn}\sin(\alpha + \gamma_n + \eta_n) - m_{sawcn}\sin(\alpha + \gamma_n) +$$
$$m_{sawbn}\cos\alpha\}\sin\beta\right] + gm_b(b_0\cos\alpha - c_0\sin\alpha)\cos\beta -$$
$$g\{m_{sn}z_{6n}\sin(\alpha + \gamma_n + \eta_n) - m_{awln}\cos(\alpha + \gamma_n + \theta_n) +$$
$$m_{sawcn}\sin(\alpha + \gamma_n) - m_{sawbn}\cos\alpha\}\cos\beta = \lambda_{3n}\{-z_{12n}\sin\alpha +$$
$$e_{3n}\cos(\alpha + \gamma_n + \theta_n) - c_{2n}\sin(\alpha + \gamma_n) + b_{2n}\cos\alpha\}\cos\beta$$

$$\ddot{z}_0\{m_bA_2 + m_{awln}C_{\alpha\gamma\theta n} - z_{6n}m_{sn}S_{\alpha\gamma\eta n} - m_{sawcn}S_{\alpha\gamma n} + m_{sawbn}C_\alpha\}C_\beta - \tag{98}$$
$$\ddot{\beta}m_{ba}A_2 + \ddot{\alpha}\{m_{bbl} + m_{sawln} + m_{sn}z_{6n}(z_{6n} + 2E_{1n}) - 2m_{awln}H_{1n}\} +$$
$$2\dot{\alpha}\{m_{sn}\dot{z}_{6n}(z_{6n} + E_{1n}) - m_{sn}z_{6n}\dot{\eta}_nE_{2n} - \dot{\theta}_nm_{awln}H_{2n}\} + \dot{z}_{6n}m_{sn}E_{2n} +$$
$$\dot{z}_{6n}\dot{\eta}_nm_{sn}E_{1n} + \ddot{\eta}_nm_{sn}z_{6n}\{z_{6n} + E_{1n}\} + \dot{\eta}_nm_{sn}\dot{z}_{6n}\{2z_{6n} + E_{1n}\} -$$
$$\dot{\eta}_n^2m_{sn}z_{6n}E_{2n} + \ddot{\theta}(m_{aw2ln} - m_{awln}H_{1n}) - \dot{\theta}_n^2m_{awln}H_{2n} +$$
$$\ddot{\beta}a_{1n}(m_{sawcn}S_{\alpha\gamma n} - m_{sawbn}C_\alpha + m_{sn}z_{6n}S_{\alpha\gamma\eta n} - m_{awln}C_{\alpha\gamma\theta n}) +$$
$$\dot{\beta}a_{1n}\{\dot{\alpha}(m_{sawcn}C_{\alpha\gamma n} + m_{sawbn}S_\alpha) + m_{sn}\dot{z}_{6n}S_{\alpha\gamma\eta n} +$$
$$(\dot{\alpha} + \dot{\eta}_n)m_{sn}z_{6n}C_{\alpha\gamma\eta n} + (\dot{\alpha} + \dot{\theta}_n)m_{awln}S_{\alpha\gamma\theta n}\} -$$
$$\dot{\beta}^2m_bA_2A_1 - [\dot{\beta}\{m_{sn}B_1(-z_{6n}S_{\alpha\gamma\eta\eta} - A_4)\} +$$
$$m_{an}B_2(e_1C_{\alpha\gamma\theta n} - A_6) + m_{wn}B_3(e_3C_{\alpha\gamma\theta n} - A_6)\} +$$
$$\dot{z}_{6n}\dot{\beta}m_{sn}a_{1n}S_{\alpha\gamma\eta n} + \dot{\eta}_n\dot{\beta}m_{sn}z_{6n}a_{1n}C_{\alpha\gamma\eta n} + \dot{\theta}\dot{\beta}m_{awln}a_{1n}S_{\alpha\gamma\theta n} +$$
$$\dot{\alpha}\dot{\beta}a_{1n}\{m_{sawcn}C_{\alpha\gamma n} + m_{sawbn}S_\alpha + m_{sn}z_{6n}C_{\alpha\gamma\eta n} + m_{awln}S_{\alpha\gamma\theta n}\}] +$$
$$gm_bA_2C_\beta - g\{m_{sn}z_{6n}S_{\alpha\gamma\eta n} - m_{awln}C_{\alpha\gamma\theta n} + m_{sawcn}S_{\alpha\gamma n} - m_{sawbn}C_\alpha\}$$
$$C_\beta = \lambda_{3n}\{-z_{12n}S_\alpha + e_{3n}C_{\alpha\gamma\theta n} - c_{2n}S_{\alpha\gamma n} + b_{2n}C_\alpha\}C_\beta$$

$$\ddot{z}_0\{m_bA_2 + m_{awln}C_{\alpha\gamma\theta n} - z_{6n}m_{sn}S_{\alpha\gamma\eta n} - m_{sawcn}S_{\alpha\gamma n} + m_{sawbn}C_\alpha\}C_\beta - \tag{99}$$
$$\ddot{\beta}m_{ba}A_2 + \ddot{\alpha}\{m_{bbl} + m_{sawln} + m_{sn}z_{6n}(z_{6n} + 2E_{1n}) - 2m_{awln}H_{1n}\} +$$
$$m_{sn}(2\dot{\alpha}\dot{z}_{6n} + \ddot{\eta}_nz_{6n} + 2\dot{\eta}_n\dot{z}_{6n})(z_{6n} + E_{1n}) -$$
$$2\dot{\alpha}(m_{sn}z_{6n}\dot{\eta}_nE_{2n} + \dot{\theta}_nm_{awln}H_{2n}) + \dot{z}_{6n}m_{sn}E_{2n} -$$
$$\dot{\eta}_n^2m_{sn}z_{6n}E_{2n} + \ddot{\theta}(m_{aw2ln} - m_{awln}H_{1n}) - \dot{\theta}_n^2m_{awln}H_{2n} +$$

-continued $$\ddot{\beta}a_{1n}(m_{sawcn}S_{\alpha\gamma n} - m_{sawbn}C_\alpha + m_{sn}z_{6n}S_{\alpha\gamma\eta n} - m_{awln}C_{\alpha\gamma\theta n}) -$$

$$\dot{\beta}^2\{m_b A_2 A_1 + m_{sn}B_1(-z_{6n}S_{\alpha\gamma\eta n} - A_4) + m_{an}B_2(e_1 C_{\alpha\gamma\theta n} - A_6) +$$

$$m_{wn}B_3(e_3 C_{\alpha\gamma\theta n} - A_6)\} + g m_b A_2 C_\beta -$$

$$g\{m_{sn}z_{6n}S_{\alpha\gamma\eta n} - m_{awln}C_{\alpha\gamma\theta n} + m_{sawcn}S_{\alpha\gamma n} - m_{sawbn}C_\alpha\}C_\beta =$$

$$\lambda_{3n}(-z_{12n}S_\alpha + e_{3n}C_{\alpha\gamma\theta n} - c_{2n}S_{\alpha\gamma n} + b_{2n}C_\alpha)C_\beta$$

$$\therefore$$

$$\ddot{z}_0\{m_b A_2 + m_{awln}C_{\alpha\gamma\theta n} - z_{6n}m_{sn}S_{\alpha\gamma\eta n} - m_{sawcn}S_{\alpha\gamma n} + m_{sawbn}C_\alpha\} \quad (100)$$
$$C_\beta m_{sn}(2\dot\alpha\dot z_{6n} + \ddot\eta_n z_{6n} + 2\dot\eta_n\dot z_{6n})(z_{6n} + E_{1n}) -$$
$$2\dot\alpha(m_{sn}z_{6n}\dot\eta_n E_{2n} + \dot\theta_n m_{awln}H_{2n}) + \ddot z_{6n}m_{sn}E_{2n} - \dot\eta_n^2 m_{sn}z_{6n}E_{2n} +$$
$$\ddot\theta(m_{aw2ln} - m_{awln}H_{1n}) - \dot\theta_n^2 m_{awln}H_{2n} + \ddot\beta a_{1n} +$$
$$\ddot\beta a_{1n}(m_{sawcn}S_{\alpha\gamma n} - m_{sawbn}C_\alpha + m_{sn}z_{6n}S_{\alpha\gamma\eta n} - m_{awln}C_{\alpha\gamma\theta n}) -$$
$$\dot\beta^2\{m_b A_2 A_1 + m_{sn}B_1(-z_{6n}S_{\alpha\gamma\eta n} - A_4) +$$
$$m_{an}B_2(e_1 C_{\alpha\gamma\theta n} - A_6) + m_{wn}B_3(e_3 C_{\alpha\gamma\theta n} - A_6)\} + gm_b A_2 C_\beta -$$
$$g\{m_{sn}z_{6n}S_{\alpha\gamma\eta n} - m_{awln}C_{\alpha\gamma\theta n} + m_{sawcn}S_{\alpha\gamma n} - m_{sawbn}C_\alpha\}C_\beta -$$
$$\ddot\beta m_{ba}A_2$$

$$\ddot\alpha = \frac{+\lambda_{3n}(z_{12n}S_\alpha - e_{3n}C_{\alpha\gamma\theta n} + c_{2n}S_{\alpha\gamma n} - b_{2n}C_\alpha)C_\beta}{-\{m_{bbl} + m_{sawbn} + m_{sn}z_{6n}(z_{6n} + 2E_{1n}) - 2m_{awln}H_{1n}\}}$$

$$\frac{d}{dt}\left(\frac{\partial L}{\partial \dot\eta_n}\right) - \frac{\partial L}{\partial \eta_n} = \frac{\partial F}{\partial \dot\eta_n} + \sum_{l,n}\lambda_{ln}a_{ln3} \quad (101)$$

$$l = 1, 2, 3 \quad n = i, ii, iii, iv$$

$$m_{sn}\ddot\eta_n z_{6n}^2 + 2m_{sn}\dot\eta_n\dot z_{6n}z_{6n} + \quad (102)$$
$$\ddot\alpha m_{sn}z_{6n}\{z_{6n} + c_{1n}\cos\eta_n - b_{2n}\sin(\gamma_n + \eta_n)\} +$$
$$\ddot\alpha m_{sn}z_{6n}\{z_{6n} + c_{1n}\cos\eta_n - b_{2n}\sin(\gamma_n + \eta_n)\} +$$
$$\dot\alpha m_{sn}z_{6n}\{\dot z_{6n} - \dot\eta_n[c_{1n}\sin\eta_n + b_{2n}\cos(\gamma_n + \eta_n)]\} +$$
$$\ddot\beta m_{sn}z_{6n}a_{1n}\sin(\alpha + \gamma_n + \eta_n) + \ddot\beta m_{sn}z_{6n}a_{1n}\sin(\alpha + \gamma_n + \eta_n) +$$
$$\dot\beta(\dot\alpha + \dot\eta_n)m_{sn}z_{6n}a_{1n}\cos(\alpha + \gamma_n + \eta_n) -$$
$$\ddot z_0 z_{6n}m_{sn}\sin(\alpha + \gamma_n + \eta_n)\cos\beta - \dot z_0\dot z_{6n}m_{sn}\sin(\alpha + \gamma_n + \eta_n)\cos\beta -$$
$$(\dot\alpha + \dot\eta_n)\dot z_0 z_{6n}m_{sn}\cos(\alpha + \gamma_n + \eta_n)\cos\beta -$$
$$\dot\beta\dot z_0 z_{6n}m_{sn}\sin(\alpha + \gamma_n + \eta_n)\sin\beta -$$
$$\langle\dot\alpha^2 m_{sn}z_{6n}\{-c_{1n}\sin\eta_n - b_{2n}\cos(\gamma_n + \eta_n)\} +$$
$$\dot\beta^2 m_{sn}\{z_{6n}\cos(\alpha + \gamma_n + \eta_n) + c_{1n}\cos(\alpha + \gamma_n) + b_{2n}\sin\alpha\}$$
$$\{-z_{6n}\sin(\alpha + \gamma_n + \eta_n)\} + \dot z_{6n}\dot\alpha m_{sn}$$
$$\{c_{1n}\cos\eta_n - b_{2n}\sin(\gamma_n - \eta_n)\} + \dot z_{6n}\dot\beta m_{sn}a_{1n}\sin(\alpha + \gamma_n + \eta_n) -$$
$$\dot\eta_n\dot\alpha m_{sn}z_{6n}\{c_{1n}\sin\eta_n + b_{2n}\cos(\gamma_n + \eta_n)\} +$$
$$\dot\eta_n\dot\beta m_{sn}z_{6n}a_{1n}\cos(\alpha + \gamma_n + \eta_n) + \dot\alpha\dot\beta a_{1n}m_{sn}z_{6n}$$
$$\cos(\alpha + \gamma_n + \eta_n) + gm_{sn}z_{6n}\sin(\alpha + \gamma_n + \eta_n)\cos\beta -$$
$$\ddot z_0\{z_{6n}m_{sn}\sin(\alpha + \gamma_n + \eta_n) + (\dot\alpha + \dot\eta_n)\dot z_0 z_{6n}m_{sn}\cos(\alpha + \gamma_n + \eta_n)\}$$
$$\cos\beta + \dot\beta\dot z_0 z_{6n}m_{sn}\sin(\alpha + \gamma_n + \eta_n)\sin\beta\} =$$
$$-\lambda_{1n}(z_{6n} - d_{1n})\cos\eta_n + \lambda_{2n}(z_{6n} - d_{1n})\sin\eta_n$$

$$m_{sn}\ddot\eta_n z_{6n}^2 + 2m_{sn}\dot\eta_n\dot z_{6n}z_{6n} + \ddot\alpha m_{sn}z_{6n}\{z_{6n} + E_1\} + \quad (103)$$
$$\dot\alpha m_{sn}\dot z_{6n}\{2z_{6n} + E_1\} - \dot\alpha m_{sn}\dot\eta_n E_2 + \ddot\beta m_{sn}z_{6n}a_{1n}S_{\alpha\gamma\eta n} +$$
$$\ddot\beta m_{sn}\dot z_{6n}a_{1n}S_{\alpha\gamma\eta n} + \dot\beta(\dot\alpha + \dot\eta_n)m_{sn}z_{6n}a_{1n}C_{\alpha\gamma\eta n} -$$
$$\ddot z_0 z_{6n}m_{sn}S_{\alpha\gamma\eta n}C_\beta + \dot\alpha^2 m_{sn}z_{6n}E_2 + \dot\beta^2 m_{sn}B_1 z_{6n}S_{\alpha\gamma\eta n} -$$
$$\dot z_{6n}\dot\alpha m_{sn}E_1 - \dot z_{6n}\dot\beta m_{sn}a_{1n}S_{\alpha\gamma\eta n} + \dot\eta_n\dot\alpha m_{sn}z_{6n}E_2 -$$
$$\dot\eta_n\dot\beta m_{sn}z_{6n}a_{1n}C_{\alpha\gamma\eta n} - \dot\alpha\dot\beta a_{1n}m_{sn}z_{6n}C_{\alpha\gamma\eta n} - g m_{sn}z_{6n}S_{\alpha\gamma\eta n}C_\beta =$$
$$-\lambda_{1n}(z_{6n} - d_{1n})C_{\eta n} + \lambda_{2n}(z_{6n} - d_{1n})S_{\eta n}$$

$$m_{sn}z_{6n}\{\ddot\eta_n z_{6n} + 2\dot\eta_n\dot z_{6n} + \ddot\alpha(z_{6n} + E_1) + 2\dot\alpha\dot z_{6n} + \ddot\beta a_{1n}S_{\alpha\gamma\eta n} - \quad (104)$$
$$\ddot z_0 S_{\alpha\gamma\eta n}C_\beta + \dot\alpha^2 E_2 + \dot\beta^2 B_1 S_{\alpha\gamma\eta n} - gS_{\alpha\gamma\eta n}C_\beta\} =$$
$$-\lambda_{1n}(z_{6n} - d_{1n})C_{\eta n} + \lambda_{2n}(z_{6n} - d_{1n})S_{\eta n}$$

$$\therefore$$

$$\lambda_{1n} = \frac{\begin{array}{c}m_{sn}z_{6n}\{\ddot\eta_n z_{6n} + 2\dot\eta_n\dot z_{6n} + \ddot\alpha(z_{6n} + E_1) + 2\dot\alpha\dot z_{6n} + \\ \ddot\beta a_{1n}S_{\alpha\gamma\eta n} - \ddot z_0 S_{\alpha\gamma\eta n}C_\beta + \dot\alpha^2 E_2 + \dot\beta^2 B_1 S_{\alpha\gamma\eta n} - \\ gS_{\alpha\gamma\eta n}C_\beta\} - \lambda_{2n}(z_{6n} - d_{1n})S_{\eta n}\end{array}}{-(z_{6n} - d_{1n})C_{\eta n}} \quad (105)$$

$$\frac{d}{dt}\left(\frac{\partial L}{\partial \dot\theta_n}\right) - \frac{\partial L}{\partial \theta_n} = \frac{\partial F}{\partial \dot\theta_n} + \sum_{l,n}\lambda_{ln}a_{ln4} \quad (106)$$

$$l = 1, 2, 3 \quad n = i, ii, iii, iv$$

$$\ddot\theta_n m_{aw2ln} + \ddot\alpha[m_{aw2ln} - m_{awln}\{c_{2n}\sin\theta_n - b_{2n}\cos(\gamma_n + \theta_n)\} - \quad (107)$$
$$\dot\alpha\dot\theta_n m_{awln}\{c_{2n}\cos\theta_n + b_{2n}\sin(\gamma_n + \theta_n)\} -$$
$$\ddot\beta m_{awln}a_{1n}\cos(\alpha + \gamma_n + \theta_n) +$$
$$\dot\beta(\dot\alpha + \dot\theta_n)m_{awln}a_{1n}\sin(\alpha + \gamma_n + \theta_n) + \ddot z_0 m_{awln}\cos(\alpha + \gamma_n + \theta_n)$$
$$\cos\beta - (\dot\alpha + \dot\theta_n)\dot z_0 m_{awln}\sin(\alpha + \gamma_n + \theta_n)\cos\beta -$$
$$\dot\beta\dot z_0 m_{awln}\cos(\alpha + \gamma_n + \theta_n)\sin\beta -$$
$$[-k_{zi}e_{0i}^2\{\sin(\gamma_i + \theta_i) - \sin(\gamma_{ii} + \theta_{ii})\}\cos(\gamma_n + \theta_n)X_s - k_{ziii}e_{0iii}^2\{\sin(\gamma_{iii} + \theta_{iii}) - \sin(\gamma_{iv} + \theta_{iv})\}\cos(\gamma_n + \theta_n)X_s -$$
$$\dot\alpha^2 m_{awln}\{c_{2n}\cos\theta_n + b_{2n}\sin(\gamma_n + \theta_n)\} +$$
$$\dot\beta^2(m_{an}\{e_{1n}\sin(\alpha + \gamma_n + \theta_n) + c_{2n}\cos(\alpha + \gamma_n) +$$
$$b_{2n}\sin\alpha\}e_{1n}\cos(\alpha + \gamma_n + \theta_n) +$$
$$m_{wn}\{e_{3n}\sin(\alpha + \gamma_n + \theta_n) + c_{2n}\cos(\alpha + \gamma_n) +$$
$$b_{2n}\sin\alpha\}e_{3n}\cos(\alpha + \gamma_n + \theta_n)\rangle -$$
$$\dot\theta_n\dot\alpha m_{awln}\{c_{2n}\cos\theta_n + b_{2n}\sin(\gamma_n + \theta_n)\} + \dot\theta_n\dot\beta m_{awln}$$
$$a_{1n}\sin(\alpha + \gamma_n + \theta_n) + \dot\alpha\dot\beta a_{1n}m_{awln}\sin(\alpha + \gamma_n + \theta_n) -$$
$$gm_{awln}\cos(\alpha + \gamma_n + \theta_n)\cos\beta -$$
$$\dot z_0(\dot\alpha + \dot\theta_n)m_{awln}\sin(\alpha + \gamma_n + \theta_n)\cos\beta -$$
$$\dot\beta\dot z_0 m_{awln}\cos(\alpha + \gamma_n + \theta_n)\sin\beta] =$$
$$\lambda_{1n}e_{2n}\sin\theta_n + \lambda_{2n}e_{2n}\cos\theta_n + \lambda_{3n}e_{3n}\cos(\alpha + \gamma_n + \theta_n)\cos\beta$$

$$\ddot{\theta}_n m_{aw2ln} + \ddot{\alpha}(m_{aw2ln} - m_{awln}H_1) - \dot{\alpha}\dot{\theta}_n m_{awln}H_2 - \quad (108)$$
$$\ddot{\beta}m_{awln}a_{1n}C_{\alpha\gamma\theta n} + \dot{\beta}(\dot{\alpha} + \dot{\theta}_n)m_{awln}a_{1n}S_{\alpha\gamma\theta n} + \ddot{z}_0 m_{awln}C_{\alpha\gamma\theta n}C_\beta -$$
$$[-k_{zi}e_{0i}^2\{\sin(\gamma_i + \theta_i) + \sin(\gamma_{ii} + \theta_{ii})\}X_s - k_{ziii}e_{0iii}^2\{\sin(\gamma_{iii} + \theta_{iii}) +$$
$$\sin(\gamma_{iv} + \theta_{iv})\}\cos(\gamma_n + \theta_n)X_s - \dot{\alpha}^2 m_{awln}H_2 +$$
$$\dot{\beta}^2(m_{an}B_2 e_{1n}C_{\alpha\gamma\theta n} + m_{wn}B_3 e_{3n}C_{\alpha\gamma\theta n}) - \dot{\theta}\dot{\alpha}m_{awln}H_2 +$$
$$\dot{\theta}\dot{\beta}m_{awln}a_{1n}S_{\alpha\gamma\theta n} + \dot{\alpha}\dot{\beta}a_{1n}m_{awln}S_{\alpha\gamma\theta n} - gm_{awln}C_{\alpha\gamma\theta n}C_\beta] =$$
$$\lambda_{1n}e_{2n}S_{\theta n} + \lambda_{2n}e_{2n}C_{\theta n} + \lambda_{3n}e_{3n}C_{\alpha\gamma\theta n}C_\beta$$

$$\ddot{\theta}_n m_{aw2ln} + \ddot{\alpha}(m_{aw2ln} - m_{awln}H_1) - \quad (109)$$
$$\ddot{\beta}m_{awln}a_{1n}C_{\alpha\gamma\theta n} + \ddot{z}_0 m_{awln}C_{\alpha\gamma\theta n}C_\beta + \dot{\alpha}^2 m_{awln}H_2 -$$
$$\dot{\beta}^2(m_{an}B_2 e_{1n}C_{\alpha\gamma\theta n} + m_{wn}B_3 e_{3n}C_{\alpha\gamma\theta n}) + gm_{awln}C_{\alpha\gamma\theta n}C_\beta +$$
$$k_{zi}e_{0i}^2\{\sin(\gamma_i + \theta_i) + \sin(\gamma_{ii} + \theta_{ii})\}\cos(\gamma_n + \theta_n) +$$
$$k_{ziii}e_{0iii}^2\{\sin(\gamma_{iii} + \theta_{iii}) + \sin(\gamma_{iv} + \theta_{iv})\}\cos(\gamma_n + \theta_n) =$$
$$\lambda_{1n}e_{2n}S_{\theta n} + \lambda_{2n}e_{2n}C_{\theta n} + \lambda_{3n}e_{3n}C_{\alpha\gamma\theta n}C_\beta$$
$$\therefore$$

$$\ddot{\theta}_n = \frac{\begin{array}{c} \ddot{\alpha}(m_{aw2ln} - m_{awln}H_1) - \ddot{\beta}m_{awln}a_{1n}C_{\alpha\gamma\theta n} + \\ \ddot{z}_0 m_{awln}C_{\alpha\gamma\theta n}C_\beta + \dot{\alpha}^2 m_{awln}H_2 - \\ \dot{\beta}^2(m_{an}B_2 e_{1n}C_{\alpha\gamma\theta n} + m_{wn}B_3 e_{3n}C_{\alpha\gamma\theta n}) + \\ gm_{awln}C_{\alpha\gamma\theta n}C_\beta - \lambda_{1n}e_{2n}S_{\theta n} - \lambda_{2n}e_{2n}C_{\theta n} - \\ \lambda_{3n}e_{3n}C_{\alpha\gamma\theta n}C_\beta + k_{zi}e_{0i}^2\{\sin(\gamma_i + \theta_i) + \\ \sin(\gamma_{ii} + \theta_{ii})\}\cos(\gamma_n + \theta_n) + k_{ziii}e_{0iii}^2\{\sin(\gamma_{iii} + \theta_{iii}) + \\ \sin(\gamma_{iv} + \theta_{iv})\}\cos(\gamma_n + \theta_n) \end{array}}{-m_{aw2ln}} \quad (110)$$

$$\frac{d}{dt}\left(\frac{\partial L}{\partial \dot{z}_{6n}}\right) - \frac{\partial L}{\partial z_{6n}} = \frac{\partial F}{\partial \dot{z}_{6n}} + \sum_{l,n} \lambda_{ln} a_{ln5} \quad (111)$$

$l = 1, 2, 3 \quad n = i, ii, iii, iv$ $$m_{sn}\ddot{z}_{6n} + \ddot{\alpha}m_{sn}\{c_{1n}\sin\eta_n + b_{2n}\cos(\gamma_n + \eta_n)\} + \quad (112)$$
$$\dot{\alpha}\dot{\eta}_n m_{sn}\{c_{1n}\cos\eta_n - b_{2n}\sin(\gamma_n + \eta_n)\} - \ddot{\beta}m_{sn}a_{1n}\cos(\alpha + \gamma_n + \eta_n) +$$
$$\dot{\beta}(\dot{\alpha} + \dot{\eta}_n)m_{sn}a_{1n}\sin(\alpha + \gamma_n + \eta_n) + \ddot{z}_0 m_{sn}\cos(\alpha + \gamma_n + \eta_n)\cos\beta -$$
$$(\dot{\alpha} + \dot{\eta}_n)\dot{z}_0 m_{sn}\sin(\alpha + \gamma_n + \eta_n)\cos\beta -$$
$$\dot{\beta}\dot{z}_0 m_{sn}\cos(\alpha + \gamma_n + \eta_n)\sin\beta -$$
$$\langle m_{sn}\dot{\eta}_n^2 z_{6n} + \dot{\alpha}^2 m_{sn}[z_{6n} + \{c_{1n}\cos\eta_n -$$
$$b_{2n}\sin(\gamma_n + \eta_n)\}] + \dot{\beta}^2 m_{sn}\{z_{6n}\cos(\alpha + \gamma_n + \eta_n) +$$
$$c_{1n}\cos(\alpha + \gamma_n) + b_{2n}\sin\alpha\}\cos(\alpha + \gamma_n + \eta_n) +$$
$$\dot{\eta}_n \dot{\alpha} m_{sn}\{2z_{6n} + c_{1n}\cos\eta_n - b_{2n}\sin(\gamma_n + \eta_n)\} +$$
$$\dot{\eta}_n \dot{\beta}m_{sn}a_{1n}\sin(\alpha + \gamma_n + \eta_n) + \dot{\alpha}\dot{\beta}a_{1n}m_{sn}\sin(\alpha + \gamma_n + \eta_n) -$$
$$gm_{sn}\cos(\alpha + \gamma_n + \eta_n)\cos\beta - k_{sn}(z_{6n} - l_{sn}) +$$
$$\dot{z}_0(\dot{\alpha} + \dot{\eta}_n)m_{sn}\sin(\alpha + \gamma_n + \eta_n)\cos\beta -$$
$$\dot{\beta}\dot{z}_0 m_{sn}\cos(\alpha + \gamma_n + \eta_n)\sin\beta\rangle =$$

-continued
$$-c_{sn}\dot{z}_{6n} - \lambda_{1n}\sin\eta_n - \lambda_{2n}\cos\eta_n$$

$$m_{sn}\{\ddot{z}_{6n} + \ddot{\alpha}E_2 - \ddot{\beta}a_{1n}C_{\alpha\gamma\eta n} - \dot{\eta}_n^2 z_{6n} - \quad (113)$$
$$\dot{\alpha}^2(z_{6n} + E_1) - \dot{\beta}^2 B_1 C_{\alpha\gamma\eta n} - 2\dot{\eta}_n \dot{\alpha} z_{6n} + gC_{\alpha\gamma\eta n}C_\beta\} +$$
$$k_{sn}(z_{6n} - l_{sn}) = -c_{sn}\dot{z}_{6n} - \lambda_{1n}S_{\eta n} - \lambda_{2n}C_{\eta n}$$
$$\therefore$$

$$\lambda_{2n} = \frac{m_{sn}\{\ddot{z}_{6n} + \ddot{\alpha}E_2 - \ddot{\beta}a_{1n} - \dot{\eta}_n^2 z_{6n} - \dot{\alpha}^2(z_{6n} + E_1) -}{-C_{\eta n}} \quad (114)$$
$$\frac{\dot{\beta}^2 B_1 C_{\alpha\gamma\eta n} - 2\dot{\eta}_n \dot{\alpha} z_{6n} + gC_{\alpha\gamma\eta n}C_\beta\} +}{-C_{\eta n}}$$
$$\frac{k_{sn}(z_{6n} - l_{sn}) + c_{sn}\dot{z}_{6n} + \lambda_{1n}S_{\eta n}}{-C_{\eta n}}$$

$$\frac{d}{dt}\left(\frac{\partial L}{\partial \dot{z}_{12n}}\right) - \frac{\partial L}{\partial z_{12n}} = \frac{\partial F}{\partial \dot{z}_{12n}} + \sum_{l,n} \lambda_{ln} a_{ln6}$$

$l = 1, 2, 3 \quad n = i, ii, iii, iv$ $$k_{wn}(z_{12n} - l_{wn}) = -c_{wn}\dot{z}_{12n} + \lambda_{3n}\cos\alpha\cos\beta \quad (115)$$
$$= -c_{wn}\dot{z}_{12n} + \lambda_{3n}C_\alpha C_\beta$$
$$\therefore$$

$$\lambda_{3n} = \frac{c_{wn}\dot{z}_{12n} + k_{wn}(z_{12n} - l_{wn})}{C_\alpha} \quad (116)$$

From the differentiated constraints it follows that:

$$\ddot{\theta}_n e_{2n}S_{\theta n} + \dot{\theta}_n^2 e_{2n}C_{\theta n} - \ddot{z}_{6n}S_{\eta n} - \dot{z}_{6n}\dot{\eta}_n C_{\eta n} - \quad (117)$$
$$\ddot{\eta}_n(z_{6n} - d_{1n})C_{\eta n} - \dot{\eta}_n \dot{z}_{6n}C_{\eta n} + \dot{\eta}_n^2(z_{6n} - d_{1n})S_{\eta n} = 0$$
$$\ddot{\theta}_n e_{2n}C_{\theta n} - \dot{\theta}_n^2 e_{2n}S_{\theta n} - \ddot{z}_{6n}C_{\eta n} + \dot{z}_{6n}\dot{\eta}_n S_{\eta n} +$$
$$\ddot{\eta}_n(z_{6n} - d_{1n})S_{\eta n} + \dot{\eta}_n \dot{z}_{6n}S_{\eta n} + \dot{\eta}_n^2(z_{6n} - d_{1n})C_{\eta n} = 0$$
$$\therefore$$

$$\ddot{\eta}_n = \frac{\ddot{\theta}_n e_{2n}S_{\theta n} + \dot{\theta}_n^2 e_{2n}C_{\theta n} - \ddot{z}_{6n}S_{\eta n} -}{(z_{6n} - d_{1n})C_{\eta n}} \quad (118)$$
$$\frac{2\dot{\eta}_n \dot{z}_{6n}C_{\eta n} + \dot{\eta}_n^2(z_{6n} - d_{1n})S_{\eta n}}{(z_{6n} - d_{1n})C_{\eta n}}$$

$$\ddot{z}_{6n} = \frac{\ddot{\theta}_n e_{2n}C_{\theta n} - \dot{\theta}_n^2 e_{2n}S_{\theta n} + \ddot{\eta}_n(z_{6n} - d_{1n})S_{\eta n} +}{C_{\eta n}} \quad (119)$$
$$\frac{2\dot{\eta}_n \dot{z}_{6n}S_{\eta n} + \dot{\eta}_n^2(z_{6n} - d_{1n})C_{\eta n}}{C_{\eta n}}$$

and $$\dot{z}_{12n} = \frac{\{\dot{\alpha}z_{12n}S_\alpha - (\dot{\alpha}+\dot{\theta}_n)e_{3n}C_{\alpha\gamma\theta n} + \dot{\alpha}c_{2n}S_{\alpha\gamma n} - \dot{\alpha}b_{2n}C_\alpha\}}{C_\alpha C_\beta}$$
$$\phantom{\dot{z}_{12n} =} \frac{C_\beta - \ddot{z}_0 + \dot{\beta}[\{z_{12n}C_\alpha + e_{3n}S_{\alpha\gamma\theta n} +}{} $$
$$\phantom{\dot{z}_{12n} =} \frac{c_{2n}C_{\alpha\gamma n} + b_{2n}S_\alpha\}S_\beta + a_{1n}C_\beta] + \ddot{R}_n(t)}{} \quad (120)$$

Supplemental differentiation of equation (116) for the later entropy production calculation yields:

$$k_{wn}\dot{z}_{12n} = -c_{wn}\ddot{z}_{12n} + \lambda_{3n}C_\alpha C_\beta - \dot{\alpha}\lambda_{3n}S_\alpha C_\beta - \dot{\beta}\lambda_{3n}C_\alpha S_\beta \quad (121)$$

therefore $$\ddot{z}_{12n} = \frac{\lambda_{3n}C_\alpha C_\beta - \dot{\alpha}\lambda_{3n}S_\alpha C_\beta - \dot{\beta}\lambda_{3n}C_\alpha S_\beta - k_{wn}\dot{z}_{12n}}{c_{wn}} \quad (122)$$

or from the third equation of constraint:

$$\ddot{z}_0 + \{\ddot{z}_{12n}\cos\alpha - \dot{z}_{12n}\dot{\alpha}\cos\alpha - \dot{\alpha}z_{12n}\sin\alpha - \dot{\alpha}\dot{z}_{12n}\sin\alpha - \quad (123)$$
$$\dot{\alpha}^2 z_{12n}\cos\alpha + (\ddot{\alpha}+\ddot{\theta}_n)e_{3n}\cos(\alpha+\gamma_n+\theta_n) -$$
$$(\dot{\alpha}+\dot{\theta}_n)^2 e_{3n}\sin(\alpha+\gamma_n+\theta_n) - \ddot{\alpha}c_{2n}\sin(\alpha+\gamma_n) -$$
$$\dot{\alpha}^2 c_{2n}\cos(\alpha+\gamma_n) + \ddot{\alpha}b_{2n}\cos\alpha - \dot{\alpha}^2 b_{2n}\sin\alpha\}\cos\beta -$$
$$\dot{\beta}\{\dot{z}_{12n}\cos\alpha - \dot{\alpha}z_{12n}\sin\alpha + (\dot{\alpha}+\dot{\theta}_n)e_{3n}\cos(\alpha+\gamma_n+\theta_n) -$$
$$\dot{\alpha}c_{2n}\sin(\alpha+\gamma_n) + \dot{\alpha}b_{2n}\cos\alpha\}\sin\beta - \dot{\beta}[\{z_{12n}\cos\alpha +$$
$$e_{3n}\sin(\alpha+\gamma_n+\theta_n) + c_{2n}\cos(\alpha+\gamma_n) + b_{2n}\sin\alpha\}\sin\beta +$$
$$a_{1n}\cos\beta] - \dot{\beta}[\{\dot{z}_{12n}\cos\alpha - \dot{\alpha}z_{12n}\sin\alpha +$$
$$(\dot{\alpha}+\dot{\theta}_n)e_{3n}\cos(\alpha+\gamma_n+\theta_n) - (\dot{\alpha}+\dot{\gamma}_n)c_{2n}\sin(\alpha+\gamma_n) +$$
$$\dot{\alpha}b_{2n}\cos\alpha\}\sin\beta + \dot{\beta}\{z_{12n}\cos\alpha + e_{3n}\sin(\alpha+\gamma_n+\theta_n) +$$
$$c_{2n}\cos(\alpha+\gamma_n) + b_{2n}\sin\alpha\}\cos\beta - \dot{\beta}a_{1n}\sin\beta] - \ddot{R}_n(t) = 0$$

$$\ddot{z}_{12n} = \frac{\ddot{z}_0 + \{-\dot{z}_{12n}\dot{\alpha}\cos\alpha - \dot{\alpha}z_{12n}\sin\alpha - \dot{\alpha}\dot{z}_{12n}\sin\alpha - \cdots - \ddot{R}_n(t)\}}{-\cos\alpha\cos\beta} \quad (124)$$

IV. Equations for Entropy Production

Minimum entropy production (for use in the fitness function of the genetic algorithm) is expressed as:

$$\frac{d_\beta S}{dt} = \frac{-2\dot{\beta}^2[\dot{\alpha}m_b A_1 A_2 + m_{sn}B_1\{\dot{z}_{6n}C_{\alpha\gamma\eta n} - (\dot{\alpha}+\dot{\eta}_n)z_{6n}S_{\alpha\gamma\eta n} - \dot{\alpha}A_4\} + m_{an}B_2\{(\dot{\alpha}+\dot{\theta}_n)e_{1n}C_{\alpha\gamma\theta n} - \dot{\alpha}A_6\} + m_{wn}B_3\{(\dot{\alpha}+\dot{\theta}_n)e_{3n}S_{\alpha\gamma\theta n} - \dot{\alpha}A_6\} - \ddot{z}_0(m_{ba} + m_{s\alpha wan})S_\beta/2]}{m_{saw2n} + m_{bal} + m_b A_1^2 + m_{sn}B_1^2 + m_{an}B_2^2 + m_{wn}B_3^2} \quad (125)$$

$$\frac{d_\alpha S}{dt} = \frac{-2\dot{\alpha}^2\{m_{sn}\dot{\alpha}\dot{z}_{6n}(z_{6n}+E_{1n}) + m_{sn}z_{6n}\dot{\eta}_n E_{2n} + \dot{\theta}_n m_{awln}H_{2n}\}}{m_{bbl} + m_{sawln} + m_{sn}z_{6n}(z_{6n}+2E_{1n}) - 2m_{awln}H_{1n}} \quad (126)$$

$$\frac{d_{\eta_n}S}{dt} = \dot{\eta}_n^3 tg\eta_n - \frac{2\dot{\eta}_n^2 z_{6n}}{z_{6n}-d_{1n}} \quad (127)$$

$$\frac{d_{z_{6n}}S}{dt} = 2\dot{\eta}_n \dot{z}_{6n}^2 tg\eta_n \quad (128)$$

$$\frac{d_{z_{12n}}S}{dt} = \dot{z}_{12n}^2(\dot{\alpha}+\dot{\alpha}tg\alpha+2\dot{\beta}tg\beta) \quad (129)$$

The learning module 101 gains pseudo-sensor signals based on the kinetic models of the vehicle and suspensions obtained by the above-described methods. Then, the learning module 101 directs the learning control unit to operate based on the pseudo-sensor signals. Further, at the optimized part, the learning module 101 calculates the time differential of the entropy from the learning control unit and time differential of the entropy inside the controlled process. In this embodiment, the entropy inside the controlled processes is obtained from the kinetic models as described above. This embodiment utilizes the time differential of the entropy $dS_{cs}/dt$ (where $S_{cs}$ is $S_c$ for the suspension) relative to the vehicle body and $dS_s/dt$ to which time differential of the entropy $dS_{ss}/dt$ (where the subscript ss refers to the suspension) relative to the suspension is added. Further, this embodiment employs the damper coefficient control type shock absorber. Since the learning control unit (control unit of the actual control module 101) controls the throttle amount of the oil passage in the shock absorbers, the speed element is not included in the output of the learning control unit. Therefore, the entropy of the learning control unit is reduced, and tends toward zero.

The optimized part defines the performance function as a difference between the time differential of the entropy from the learning control unit and time differential of the entropy inside the controlled process. The optimized part genetically evolves teaching signals (input/output values of the fuzzy neural network) in the learning control unit with the genetic algorithm so that the above difference (i.e., time differential of the entropy for the inside of the controlled process in this embodiment) becomes small. The learning control unit is optimized based on the learning of the teaching signals.

Then, the parameters (fuzzy rule based in the fuzzy reasoning in this embodiment) for the control unit at the actual control module 101 are determined based on the optimized learning control unit. Thereby, the optimal regulation of the suspensions with nonlinear characteristic can be allowed.

Although the foregoing has been a description and illustration of specific embodiments of the invention, various modifications and changes can be made thereto by persons skilled in the art, without departing from the scope and spirit of the invention as defined by the following claims.

What is claimed is:

1. A method for control of a plant comprising the steps of: calculating a first entropy production rate corresponding to an entropy production rate of a control signal provided to a model of said plant; calculating a second entropy production rate corresponding to an entropy production rate of said model of said plant; determining a fitness function for a genetic optimizer using said first entropy production rate and said second entropy production rate; providing said fitness function to said genetic optimizer; providing a teaching output from said genetic optimizer to a learning input of a first control system, said first control system configured to control said model of said plant; and providing a control parameter from said first control system to parameter input of said second control system.

2. The method of claim 1, wherein said first control system comprises a neural network.

3. The method of claim 1, wherein said second control system comprises a neural network.

4. The method of claim 1, wherein said model of said plant comprises a model of a suspension system.

5. The method of claim 1, wherein said second control system is configured to control a physical plant.

6. The method of claim 1, wherein said second control system is configured to control a shock absorber.

7. The method of claim 1, wherein said second control system is configured to control a damping rate of a shock absorber.

8. The method of claim 1, wherein said second control system receives sensor input data from one or more sensors that monitor a vehicle suspension system.

9. The method of claim 8, wherein at least one of said sensors is a height sensor that measures a vehicle height.

10. The method of claim 8, wherein at least one of said sensors is a length sensor that measures a change in length of at least a portion of said suspension system.

11. The method of claim 8, wherein at least one of said sensors is an angle sensor that measures an angle of at least a portion of said suspension system with respect to said vehicle.

12. The method of claim 8, wherein at least one of said sensors is an angle sensor that measures an angle of a first portion of said suspension system with respect to a second portion of said suspension system.

13. The method of claim 1, wherein said second control system is configured to control a throttle valve in a shock absorber.

14. A control apparatus comprising: off-line optimization means for determining a control parameter from an entropy production rate; online control means for using said control parameter to control a plant.

* * * * *